(12) United States Patent
Szydlowski et al.

(10) Patent No.: US 9,521,858 B2
(45) Date of Patent: Dec. 20, 2016

(54) METHOD AND SYSTEM FOR RECOVERING AND PREPARING GLACIAL WATER

(71) Applicants: Allen Szydlowski, Santiago (CL); Ian Szydlowski, New York, NY (US); Juan Carlos Szydlowski, Santiago (CL)

(72) Inventors: Allen Szydlowski, Santiago (CL); Ian Szydlowski, New York, NY (US); Juan Carlos Szydlowski, Santiago (CL)

(*) Notice: Subject to any disclaimer, the term of this patent is extended or adjusted under 35 U.S.C. 154(b) by 318 days.

(21) Appl. No.: 14/444,806

(22) Filed: Jul. 28, 2014

(65) Prior Publication Data

US 2015/0104544 A1 Apr. 16, 2015

Related U.S. Application Data

(60) Continuation-in-part of application No. 14/271,233, filed on May 6, 2014, now Pat. No. 9,023,410, which
(Continued)

(51) Int. Cl.
*A23L 2/38* (2006.01)
*G06Q 40/00* (2012.01)
(Continued)

(52) U.S. Cl.
CPC ............... *A23L 2/38* (2013.01); *C12C 5/002* (2013.01); *C12G 1/00* (2013.01); *G06Q 40/00* (2013.01);
(Continued)

(58) Field of Classification Search
CPC ............. A23L 2/38; G06Q 40/00; C12G 1/00; C12C 5/002; C02F 1/78; C02F 2103/008
See application file for complete search history.

(56) References Cited

U.S. PATENT DOCUMENTS

| 2,371,404 A | 3/1945 | Mumford |
| 2,391,926 A | 1/1946 | Scott |

(Continued)

FOREIGN PATENT DOCUMENTS

| CA | 1049856 | 3/1979 |
| CA | 2744617 | 1/2013 |

(Continued)

OTHER PUBLICATIONS

U.S. Appl. No. 14/578,915, filed Dec. 22, 2014, Szydlowski et al.
(Continued)

*Primary Examiner* — Erik Kashnikow
*Assistant Examiner* — Chaim Smith
(74) *Attorney, Agent, or Firm* — Sheridan Ross P.C.

(57) ABSTRACT

Methods and systems for grouping, recovering, and processing ice obtained from an ice source, i.e., a glacier, ice sheet, ice cap, etc., are described herein. In particular, the ice obtained from the ice source is separated and grouped according to common unique properties and processed as a beverage for consumption having the same unique properties. Additionally, methods and systems for producing, trading, transporting, and storing commodities are disclosed. More specifically, methods and systems for producing, trading, transporting, and storing large quantities of water having specific characteristics are provided. Methods for transferring title and trading commodities in the form of water are disclosed.

9 Claims, 23 Drawing Sheets

Related U.S. Application Data is a continuation-in-part of application No. 13/647,255, filed on Oct. 8, 2012, now Pat. No. 8,715,756, which is a continuation of application No. 13/213,818, filed on Aug. 19, 2011, now Pat. No. 8,282,972, which is a division of application No. 11/551,125, filed on Oct. 19, 2006, now Pat. No. 8,007,845, application No. 14/444,806, which is a continuation-in-part of application No. 13/222,940, filed on Aug. 31, 2011, now abandoned.

(60) Provisional application No. 60/728,956, filed on Oct. 21, 2005, provisional application No. 61/378,811, filed on Aug. 31, 2010, provisional application No. 61/511,208, filed on Jul. 25, 2011.

(51) Int. Cl.
| | |
|---|---|
| C12G 1/00 | (2006.01) |
| C12C 5/00 | (2006.01) |
| C02F 1/00 | (2006.01) |
| C02F 1/78 | (2006.01) |
| C02F 103/00 | (2006.01) |

(52) U.S. Cl.
CPC .............. *C02F 1/001* (2013.01); *C02F 1/78* (2013.01); *C02F 2103/008* (2013.01); *Y02W 10/37* (2015.05)

(56) References Cited

U.S. PATENT DOCUMENTS

| | | | |
|---|---|---|---|
| 3,779,196 A | 12/1973 | Knaus et al. |
| 3,955,524 A | 5/1976 | Renoux |
| 3,967,396 A | 7/1976 | Maisonneuve et al. |
| 3,999,499 A | 12/1976 | Kitabayashi |
| 4,108,101 A | 8/1978 | Schirtzinger |
| 4,117,796 A | 10/1978 | Strain |
| 4,224,802 A | 9/1980 | Ooka |
| 4,227,478 A | 10/1980 | Preus |
| 4,233,085 A | 11/1980 | Roderick et al. |
| 4,331,129 A | 5/1982 | Hong et al. |
| 4,399,765 A | 8/1983 | Alkner et al. |
| 4,409,919 A | 10/1983 | Strain et al. |
| 4,432,669 A | 2/1984 | Cox et al. |
| 4,512,886 A | 4/1985 | Hicks et al. |
| 4,517,094 A | 5/1985 | Beall |
| 4,563,826 A | 1/1986 | Whitaker, Jr. |
| 4,564,450 A | 1/1986 | Piper et al. |
| 4,567,731 A | 2/1986 | Horan |
| 4,627,375 A | 12/1986 | Davis et al. |
| 4,713,898 A | 12/1987 | Bull et al. |
| 4,736,534 A | 4/1988 | Daniels et al. |
| 4,810,195 A | 3/1989 | Asmussen et al. |
| 4,890,958 A | 1/1990 | Dancer |
| 5,032,261 A | 7/1991 | Pyper |
| 5,099,779 A | 3/1992 | Kawaichi et al. |
| 5,131,341 A | 7/1992 | Newman |
| 5,197,912 A | 3/1993 | Lengefeld |
| 5,229,005 A | 7/1993 | Fok et al. |
| 5,413,065 A | 5/1995 | Spragg et al. |
| 5,487,485 A | 1/1996 | Yang et al. |
| 5,488,921 A | 2/1996 | Spragg |
| 5,505,585 A | 4/1996 | Hubbard |
| 5,562,824 A | 10/1996 | Magnusson et al. |
| 5,657,714 A | 8/1997 | Hsia et al. |
| 5,727,492 A | 3/1998 | Cuneo et al. |
| 5,910,248 A | 6/1999 | Tlok |
| 6,047,655 A | 4/2000 | Cran |
| 6,125,778 A | 10/2000 | Rodden |
| 6,139,809 A | 10/2000 | Rodden |
| 6,194,790 B1 | 2/2001 | Griffin et al. |
| 6,293,217 B1 | 9/2001 | Savage et al. |
| 6,330,865 B1 | 12/2001 | Cran |
| 6,550,410 B2 | 4/2003 | Reimers |
| 6,580,025 B2 | 6/2003 | Guy |
| 6,615,759 B2 | 9/2003 | Yaffe |
| 6,675,734 B2 | 1/2004 | Eagles et al. |
| 6,718,896 B2 | 4/2004 | Davenport |
| 6,739,274 B2 | 5/2004 | Eagles et al. |
| 6,802,684 B2 | 10/2004 | Arntzen et al. |
| 6,808,808 B2 | 10/2004 | Freeman et al. |
| 6,832,571 B2 | 12/2004 | Eagles |
| 6,860,218 B2 | 3/2005 | Eagles et al. |
| 6,869,540 B2 | 3/2005 | Robinson |
| 6,902,368 B2 | 6/2005 | Hagenzieker et al. |
| 6,923,135 B2 | 8/2005 | Kranebitter |
| 6,928,336 B2 | 8/2005 | Peshkin et al. |
| 6,997,643 B2 | 2/2006 | Wille et al. |
| 7,002,472 B2 | 2/2006 | Stratmoen et al. |
| 7,024,748 B2 | 4/2006 | Eagles |
| 7,062,406 B2 | 6/2006 | Patwardhan et al. |
| 7,077,963 B2 | 7/2006 | McConchie |
| 7,107,921 B2 | 9/2006 | Davis et al. |
| 7,117,807 B2 | 10/2006 | Bohn, Jr. et al. |
| 7,143,709 B2 | 12/2006 | Brennan et al. |
| 7,201,291 B2 | 4/2007 | Vigny et al. |
| 7,201,624 B2 | 4/2007 | Dyhrberg |
| 7,273,562 B2 | 9/2007 | Robinson |
| 7,287,481 B1 | 10/2007 | Wrage et al. |
| 7,308,862 B2 | 12/2007 | Romanski et al. |
| 7,320,289 B1 | 1/2008 | Clarke et al. |
| 7,332,082 B2 | 2/2008 | Brandlmaier |
| 7,347,970 B2 | 3/2008 | Kim et al. |
| 7,365,266 B2 | 4/2008 | Heckeroth |
| 7,390,343 B2 | 6/2008 | Tepper et al. |
| 7,402,253 B2 | 7/2008 | van Leeuwen et al. |
| 7,407,592 B2 | 8/2008 | van Leeuwen et al. |
| 7,410,339 B2 | 8/2008 | Franzen et al. |
| 7,410,573 B2 | 8/2008 | Saho et al. |
| 7,416,660 B2 | 8/2008 | van Leeuwen et al. |
| 7,451,604 B2 | 11/2008 | Yoshida et al. |
| 7,500,442 B1 | 3/2009 | Schanz |
| 7,504,741 B2 | 3/2009 | Wrage et al. |
| 7,546,813 B2 | 6/2009 | Wrage |
| 7,553,418 B2 | 6/2009 | Khudenko et al. |
| 7,564,989 B2 | 7/2009 | Schanz |
| 7,569,148 B2 | 8/2009 | Elefritz et al. |
| 7,588,686 B2 | 9/2009 | Jensen |
| 7,650,848 B2 | 1/2010 | Brennan et al. |
| 7,672,761 B2 | 3/2010 | Wrage et al. |
| 7,686,539 B2 | 3/2010 | Aristaghes et al. |
| 7,690,319 B2 | 4/2010 | Wingate |
| 7,731,847 B2 | 6/2010 | Ton That |
| 7,740,765 B2 | 6/2010 | Mitchell et al. |
| 7,755,211 B2 | 7/2010 | Montgomery |
| 7,775,171 B2 | 8/2010 | Tupil |
| 7,798,083 B2 | 9/2010 | Wrage |
| 7,841,289 B1 | 11/2010 | Schanz |
| 7,866,271 B2 | 1/2011 | Wrage et al. |
| 7,900,780 B2 | 3/2011 | Ueki et al. |
| 7,932,461 B2 | 4/2011 | Johnson et al. |
| 7,971,545 B2 | 7/2011 | Wrage |
| 7,987,017 B2 | 7/2011 | Buzzoni et al. |
| 8,007,845 B2 | 8/2011 | Szydlowski |
| 8,056,490 B2 | 11/2011 | Wrage |
| 8,058,985 B2 | 11/2011 | Dobson et al. |
| 8,117,977 B2 | 2/2012 | Reusch |
| 8,215,588 B2 | 7/2012 | Wrage et al. |
| 8,282,972 B2 | 10/2012 | Szydlowski |
| 8,306,649 B2 | 11/2012 | Buzzoni et al. |
| 8,322,294 B2 | 12/2012 | Bowhay |
| 8,403,718 B2 | 3/2013 | Szydlowsk et al. |
| 8,488,246 B2 | 7/2013 | Border et al. |
| 8,492,023 B2 | 7/2013 | Sastry et al. |
| 8,496,423 B2 | 7/2013 | Springett et al. |
| 8,506,739 B2 | 8/2013 | Gautier et al. |
| 8,508,065 B1 | 8/2013 | Lee |
| 8,522,707 B1 | 9/2013 | Shiban |
| 8,527,457 B2 | 9/2013 | Moon et al. |
| 8,529,376 B2 | 9/2013 | Morgan et al. |
| 8,702,460 B2 | 4/2014 | Szydlowski et al. |
| 8,715,756 B2 | 5/2014 | Szydlowski |

(56) References Cited

U.S. PATENT DOCUMENTS

| | | |
|---|---|---|
| 8,924,311 B2 | 12/2014 | Szydlowski et al. |
| 2002/0188459 A1 | 12/2002 | Erickson |
| 2004/0038089 A1 | 2/2004 | Hoffjann et al. |
| 2004/0144294 A1 | 7/2004 | Yaffe |
| 2004/0215367 A1 | 10/2004 | King et al. |
| 2005/0066868 A1 | 3/2005 | Saho et al. |
| 2005/0276666 A1 | 12/2005 | Wille et al. |
| 2005/0284361 A1 | 12/2005 | Muis et al. |
| 2006/0027507 A1 | 2/2006 | van Leeuwen |
| 2006/0096990 A1 | 5/2006 | Reed |
| 2007/0073609 A1 | 3/2007 | Odom et al. |
| 2007/0246424 A1 | 10/2007 | Honda |
| 2008/0017591 A1 | 1/2008 | Ranade et al. |
| 2008/0110091 A1 | 5/2008 | Perkins et al. |
| 2008/0116142 A1 | 5/2008 | Fischmann Torres |
| 2008/0127654 A1 | 6/2008 | Darling et al. |
| 2008/0174485 A1 | 7/2008 | Carani et al. |
| 2008/0194160 A1 | 8/2008 | Concannon |
| 2008/0196581 A1 | 8/2008 | Cooley |
| 2008/0200746 A1 | 8/2008 | Bird et al. |
| 2008/0203093 A1 | 8/2008 | Skulnick |
| 2008/0235858 A1 | 10/2008 | Schanz |
| 2008/0251755 A1 | 10/2008 | Matula et al. |
| 2009/0055294 A1 | 2/2009 | Shirazi |
| 2009/0126400 A1 | 5/2009 | Pozivil |
| 2009/0221983 A1 | 9/2009 | Schanz |
| 2009/0276105 A1 | 11/2009 | Lacaze et al. |
| 2009/0308412 A1 | 12/2009 | Dixon |
| 2009/0314725 A1 | 12/2009 | Parro |
| 2010/0000252 A1 | 1/2010 | Morris et al. |
| 2010/0015325 A1 | 1/2010 | Muis et al. |
| 2010/0042527 A1 | 2/2010 | Mitchell et al. |
| 2010/0063902 A1 | 3/2010 | Constantz et al. |
| 2010/0116647 A1 | 5/2010 | Kornmuller et al. |
| 2010/0119755 A1 | 5/2010 | Chung et al. |
| 2010/0126404 A1 | 5/2010 | Brennan et al. |
| 2010/0226943 A1 | 9/2010 | Brennan et al. |
| 2010/0272630 A1 | 10/2010 | Rosenbaum |
| 2010/0287073 A1 | 11/2010 | Kocis |
| 2010/0319923 A1 | 12/2010 | Slabaugh |
| 2011/0036919 A1 | 2/2011 | Baird |
| 2011/0089123 A1 | 4/2011 | Kennedy |
| 2011/0091607 A1 | 4/2011 | Szydlowski |
| 2011/0132849 A1 | 6/2011 | Husain |
| 2011/0147293 A1 | 6/2011 | Imahashi |
| 2011/0303277 A1 | 12/2011 | Neumann et al. |
| 2011/0311769 A1 | 12/2011 | Chen et al. |
| 2012/0024215 A1 | 2/2012 | Flockenhagen |
| 2012/0216875 A1 | 8/2012 | Szydlowski et al. |
| 2012/0223583 A1 | 9/2012 | Cooley et al. |
| 2012/0248878 A1 | 10/2012 | Iwanaga et al. |
| 2012/0312364 A1 | 12/2012 | Uhrich et al. |
| 2013/0026978 A1 | 1/2013 | Cooley et al. |
| 2013/0160692 A1 | 6/2013 | Skiadas |
| 2013/0175382 A1 | 7/2013 | Brutoco |
| 2013/0175404 A1 | 7/2013 | Shefer |
| 2013/0197717 A1 | 8/2013 | Fraser et al. |
| 2013/0202435 A1 | 8/2013 | Beaudoin |
| 2013/0210461 A1 | 8/2013 | Moldavsky et al. |
| 2013/0213897 A1 | 8/2013 | Jauncey et al. |
| 2013/0217822 A1 | 8/2013 | Hofmann et al. |
| 2013/0220205 A1 | 8/2013 | Henriksen |
| 2013/0221158 A1 | 8/2013 | Binkholder et al. |
| 2013/0228645 A1 | 9/2013 | Van Speybroeck et al. |
| 2013/0230396 A1 | 9/2013 | Wakasa et al. |
| 2013/0230747 A1 | 9/2013 | Patolsky et al. |
| 2014/0014188 A1 | 1/2014 | Szydlowski et al. |
| 2014/0033963 A1 | 2/2014 | Szydlowski et al. |
| 2014/0059979 A1 | 3/2014 | Szydlowski et al. |
| 2014/0237951 A1 | 8/2014 | Szydlowski et al. |
| 2015/0217837 A1 | 8/2015 | Szydlowski et al. |

FOREIGN PATENT DOCUMENTS

| | | |
|---|---|---|
| CN | 1079881 | 12/1993 |
| EP | 0203477 | 12/1986 |
| EP | 0538563 | 4/1993 |
| EP | 0832826 | 4/1998 |
| EP | 1006084 | 6/2000 |
| EP | 0855012 | 8/2003 |
| EP | 1447384 | 8/2004 |
| EP | 1637819 | 3/2006 |
| EP | 1723021 | 11/2006 |
| EP | 2499212 | 9/2012 |
| GB | 821195 | 9/1959 |
| JP | 2003/081177 | 3/2003 |
| WO | WO 99/28182 | 6/1999 |
| WO | WO 99/65797 | 12/1999 |
| WO | WO 00/39408 | 7/2000 |
| WO | WO 02/44089 | 6/2002 |
| WO | WO 02/074692 | 9/2002 |
| WO | WO 03/104089 | 12/2003 |
| WO | WO 2008/110762 | 9/2008 |
| WO | WO 2010/063135 | 6/2010 |
| WO | WO 2011/066193 | 6/2011 |
| WO | WO 2011/071892 | 6/2011 |
| WO | WO 2011/124222 | 10/2011 |
| WO | WO 2012/020259 | 2/2012 |
| WO | WO 2013/016440 | 1/2013 |
| WO | WO 2013/040521 | 3/2013 |

OTHER PUBLICATIONS

"Alaska Glacier Cap Bottled Water," Fine Waters, Aug. 2004, found at www.web.archive.org/web/20040809211105/www.finewaters.com/Bottled_Water/USA/Alaska_Glacier_Cap.asp, printed Sep. 30, 2010, 2 pages.

"Argonne Lab Experiment Simulates Comet Collision, The University of Chicago," Chronicle, Apr. 26, 2001, vol. 20, No. 15, 2 pages.

"Bottled Water and Energy A Fact Sheet," © 2008 Pacific Institute, www.pacinst.org/topics/water_and_sustainability/bottled_water/bottled_water_and_energy.html, printed Sep. 9, 2009, 2 pages.

"Comet discovered at a crucial ingredient for life," LATERCERA. CL, Aug. 18, 2009, (Mechanical Translation), 2 pages.

"Global Ballast Water Management Programme—The New Convention," GloBallast, 2006, 3 pages (found at www.globallast.imo.org/index.asp?page=mepc.htm).

"Report 4 of 5: Water Cigars—Greece," Hands On—The Earth Report from TVE.org, Series 2: Programme 10 of 14—WaterWays, 4 pages, 2004, www.tve.org/ho/series2/waterways_reports/watercigars_greece.html.

"Soil and Aquifer Properties and Their Effect on Groundwater," found at www.co.portage.wi.us/groundwater/undrstnd/soil.htm, printed Sep. 21, 2009, 8 pages.

"Terroir" Wikipedia, found at www.en.wikipedia.org/wiki/Terroir, printed Sep. 21, 2009, 6 pages.

"The Fiji Aquifer—450 Year Old Water," FineWaters, Nov. 2003, found at www.web.archive.org/web/20031102060856/finewaters.com/Resources/Water_Science/The_Fiji_Aquifer.asp, 1 page.

"The Problem," GloBallast, retrieved Jan. 8, 2013, 5 pages (found at: www.globallast.imo.org/index.asp?page=problem.htm).

"Water Transport Technology," MH Waters Pty Ltd., 2005, downloaded from www.mywaters.com/watertransport.html, 1 page.

"What if Greenland was Africa's water fountain?" Pruned, Oct. 2, 2006, www.pruned.blogspot.com/2006/10/what-if-greenland-was-africas-water.html, 5 pages.

"World's Most Expensive Bottled Water," Alvinology, Apr. 15, 2008, 12 pages (www.alvinology.com/2008/04/15/worlds-most-expensive-bottled-wated).

10 Thousand BC—Luxury Glacier Water, found at www.10thousandbc.com, printed Sep. 30, 2010, 3 pages.

10 Thousand BC trademark, [on line]], [retrieved on Sep. 30, 2010]. Retrieved from the Internet: URL:www.tess2.uspto.gov/bin/showfield?f=doc&state=4008:gktt2k.2.1 , 2 pages.

(56) References Cited

OTHER PUBLICATIONS

Alfredo, "Carbon Dating Bottled Water," Fine Waters Vintage, Jul. 4, 2004 found at www.finewaters.com/Bottled_Water_Etiquette/Flavor_of_Water/FineWaters_Vintage/Print.asp, 1 page.
Christner et al., "Recovery and Identification of Viable Bacteria Immured in Glacial Ice," Icarus vol. 144, Iss. 2, Apr. 2000, (Abstract) 3 pages.
Doyle "Sea-Going Water Bags to Quench World Thirst?" Reuters, Nov. 27, 2011, 4 pages.
Epica community members, "Eight glacial cycles from an Antarctic ice core," Nature, 2004, vol. 429, pp. 623-628.
Felton, "A Fashion Trend Meets a Watery Grave," The Wall Street Journal, Aug. 6, 2009, 2 pages.
Glavin et al. "Re-examination of amino acids in Antarctic micrometeorites," Advances in Space Research, 2004, vol. 33, No. 1, pp. 106-113.
Haeberli, "Absolute and Relative Age Dating of Rock Glacier Surfaces in Alpine Permafrost," European Geological Society, Geophysical Research Abstracts, Apr. 2003, vol. 5, Issue 10890, 2 pages.
Hajim, "Iceberg Hunters," Fortune, Nov. 14, 2005, 1 page.
Mascha, "The Age of Water—How Old is Your Water?" Fine Waters, Mar. 2, 2005, found at www.finewaters.com/Bottled_Water_Etiquette/Bottled_Water_History/The_Age_of_Water_How_Old_is_Your_Water/All_Pages.asp, 2 pages.
Mission 2012:Clean Water, "Contingency Plans," archived on Aug. 21,2009, available online at http://web.archive.org/web/20090821170721/http://web.mit.edu/12.000/www/m2012/finalwebsite/solution/contingency.shtml, 8 pages.
Old Water—10 Thousand BC Luxury Glacier Water, Trendhunter, found at www.trendhunter.com/trends/old-water-10-thousand-bc-luxury-g lacier-water, printed Sep. 30, 2010, 2 pages.
Thompson, "The Energy Footprint of Bottled Water," Live Science, Mar. 18, 2009, 1 page.
Zhou et al. "Evaluating the costs of desalination and water transport," Dec. 2004, www.uni-hamburg.de/Wiss/FB/15/Sustainability/DesalinationFNU41_revised.pdf, 16 pages.
Official Action for U.S. Appl. No. 11/551,125, mailed Jul. 20, 2010 Restriction Requirement, 9 pages.
Official Action for U.S. Appl. No. 11/551,125, mailed Oct. 7, 2010, 8 pages.
Notice of Allowance for U.S. Appl. No. 11/551,125, mailed Apr. 25, 2011, 9 pages.
Notice of Allowance for U.S. Appl. No. 13/213,818, mailed Jun. 6, 2012, 9 pages.
"Aqua Pacific: Fiji's Finest Mineral Water," Crystal Clear Mineral Water & Aqua Pacific, Jun. 11, 2009, [retrieved on Mar. 20, 2014], 5 pages. Retrieved from: http://web.archive.org/web/20090611120827/http://www.aquapacific.com/underground.html.
"CargoWiz Truck, Container and Pallet Loading Software," Softtruck, 2007, [retrieved on Dec. 24, 2013], 3 pages. Retrieved from: www.softtruck.com/index.htm.
"ContainerPacTM Disposable and Reusable Flexitanks," Flexitank, 2008, [retrieved on Apr. 25, 2013], 3 pages. Retrieved from: flexitank.com.au/subproducts/containerpac.html.
"Solar-powered plane completes cross-country flight," Fox News. com, Jul. 7, 2013 [retrieved on Jul. 8, 2013], 2 pages. Retrieved from: www.foxnews.com/us/2013/07/07/solar-powered-plane-completes-cross-country-flight/?test=latestnews.
"Solar powered plane completes history-making cross-country flight, lands at JFK airport," The Washington Post, Jul. 6, 2013, [retrieved on Jul. 8, 2013], 4 pages. Retrieved from: www.washingtonpost.com/politics/solar-powered-plane-has-tear-on-wing-earlier-landing-expected-in-nyc-on-final-leg-of-flight/2013/07/06/98e50c56-e69a-11e2-97c2-eee7eab7397e_story.html.
Fickling, "Australian Bladders Become New Normal for Wine Exports," Bloomberg.com, Jan. 30, 2013 [retrieved on Apr. 25, 2013], 4 pages. Retrieved from: www.bloomberg.com/news/2013-01-30/australian-bladders-become-new-normal-for-wine-exports.html.
Gardiner, "How to Load a Giant Container Ship," Wired.com, Aug. 1, 2013, [retrieved on Dec. 26, 2013], 6 pages. Retrieved from: www.wired.com/business/2013/08/qq_containership/.
Ghose, "A Year of Global Shipping Routes Mapped by GPS," Wired Science, Jan. 25, 2010, [retrieved on Jul. 25, 2013], 2 pages. Retrieved from: www.wired.com/wiredscience/2010/01/global-shipping-map/.
Scott, "Running Dry," Chemical and Engineering News, Jul. 22, 2013, pp. 11-15.
Official Action for U.S. Appl. No. 13/647,255, mailed Aug. 22, 2013, 6 pages.
Notice of Allowance for U.S. Appl. No. 13/647,255, mailed Dec. 23, 2013, 9 pages.
Notice of Allowance for U.S. Appl. No. 14/271,233, mailed Jan. 6, 2015, 12 pages.
Official Action for U.S. Appl. No. 13/222,940, mailed May 2, 2013 11 pages Restriction Requirement.
Official Action for U.S. Appl. No. 13/222,940, mailed Oct. 7, 2013, 27 pages.
Official Action for U.S. Appl. No. 13/222,940, mailed Mar. 27, 2014, 43 pages.

METHOD AND SYSTEM FOR RECOVERING AND PREPARING GLACIAL WATER

CROSS REFERENCE TO RELATED APPLICATIONS

This application is a Continuation-in-Part Application of and claims the benefit of priority from U.S. patent application Ser. No. 14/271,233 filed on May 6, 2014, which is a Continuation-in-Part Application of U.S. patent application Ser. No. 13/647,255 filed on Oct. 8, 2012, now U.S. Pat. No. 8,715,756 issued May 6, 2014, which is a Continuation Application of U.S. patent application Ser. No. 13/213,818 filed on Aug. 19, 2011, now U.S. Pat. No. 8,282,972, which is a Divisional Application of U.S. patent application Ser. No. 11/551,125 filed on Oct. 19, 2006, now U.S. Pat. No. 8,007,845, which is a Non-Provisional of U.S. patent application Ser. No. 60/728,956 filed on Oct. 21, 2005, the entire disclosures of which are hereby incorporated by reference in their entireties. This application is a Continuation-in-Part Application of and claims the benefit of priority from U.S. patent application Ser. No. 13/222,940, filed Aug. 31, 2011, which claims the benefit of U.S. Provisional Patent Application Ser. No. 61/378,811, filed Aug. 31, 2010, entitled "Method and System for Trading Water"; and U.S. Provisional Patent Application Ser. No. 61/511,208, filed Jul. 25, 2011, entitled "Method and System for Conveying Water on Oil Tanker Ships to Deliver Drinkable Water to Destinations"; all of which are hereby expressly incorporated by reference herein in their entireties.

FIELD

The present invention relates to a method and system for preparing drinking water from an ice sheet or glacial body. Specifically, the present invention provides a way to categorize and group ice contained in an ice source, then prepare the categorized and grouped ice to be consumed as a beverage having unique characteristics and properties.

BACKGROUND

It has been known for many years to utilize, e.g., Greenland inland ice as a drinking water resource within the field of refreshing drinks or soft drinks based on the recognition that upon melting, the inland ice may be distributed to consumers as some of the purest naturally occurring water in the world. However, known methods have been disadvantageous, because some of the natural purity of the ice has been lost in the preparation of the ice as drinking water, after ice has been taken out from its natural occurrence, such as an iceberg. It has been necessary to melt the ice and then bottle or pack the water in containers permitting transport and distribution of the water to consumers.

This type of processing has been applicable not only to inland ice as can be found in Greenland, but is also useful in harvesting water from a glacier. Inland ice and glaciers are formed by yearly snowfall. Snowfall accumulates and compresses in an ice shelves over the course of many years to depths reaching over 4,000 meters in some areas. As the ice layers are compressed, and in the course of thousands of years, the ice moves towards ice rims and glaciers or other terminal points of the ice shelves. The glaciers calve and at short intervals yield an iceberg, which floats out to sea. These icebergs have typically been "caught" shortly thereafter before they are decomposed into undrinkable seawater. The ice is processed for the production of drinking water of a very high purity.

Glacial ice advances then retreats from year to year depending upon the climate around the glacier and typical snow accumulation. Glacier movements and shape shifting occur over very long periods of time (i.e., hundreds to thousands of years), but within historic memory such transformations in fewer than 100 years are not known. Presently, about 10 percent of the land in the world is covered with glaciers or ice shelves. Glaciers, ice shelves, ice caps and ice sheets store approximately 75 percent of the world's fresh water supply and cover over 15 million square kilometers. These frozen bodies of water have existed, as mentioned above, for thousands upon thousands of years. In Washington State alone, glaciers provide 470 billion of gallons of water each summer to consumers. Most of this water is used for drinking and the like. Furthermore, the Antarctic ice sheet has an age of over 40 million years.

There are several known techniques to determine the age of glaciers and ice sheets. Most of these methods employ drilling an ice core from the glacier or ice sheet then counting the layers inside of the ice core, much like counting rings in a tree to determine the age of a tree. A first method of dating ice cores consists of counting the annual layers. The basis of this method lies with looking for items that vary with the seasons in a consistent manner. Of these are items that depend on the temperature (colder in the winter and warmer in the summer) and solar irradiance (less irradiance in the winter and more in the summer). Once such markers of seasonal variations are found, they can be used to find the number of years that the ice core has accumulated over. Of the temperature dependent markers, the most important is the ratio of 18O to 16O. The water molecules composed of $H_2$ (18O) evaporate less rapidly and condense more readily than water molecules composed of $H_2$ (16O). Thus, water evaporating from the ocean starts off as $H_2$ (18O) poor. As the water vapor travels towards the poles, it becomes increasingly poorer in $H_2$ (18O), since the heavier molecules tend to precipitate out first. This depletion is a temperature driven process, so the precipitation becomes more enriched with $H_2$ (16O), then is the case in the summer. Thus, each annual layer starts 18O rich, becomes 18O poor and ends up 18O rich.

A second method of dating ice cores is to use the age of previously determined markers to determine the age of various points in the ice core. This relies on accurately previously dated ice cores with accurately placed markers on them as a point of reference to determine the age of another ice core. Alternatively, this method can compare certain inclusions in an ice core with inclusions of another ice core that has been dated. Typically, inclusions are ash from volcanic eruptions and acidic layers from various weather anomalies.

There exist many other known methods of dating ice cores taken from a glacier or ice sheet. Furthermore, gases collected that were trapped inside of a layer of a given ice core can be dated using standard carbon 14 and/or chlorine 36 dating. The point is that there exist many known methods to date an ice core and thus date various layers in a glacier.

SUMMARY

It is one aspect of the present invention to date such glaciers and identify the age of various layers within a glacier or ice sheet. After various layers of the glacier or ice sheet have been dated, the glacier can be mined/tapped according to known processes. The glacier ice can be recovered and segmented into various layers. Each layer corresponds to a different, now determined, age. For example, a first layer may be 100 years old whereas a second layer may be 2000 years old. Once the layers are separated according to date, each dated layer of ice can be processed for consumption as drinking water or for some other type of beverage (e.g., soda, juice, spirits, beer, wine, etc.) Consumers will readily appreciate the advantage of drinking water that existed during the time of Shakespeare, King Arthur, or Jesus, for example.

Another aspect of the present invention relates to the appreciation of how to obtain (without sophisticated chemical analysis and re-creation of waters having certain qualities and lack of pollutants, etc.), water of a very specific time period and/or geographic region. It is therefore part of the present invention that the inventor recognized the problem, which then lead to the solution. The ability to obtain water having particularly desirous aspects (whether that be an absence of present day pollutants, many of which are man made), or the presence of certain natural organic elements (i.e., perhaps pollen of plants that may now be extinct, etc.) by its nature constitutes a new process and product. Similar to the patentability derived from the "purity" of the final product, it is believed that the present inventor is the first to appreciate how to arrive at the substantially pure aspect of water derived from previously frozen ice that is over hundreds, if not thousands, if not millions of years old. Furthermore the ability to date these layers of frozen ice and generally correspond it to a given time era is also advantageous in that different properties of water corresponding to different layers may exist. While it is acknowledged that ice has been melted to derive water in the past, it has not been accomplished under conditions that preserve the pristine aspects of such water and categorize those aspects according to their date.

In accordance with embodiments of the present invention, the ice from a glacier and/or ice sheet can be cut, drilled, and/or divided into various segments. The cutting, drilling, and/or division of the segments can separate the ice into either vertically or horizontally separated segments. The segments can then be further divided by date into other segments. These dated segments are then processed under strict hygienic conditions such that the properties of the water are maintained and not polluted. In a preferred embodiment, the processing of the ice is performed under an increased atmospheric pressure and where staff must be present during the operations. The staff should wear special clothing adapted to the purpose of maintaining the hygienic properties of the water. Preferably the cutting, drilling, and/or tapping and subsequent packaging of the ice are performed in accordance with FDA current good manufacturing practice for processing and bottling of bottled drinking water, 21 CFR 129.

The ice can be drilled from the top or may be extracted from the terminus of the glacier such that the layers are taken out directly without an intermediate step as required by the vertical recovery of the ice. Furthermore, various layers of the ice can be tapped and pumped in an effort to recover the water contained therein. It is one aspect of the present invention to provide a method of processing ice from a glacier or ice sheet. The ice is extracted from the reservoir, i.e., glacier or ice sheet. The ice is then segmented and categorized by date. Thereafter, each segmented section of ice is processed separately under hygienic conditions such that the pristine aspects of the water are maintained. The water is then packaged separately and labeled according to the date from which the ice existed. For example, renaissance water that came from the early 1400 AD era is bottled separate from water that existed at the time of Christ or around 0 BC. The water may be portioned into consumable units or into larger bulk quantities. Consumable units are generally portion sizes acquired by an individual consumer. Units ranging between 0.1 liters and 10 gallons can be partitioned. More preferably, 1.5 liter to 10 liters could be the partition size of the water. Generally, the water is partitioned into individual sellable units, preferably around one-half liter to one liter, due to the categorization of the ice and subsequent processing of the ice into water comprising different properties from one batch to the next. The inventive process merits a higher selling price of water than simply cutting up ice from a glacier and melting it. Consumers may be willing to pay a premium for water that traces its roots back to the same time that Leonardo da Vinci lived, for example. Therefore, reasonable sizing of the sellable units would be desired based on the attractiveness of the process provided by the present invention.

Alternatively, water from a particular era or containing certain properties could be sold in bulk quantities. Particularly, breweries or distilleries that have a long historic tradition could purchase large batches of dated water. They could then use water that dates back to their original product in order to recreate the original beverage that they used to produce. Many breweries and the like pride themselves on not changing certain recipes over the course of many years. Some breweries and distilleries have been creating the same product for over a hundred years. These companies would be able to purchase water that existed during the days of their founders and could create, market, and sell the "original" product to consumers with literally no changes from the true original. Consumers would be willing to pay a premium for a truly original pint of Guinness® or a bottle of Lagavulin scotch made from water dating back to 1816.

Another aspect of the present invention provides a system for categorizing, extracting, processing and packaging water into different historically categorized groups. In accordance with one embodiment, a recovery station is set on or near an ice source (e.g., glacier, ice sheet, ice cap, and the like). Also included is a recovery member that is operable to transmit ice from the ice source to the recovery station. In the recovery station, the ice can then be separated and categorized according to date and processed according to the methods described above.

A further aspect of the present invention provides a method for producing bottled water from glacial ice having a predetermined age. The method includes analyzing the age of a number of layers of glacial ice within an ice source. Then a first layer, whose age is known, is extracted in either a solid or liquid state. The first layer is extracted such that other layers remain substantially undisturbed. This allows the first layer to be substantially separated from the other layers of glacial ice, thereby isolating the characteristics of the water within the first layer. After the water has been extracted it is collected and directed into a container (e.g., a bottle, bag, or the like.) Once the water from the first layer has been effectively bottled or contained, an indication in the form of a tag or label is place on or around the bottle/container to reflect the characteristics of the water that is within the bottle/container.

Still a further aspect of the present invention provides for a way of recovering and preparing dated water in an economically viable fashion. In one embodiment, a number of containers are separated and filled with water (either from the ice source itself or from another source) in a frozen or liquid state. Water from various segments of the ice source are then extracted from the ice source and then placed into different containers. Essentially, a majority of the water in each container does not need to be extracted according to the costly process described herein. However, a non-trivial amount of categorized water is also in each container such that consumers can be assured that the water they are drinking is at least partially derived from a particular time period and thus has the unique characteristics of water from that time period. The primary water that is used (i.e., the non-categorized water) should be held to the highest purity standards so that when the categorized water is added, the unique characteristics of that water are not lost or disrupted.

One embodiment of the present invention relates to the production, trading and transport of water. One embodiment of the present invention is a method of preparing water from an ice source, the method comprising: (a) selecting a water source comprising water in the form of ice, wherein the water has at least one desirable characteristic; (b) conducting water from the ice source through a plurality of filtration stages, wherein at least one of the plurality of filtration stages comprises clay; (c) identifying at least three characteristics in the water.

In one embodiment, the ice comprises at least 1000 cubic meters ($m^3$). In various embodiments, the ice is selected from the group consisting of an ice cap, a glacier, and an iceberg. In one embodiment, the desirable characteristic is that the ice is substantially free of at least one material selected from the group consisting of nitrate, nitrite, mercury, lead, arsenic, cadmium, benzene, chlorine, chromium, tetrachloroethylene, trichloroethylene, uranium, 2,4-Dichlorophenoxyacetic Acid (2,4-D), dichlorobenzene, polychlorinated biphenyls (PCBs), trihalomethanes (THMs), volatile organic compounds (VOCs), lanthanoids, actinides, and pesticides. In yet another embodiment, the ice is substantially free of at least three such materials. In various embodiments of the present invention, the characteristics in the water are selected from the group consisting of: geographic location, geological period, quality, source, purity, geological formation, treatment regimen, latitudinal characteristics, mineral content, extraterritorial content, and extraterrestrial content. In a particular embodiment, the water from the ice source comprises a quantity of glycine.

In one embodiment, the one or more filters comprise a permeability value between approximately $10^{-10}$ cm/s and approximately $10^{-3}$ cm/s. In one embodiment, the water has at least one characteristic similar to at least one characteristic of water derived from a sub-polar ice field located approximately between 15 and 60 degrees south latitude. In various embodiments, the characteristics include at least one of the characteristics selected from the group consisting of: purity, mineral content, pH, and acidity. In one embodiment, the source is evaluated to: identify that the source has a total volume of at least 10,000 cubic meters. In a further embodiment, the source is evaluated to determine the presence of glycine in at least a portion of the source. In a particular embodiment, the water is directed through a filter comprising clay. Such a step is referred to as a filtration stage. In a further embodiment, the water is filtered using primarily gravitational energy. In one embodiment, the water is filtered using only gravitational energy. In yet another embodiment, the one or more filters consist essentially of clay. In a further embodiment, the water is packaged for distribution. The present invention also discloses methods of trading water having particular characteristics. Thus, in one embodiment, a method for trading water is provided, the method generally comprising: (a) connecting a first entity desiring to obtain water having at least one specific characteristic with a second entity having possession of a source of water comprising the at least one specific characteristic; (b) conveying from the first entity to the second entity information relating to the quantity and characteristic of the desired water; (c) based on the information conveyed, transferring at least one right to a quantity of water having the desired specific characteristic that the second entity is willing to transfer, from the second entity to the first entity, wherein the second entity receives compensation in an amount related to the quantity of water covered by the transferred at least one right.

Water of the present invention has at least one specific characteristic. In one embodiment, the specific characteristic is selected from the group consisting of pH, acidity, geographic location, geological period, quality, source, purity, geological formation, treatment regimen, latitudinal characteristics, mineral content, and extraterrestrial content. In one embodiment, the water is substantially free of contaminants. In various embodiments, such contaminants are selected from the group consisting of heavy metals, including transition metals, metalloids, lanthanoids, and actinides (e.g. Mercury, Lead, Chromium, etc.), uranium, arsenic, chlorine, cadmium, benzene, chlorine, tetrachloroethylene, trichloroethylene, 2,4-Dichlorophenoxyacetic Acid (2,4-D), dichlorobenzene trihalomethanes (THM's), uranium, PCBs (polychlorinated biphenyls), nitrate, nitrite, pesticides, herbicides, volatile organic compounds (VOCs), carbon emissions from coal and petroleum fired power plants, and harmful microorganisms such as coliform bacteria, giardia, and cryptosporidium.

In various embodiments, the entities can be individuals or groups of individuals such as corporations, partnerships, agencies, non-profit agencies, and the like, or combinations thereof. Any means of connection that allows communication between the entities can be used to practice the present invention. In one embodiment, the connection is formed using at least one electronic device. In various embodiments, the at least one electronic devices includes, but is not limited to, a data transmission device, a telephone, a cellular phone, a facsimile machine, and a computer. In one embodiment, the connection is formed through an exchange. In a particular embodiment, the exchange is located within a single structure. In one embodiment, the exchange is connected to more than one individual structure.

According to the present invention, various rights in water of the present invention can be transferred between entities. In one embodiment, the right is an option to obtain title to an amount of water. In one embodiment, the right is the right to use an amount of water as an asset. In yet another embodiment, the right is title to an amount of water. In a further embodiment, the method comprises transferring physical possession of the water to an entity other than the second entity.

One of skill in the art will recognize that storage, as well as transport, of commodities is an important and necessary feature of trading systems. Thus one embodiment of the present invention is a method of delivering non-saltwater to a destination using oil tankers. Such tankers can be oil tankers or liquid natural gas (LNG) tankers. Such embodiments are generally practiced by: (a) providing a tanker with cargo at a first location and having a second location as a destination port for delivery of the cargo, wherein said cargo is delivered at said destination port such that the tanker is emptied, except for residual cargo residue left behind; (b) substantially filling the tanker with non-salt water in both a ballast section of the tanker and in a second section of the tanker that previously held cargo for transport; (c) at least partially treating said non-salt water contained in said tanker while en route to said second destination, said water treatment selected from the group consisting of at least two of the following: (i) treating the water; and (ii) segregating water treated in accordance with step i) from water that has not been treated in accordance with step i).

In one embodiment the tanker is an oil tanker. In another embodiment, the tanker is a LNG tanker. In one embodiment the cargo is oil. In another embodiment, the cargo is natural gas.

In various embodiments, the treatment step comprises at least one method selected from the group consisting of filtration through a natural clay filter, centrifugation, reverse osmosis, gravity separation, contact with a natural coagulant, adjusting pH to between about 6 to about 11, UV irradiation, and ozonation. In one embodiment, the step of segregation is accomplished by at least one of: conveying said water treated in accordance with step i) to a substantially cargo-free storage section of the oil tanker; and conveyance of said water treated in accordance with step i) to a very large bag adapted for containing water. In a further embodiment, the water is further treated upon arrival at the second location.

It is yet another aspect of the present invention to provide means for mooring, stabilizing, and/or parking devices adapted for use with the present invention. For example, U.S. Patent Application Publication No. 2004/0157513 to Dyhrberg, which is hereby incorporated by reference in its entirety, discloses a mooring system for mooring a vessel to a floor portion of a body of water. These and similar devices may be incorporated into various embodiments described herein in order to accommodate, for example, issues related to dock or on-shore storage restrictions, weather and tidal conditions, unpredictable transit times, legal and insurance issues related to positioning a device on-shore or at a dock, and physical restrictions associated with shallow water ports. As used herein, a substantially immovable object refers to mooring devices (despite their general ability to drift or float within a certain radius) as well as more traditional fixed objects such as docks, land, anchored vessels, anchors, etc.

U.S. Patent Application Publication Nos. 2014/0059979 to Szydlowski, filed on Oct. 7, 2013; 2014/0033963 to Szydlowski, filed on Oct. 9, 2013; and 2014/0014188 to Szydlowski, filed on Sep. 10, 2013, are hereby incorporated by reference herein in their entireties.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

BRIEF DESCRIPTION OF THE DRAWINGS

FIG. 17 illustrates the details of a unit that also has the combustor and the water pipe.

DETAILED DESCRIPTION

Figure 1:
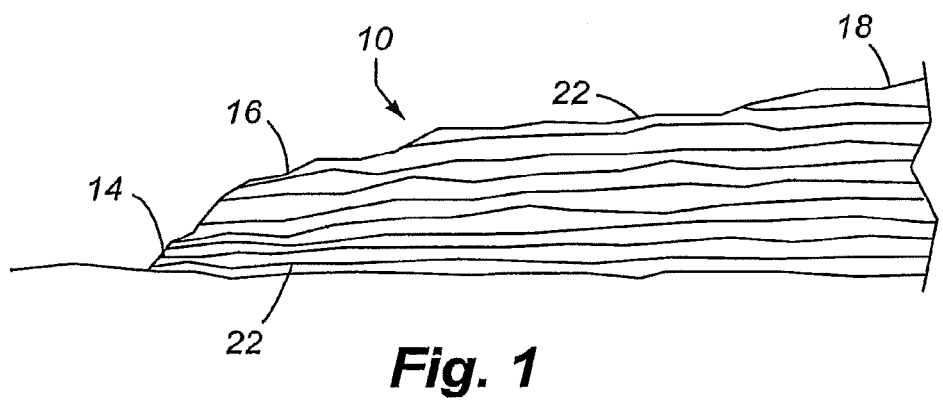
FIG. 1 depicts a cross-sectional side view of an ice source in accordance with one embodiment of the present invention.
Figure 2:
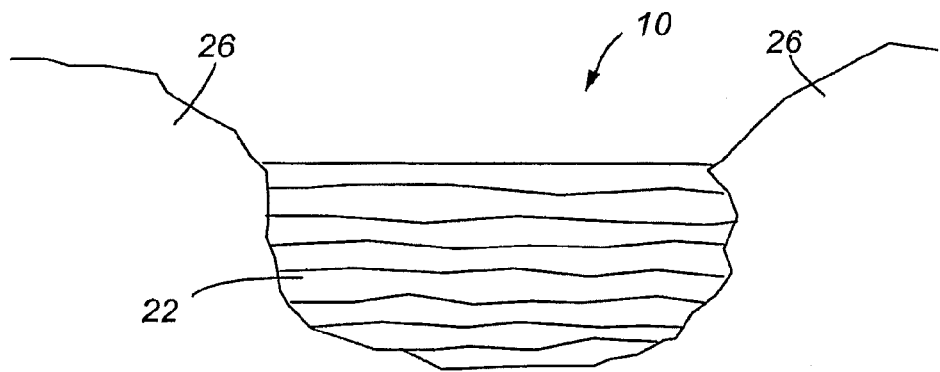
FIG. 2 depicts a cross-sectional front view of an ice source in accordance with another embodiment of the present invention.

The present invention is directed towards a method and system of recovering, grouping, and processing ice to form drinking water. With reference to FIGS. 1 and 2, an ice source 10 (e.g., glacier, ice sheet, ice cap, or the like) will be described. The ice source 10 comprises a plurality of layers 22. Each layer 22 of the ice source 10 corresponds to a different time period. Each year accumulation of precipitation in the form of typically snow fall or snow from wind and the like builds up on top of the ice source. Therefore, the further down a layer 22 is, the older it is relative to layers above it. Generally, ice and snow accumulate at the upper regions of the ice source in what is known as an accumulation zone 18. The accumulation zone 18 is typically defined by newer, less dense water. Because the ice source is made of water it flows but at a very slow rate. The ice source has a terminus 14 where the ice source ends and either land or water begins. Between the terminus 14 and the accumulation zone 18 there is an area known as the ablation area 16. Generally, the ablation area in contrast to the accumulation area is where snow, ice and the like tends to leave at a quicker rate than it accumulates. Therefore, generally older layers of ice are exposed at the surface as can be seen in FIG. 1 towards the ablation area 16 and the terminus 14 of an ice source 10. The fact that older layers of ice are exposed toward the ablation area 16 and the terminus 14 and of the ice source 10 makes it preferable to recover and process the ice towards the ablation area 16 and/or terminus 14 of the ice source 10, rather than recovering and processing the ice and/or snow from area closer to the accumulation zone 18 of the ice source 10. Generally ice sources at their terminus 14 of the source 10 are surrounded by land 26 as can be seen in FIG. 2. The layers 22 are exposed typically horizontally at the terminus or just behind the terminus 14 around the ablation area 16.

An ice source 10 is typically defined by the size and type of land that it covers. For example, and ice sheet is a dome-shaped mass of glacial ice that covers surrounding terrain and is greater than 50,000 km$^2$. An ice cap is much like and ice sheet but it covers less than 50,000 km$^2$. An ice shelf is a portion of an ice sheet that spreads out over water. A mountain glacier is a glacier that is confined by surrounding mountain terrain. Typically, glacier ice is defined by well-bonded ice crystals compacted from snow with a bulk density greater than 860 kg/m$^3$. Other types of ice sources exist other than glacial ice. Specifically, firns can also provide water. A firn is defined as a rounded, well-bonded accumulation of snow that is older than one year. Typically, firns have a density greater than 550 kg/m$^3$. Firns sometimes exist proximate to, or on top of glaciers and dated water can be recovered from them as well as from the glacier ice itself. Usually firns are located toward the accumulation zone 18 of an ice source 10.

Figure 3:
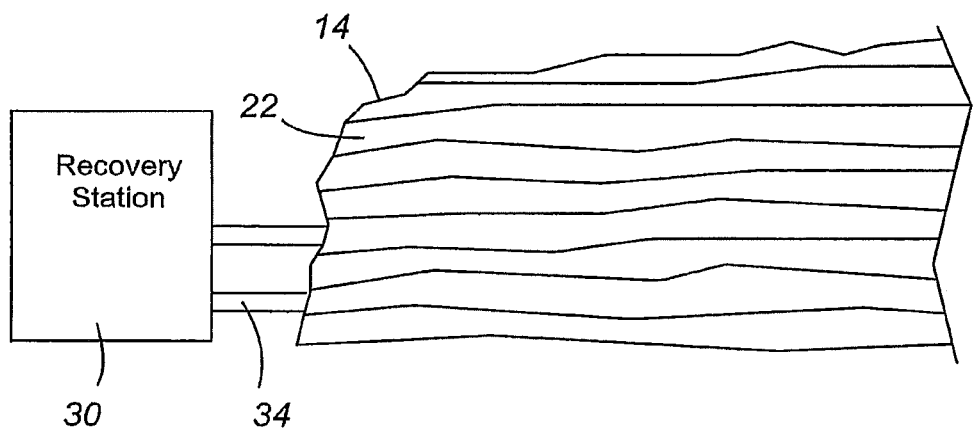
FIG. 3 depicts an ice and/or water recovery system in accordance with yet another embodiment of the present invention.

With reference to FIG. 3, one embodiment of the present invention will be described in some detail. In this embodiment, a recovery station 30 is located towards the terminus 14 of the ice source 10. The recovery station 30 may comprise, for example, a floating vessel, such as an ocean going ship. The recovery station 30 utilizes a recovery member 34 for instance, a tap and/or drill or conveyor mechanism to recover the ice and/or ice water from the ice source 10. Heating mechanisms (not shown) may also be employed as necessary to further enhance recovery of the ice/ice water. In a preferred embodiment, each layer or set of layers is processed separately thereby eliminating a separation step later in the processing of the ice. As can be appreciated, each layer 22 need not correspond to an exact year. As a matter of fact, a layer 22 of ice corresponding to a single year may be too small to be commercially exploitable because the mining of such a small layer would not yield enough product to sell. However, ice layers 22 can be grouped into a number of years, for example, a layer 22 may correspond to a span of 50 to 100 years. This would allow each layer 22 to correspond to a different century of history and may therefore appeal to different consumers. Furthermore, various layers 22 grouped into different categories based not only of their age, but on their chemical and physical properties. For example, a layer 22 may correspond to a time in history where various plants and/or other beneficial pollens were available and were therefore entrapped in the water and still are present in that layer 22. A layer higher than layer 22 may be grouped and have different properties than that of the layer below it. Therefore, layers can be grouped according not only to age but their properties. Furthermore, as the pressure continues to act on the lower ice layers, the physical properties of the layer 22 will change over time. For instance, the deionization of the water as pressure continues to push air bubbles out of the ice will result in a more pure and therefore healthier source of water.

Figure 4:
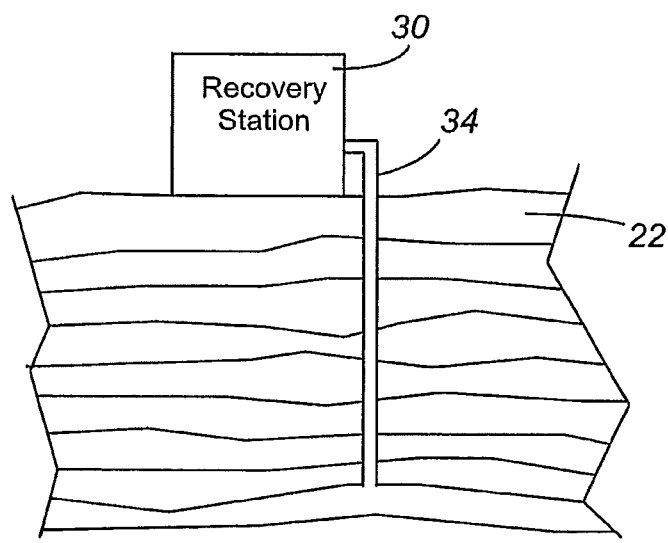
FIG. 4 depicts an ice and/or water recovery system in accordance with a further embodiment of the present invention.

With reference to FIG. 4, an alternative embodiment of the present invention will be described. In this configuration, the recovery station 30 is placed on top of the ice source 10 rather than next to it. The recovery member 34, which may be a pump, drill, set of drills, or the like, is inserted down into the ice source to recover the layers 22 of ice. This embodiment requires ice cores to be recovered then processed according to methods that will be described later. Specifically, the ice cores that are removed will need to be categorized after they are removed rather than before or during removal. In the embodiment where a recovery station is placed next to the ice source as depicted in FIG. 3, the categorization and grouping of layers 22 may be done previous to recovery of an ice layer 22. Whereas in the configuration depicted in FIG. 4, the ice cores must be removed prior to separation into groups.

There are several known methods of recovering and processing water recovered from ice sources. For example, PCT Application No. 00/39408 to Sundberg et al. describes a method and apparatus for utilizing glacier ice as drinking water, and is herein incorporated by this reference in its entirety. The apparatus comprises two stepwise operating and synchronized conveying lines, which cross each other and are perpendicular to each other. It also comprises a cutting station, a packing device, and a cutting device. Ice is cut from a glacier and packaged under hygienic conditions before it melts into liquid water. This process maintains the pristine aspects of the water retrieved from the ice source. Preferably, water is retrieved and processed from the lower layers of the ice source that potentially have more value than the upper layers that are not as old and have relatively fewer unique characteristics.

In still another embodiment of the present invention, the recovery station 30 may be a scraper, or the like, that removes layers 22 one at a time from the ice source. In this embodiment, only the new layers are used (i.e., layers less than a couple of hundred years old). If the recovery station 30 is an ice scraper or the like, the older layers may never be reached because continual accumulation on the top of the ice source 10 may preclude the recovery station 30 from ever getting below a certain depth.

Figure 5:
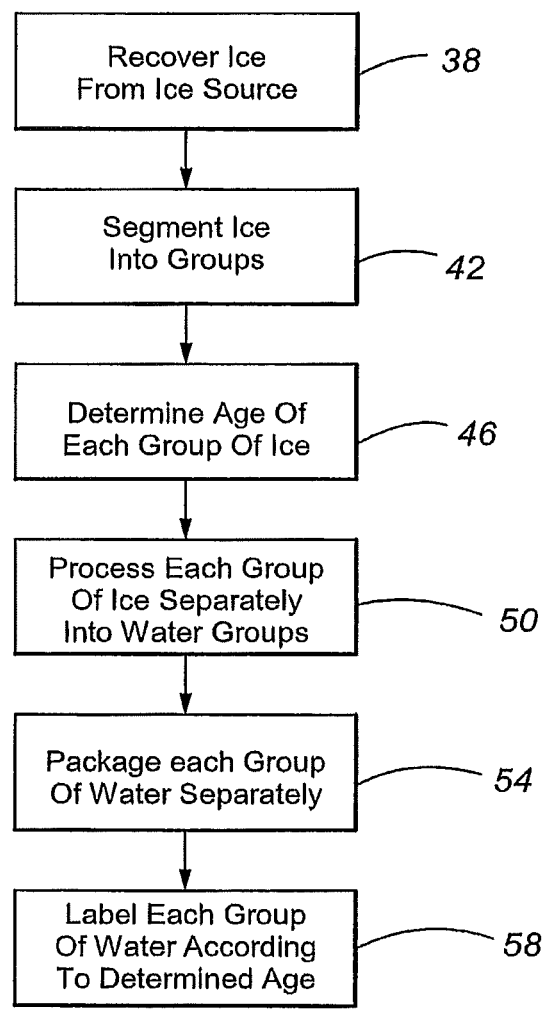
FIG. 5 is a flow chart depicting aspects of the operation of water recovery system in accordance with embodiments of the present invention in connection with grouping and separating water from an ice source.

With reference to FIG. 5, a method of categorizing and processing the ice from an ice source 10 will be described in detail. In step 38, ice is recovered from the ice source. Then the ice is segmented into groups in step 42. As described above, if the recovery station 30 is placed next to, specifically at the terminus 14 of an ice source 10, the ice may be segmented prior to recovery. However, in accordance with certain embodiments of the present invention, the ice may be removed first then segmented and grouped in step 42. In step 46, the age of each group of ice is determined. As described above, the age of the ice may have already been determined for each layer 22 and may have occurred prior to removal or mining of that particular ice layer. Once the ice is properly grouped according to either age, physical, and/or chemical properties, each grouping of ice is processed separately in step 50. Specifically, the ice is processed under hygienic and preferably sterile conditions such that contaminants are not introduced to the water thereby changing the chemical and physical properties of the water, which give it value. Preferably, the ice is processed into water groups in step 50 utilizing stainless steel materials and other sterile utensils. Then, in step 54, each group of water is packaged according to their age and/or physical and chemical properties. The water may be packaged into individual containers ranging between sizes of 0.1 liter to 10 liter. In a preferred range of 0.5 liters to 5 liters and more preferably between 1 to 2 liters.

In an alternative embodiment, a primary source of water that is not categorized and extracted as described above is mixed with an amount of categorized water that was extracted from the ice source 10. Ratios of the primary water and categorized water can vary depending on the desired selling price of the final product and the amount of available categorized water. If a consumer wishes to purchase a bottle of water made purely from dated water, then no other water is mixed with the dated water and subsequently a higher price may be demanded for the premium water. However, in order to create a more price friendly product, a larger ratio of primary water to dated water could be used.

A number of containers may be filled with amounts of the primary water in accordance with embodiments of the present invention. These containers may be placed proximate to the ice source or at a remote site. Regardless of the placement and size of the containers used an amount of dated water that has been categorized and extracted from the ice source 10 is added to a different container depending upon the characteristics of the water. For example, water from a first layer of the ice source 10 is placed into a first container with a first amount of primary water and water from a second layer of the ice source 10 is placed into a second container with a second amount of primary water. The amount of primary water used in each container may depend upon the characteristics of the dated water that is being added as well as the amount of dated water that can be recovered.

Figure 6:
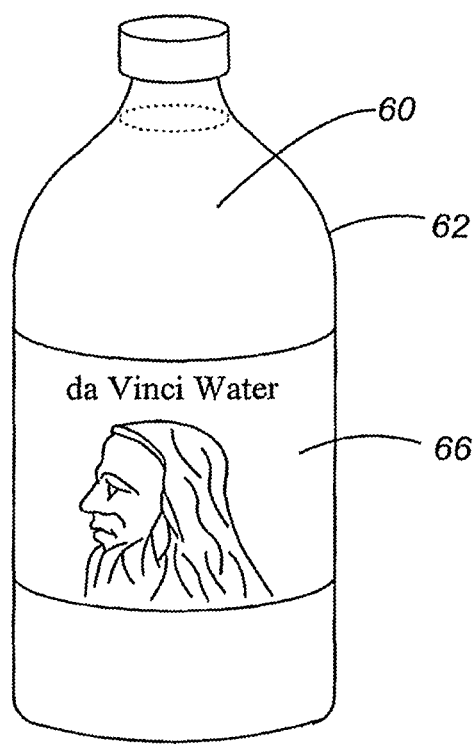
FIG. 6 depicts an exemplary final product in accordance with embodiments of the present invention.

Referring now to FIG. 6 a product produced in accordance with embodiments of the present discussion will be discussed. Ultimately, the final product is water or a beverage derived from water that has certain unique characteristics. These characteristics may include the age of the water, the chemical and/or physical properties of the water, and the taste of the water. After recovering water 60 from an ice source having these unique characteristics, the product is then bottled either in a solid or liquid state depending on the methods used to recover and process the water 60. The water 60 is collected in a container 62. Then, depending on the characteristics of the water 60, a label 66 is placed on the container 62 to provide an indication of the characteristics of the water 60. For example, water recovered from an ice source having an age of about 550 years may be labeled as "da Vinci Water" or "Renaissance Water" to reflect the characteristics of the water 60 contained within the container 62.

The present invention generally relates to systems and methods for producing, trading and distributing water. More specifically, the present invention is based on the realization by the inventors that water having specific characteristics, methods of trading such water, and methods of transporting such water, provide benefits and opportunities not obtainable from present water sources, trading methods or transportation methods. In particular, the present invention provides methods of obtaining water having particular, desirable characteristics, methods of transporting such water, and methods of trading such water in a market-responsive fashion.

At the heart of some embodiments of the present invention is the realization that water is a desirable asset, the value of which is derived mainly from its characteristics, as well as a disparity between where the desirable water is located versus where it is desired or needed. Any characteristic present in water can give it value so long as an entity exists that desires water having that characteristic. Most characteristics relate to the source of the water, how it has been, or has not been, processed, its location, its amount, or combinations thereof. Examples of such characteristics include purity (i.e., the presence of other components such as contaminants, mineral content, etc. in the water), geographical location of the water, as well as the historical time period in which the water was formed.

The value of water containing a particular characteristic, or set of characteristics, is completely dependent on the willingness of entity to exchange something of value for water containing such characteristics. Furthermore, such willingness is directly related to that entities need for the water. Because needs will vary, there is no universally optimum water. Instead, entities will seek out water having a characteristic sufficient to satisfy their need, and usually, which requires the lowest level of compensation. Thus, water of the present invention can be any water for which an entity is willing to exchange something of value in order to satisfy a need.

One characteristic of water is the source from which it is obtained. As has been discussed, one unique source of water is ice, in particular ice from ice caps and glaciers. Because of the process by which ice caps and glaciers form, and because of their age, water stored in ice caps and glaciers was frozen in place so long ago that it has unique properties not present in surface water. Thus, one embodiment of the present invention is a method of preparing water from an ice source, the method comprising:

(a) selecting a water source comprising water in the form of ice, wherein the water has at least one desirable characteristic;

(b) conducting water from the ice source through a plurality of filtration stages, wherein at least one of the plurality of filtration stages comprises clay;

(c) identifying at least three characteristics in the water.

In one embodiment the source of ice comprises at least 1000 cubic meters ($m^3$). In one embodiment the source of ice is selected from the group consisting of an ice cap, a glacier, and an iceberg. In a further embodiment, the ice is substantially free of at least one material selected from the group consisting of nitrate, nitrite, mercury, lead, arsenic, cadmium, benzene, chlorine, copper, chromium, tetrachloroethylene, trichloroethylene, uranium, 2,4-Dichlorophenoxyacetic Acid (2,4-D), dichlorobenzene, polychlorinated biphenyls (PCBs), trihalomethanes (THMs) and volatile organic compounds (VOCs). In one embodiment, the ice is substantially free of at least three such materials.

In one embodiment, the characteristics are those desirable to a consumer. In one embodiment, such characteristics are selected from the group consisting of: geographic location, geological period, quality, source, purity, geological formation, treatment regimen, latitudinal characteristics, mineral content, extraterritorial content, and extraterrestrial content.

In a further embodiment, the method comprises verifying that the water from the ice source comprises a quantity of glycine.

With further regard to water obtained from ice, one embodiment of the present invention is exemplified with reference to FIGS. 7-12.

Figure 7:
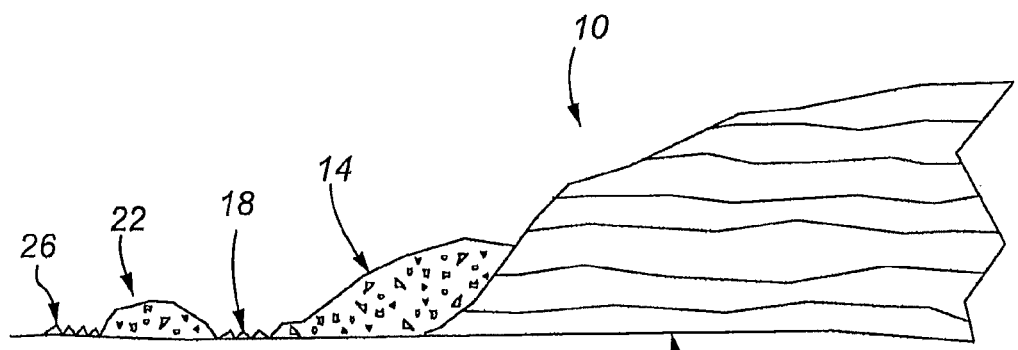
FIG. 7 is a plan view of a natural glacial melt water filtration system, utilizing gravity and additional geologic structural members to provide thorough filtration.

FIG. 7 is a plan view of glacial ice and melt water 12 as it is subjected to colloidal clay filtering. One aspect of the present invention is that the source water 10 is of a high degree of purity at the beginning of the process. With respect to the present invention, a high degree of purity refers to an ice or water source that is substantially free of harmful contaminants. While it will be recognized that certain contaminants may be more or less harmful to different individuals, substantially free of harmful contaminants with the respect to the present invention means that the source contains such a low level of contaminants as to not cause illness or harm to an adult human when up to 128 fluid ounces are consumed on a daily basis. By selecting a water source of sufficient initial purity, natural and organic filtering can be applied to produce high quality potable water without the use of sterilization chemicals or energy intensive filtration means.

It is known that soil acts as a natural filter of water. In addition to the mechanical capturing of solid particles, the term filtering in this context also involves retaining chemicals, transforming chemicals, and restricting the movement of certain substances. These acts of filtering are often known as soil attenuation. Soil attenuation includes the ability to immobilize metals and remove bacteria that may be carried into the water through such means as human or mammalian waste. It is further known that fine textured soils, such as clay, provide superior filtration of water when compared to large grained or coarse soils such as sand. Water travels through coarse soils more rapidly, thereby reducing contact between the water and soil and thus reducing filtration or attenuation. Permeability is a typical measure of a soil's ability to transmit water and other fluids. Clay is known to have a relatively low permeability as a result of its small grain size and large surface area, causing increased friction between water transmitting through the clay. Clay may have a permeability, or hydraulic conductivity, as low as $10^{-10}$ centimeters per second whereas well sorted sands and gravels typically have a permeability of $10^{-3}$ to 1 centimeter per second.

The method depicted in FIG. 7 depicts the natural process by which glacial water 18, 26 is filtered through clay deposits 14 under the force of gravity and is further subjected to additional filtering 22 through clay of the same composition that is selectively positioned by the operator of the current invention. In one embodiment of the present invention, the soil used in filtration is of permeability between 1 and $10^{-12}$ centimeters per second. In a preferred embodiment, soil used in the filtration has permeability approximately between $10^{-5}$ and $10^{-11}$ centimeters per second. In a more preferred embodiment, soil is used in the filtration process that has permeability approximately between $10^{-8}$ and $10^{-10}$ centimeters per second. Other methods of quantifying permeability, such as the Darcy unit or SI units (e.g., henry per metre: $H/m = m\ kg/s^2\ A^2$), can also be used. Such methods are known to those skilled in the art. This additional phase of clay filtration 22 is selectively implemented by the user to create an additional filtration process in an area with sufficient flow rate.

It will be recognized that this additional clay filter need not be of any particular size. Creation of the appropriate sized filter will largely be determined by the user's needs and the natural flow rate of melt water in the particular setting. By taking advantage of the gravitational potential energy of glaciers, ice caps, and the like, the present invention offers a significant advantage over traditional household and commercial filtration processes, such as reverse osmosis, in that the current process does not require energy input generated from hydrocarbon sources. While it will be recognized that initial construction of additional clay filtration stages 22 may potentially require energy input from hydrocarbon fuels, renewable energy sources including human power, or other input, it is an object of the present invention that these filtration stages will operate under the energy provided by gravitational potential energy and the kinetic energy of ice and water.

Figure 8:
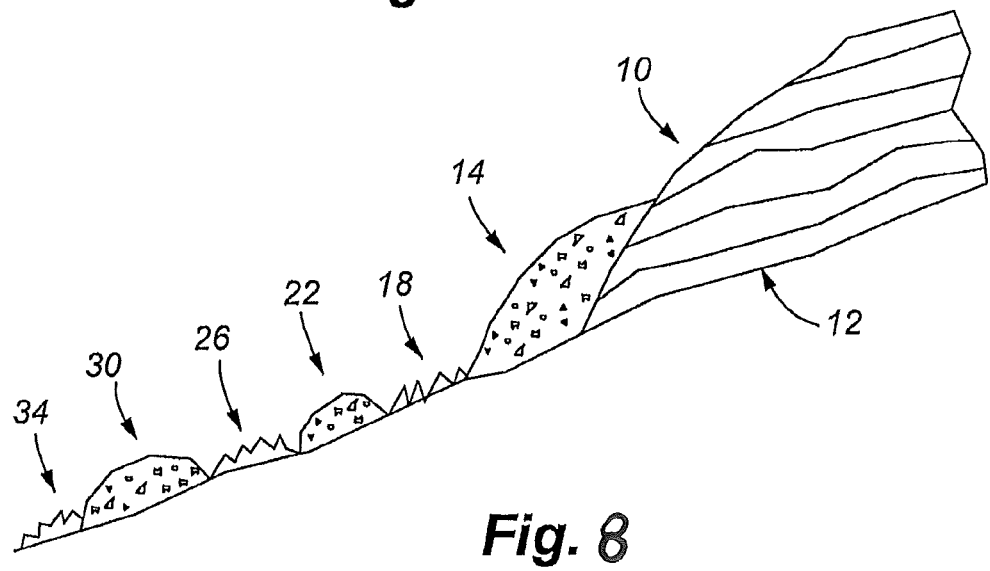
FIG. 8 is a plan view of an embodiment of the present invention using multiple iterations of natural filtration for glacial melt waters.

FIG. 8 depicts an embodiment of the present invention where a plurality of additional clay filters 22, 30 have been constructed to further filter and purify glacial water. It will be known to one of skill in the art that any number of additional filtration phases may be constructed. Accordingly, the present invention may be accomplished as described herein with any feasible number of filters.

Figure 9:
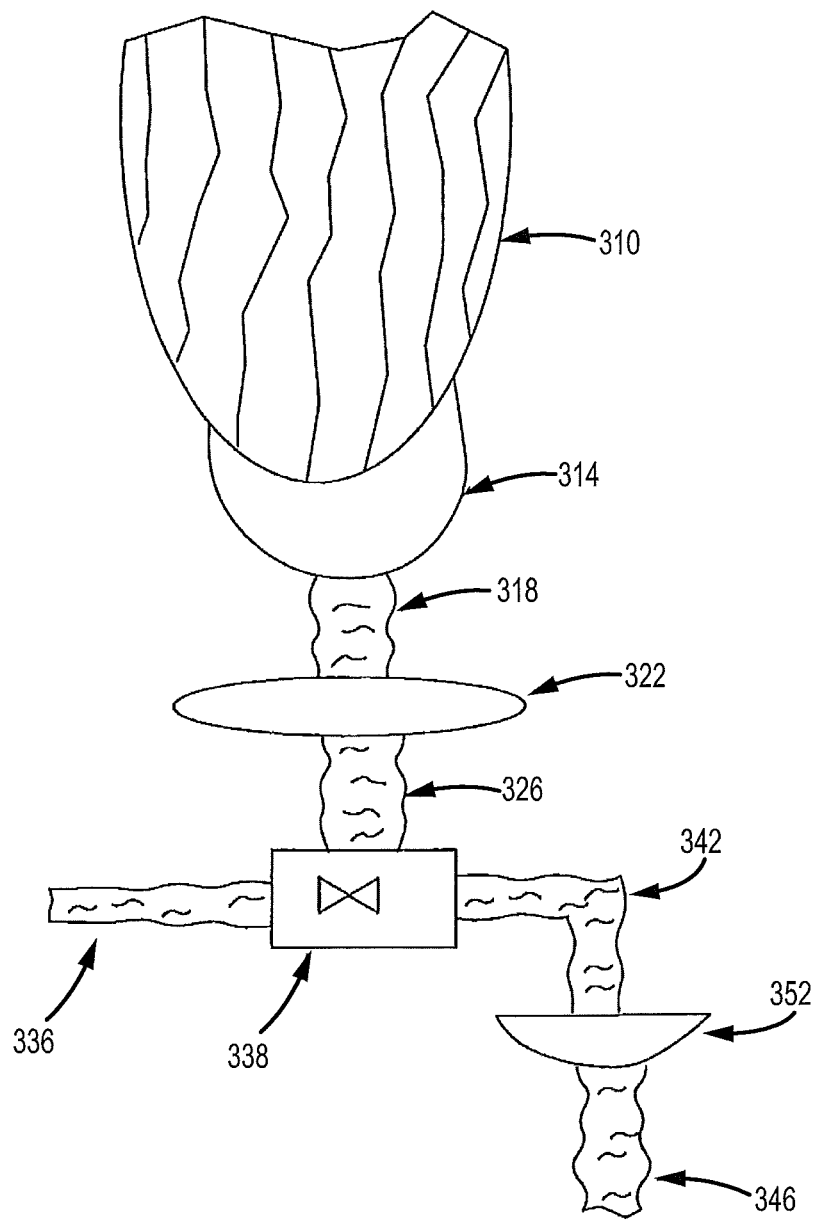
FIG. 9 is a top view of an embodiment of the present invention where glacial ice or water may be selectively diverted through various filters.

FIG. 9 depicts another embodiment of the present invention where the source ice or water 310 is filtered through natural clay 314, further filtered through a constructed additional clay filter 322, and selectively diverted by a diversion device 338 (such as, for example, a valve, tap, switch or gate) based on whether or not additional filtration is desired.

The diversion device 338 may be selectively adjusted to divert water and ice 336 that the user does not desire to undergo additional filtration to bottling or processing facilities. Alternatively, the diversion device 338 may also be selectively positioned so that water and ice 326 are subjected to further constructed filter iterations 32. The resulting water and ice 346 may then be diverted to processing and bottling facilities, subjected to further filtrations, or subjected to additional control valve and filtration steps as previously described.

Figure 10:
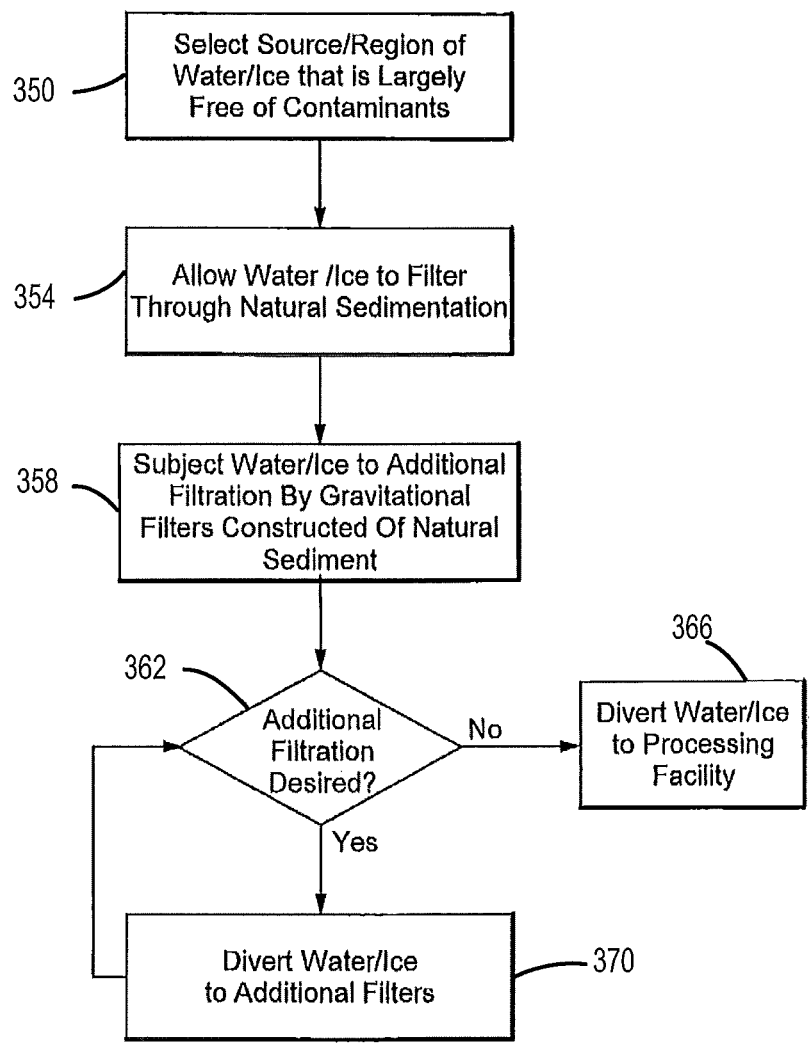
FIG. 10 is a flowchart illustrating one embodiment of the present invention where natural potable water is obtained from glacial ice.

FIG. 10 depicts a flowchart describing one embodiment the present invention. The initial step 350 involves selecting an ice source, such as a glacial body or ice cap, of sufficient purity. While it will be recognized that many natural sources of water and ice contain some level of impurity, one embodiment of the present invention contemplates a source that is generally untouched by human and/or mammalian beings and located in latitudes where emissions from industrialized nations have very little impact. While various embodiments of the present invention are not limited to application in any particular region, glacial ice and ice caps south of 15 degrees latitude are well suited for this process. Once a water source is identified, one embodiment of the present invention contemplates allowing the glacial ice and melt water to channel naturally through sediment in its surroundings 354. Ideally, this sediment is composed of clay or similar soil which provides a low permeability and naturally filters the water. After this first step of filtration has occurred, the resulting water is then passed through additional man-made sedimentary filters 358. In this regard, man-made can refer to filters comprising natural materials, but which have been constructed to further filter the water. In one embodiment of the present invention, these filters comprise the same or similar clay-like soil as in process 354. The water may either be selectively diverted to the additional man-made filters, or the filters may be constructed in the natural path of the water. It is a critical feature of some embodiments of the present invention that this sedimentary filtration 354, 358 is powered solely by gravitational forces. One benefit that will be recognized is the reduced or eliminated need to provide energy input to achieve filtration. Decision block 362 involves a determination of whether the water and ice should be subjected to additional sedimentary filters or diverted to a facility for processing and/or bottling. If additional filtration is not desired, the water may be diverted by, for example, diversion device 338 to the processing or bottling facility 366. One of ordinary skill in the art will realize that this diversion device may be comprised of a gate valve, ball valve, globe valve, three-way valve, or any valve suitable for diverting water or ice. If additional filtration is desired, the valve may be selectively positioned to divert the water or ice to additional sedimentary filters of the previously discussed composition 370.

Figure 11:
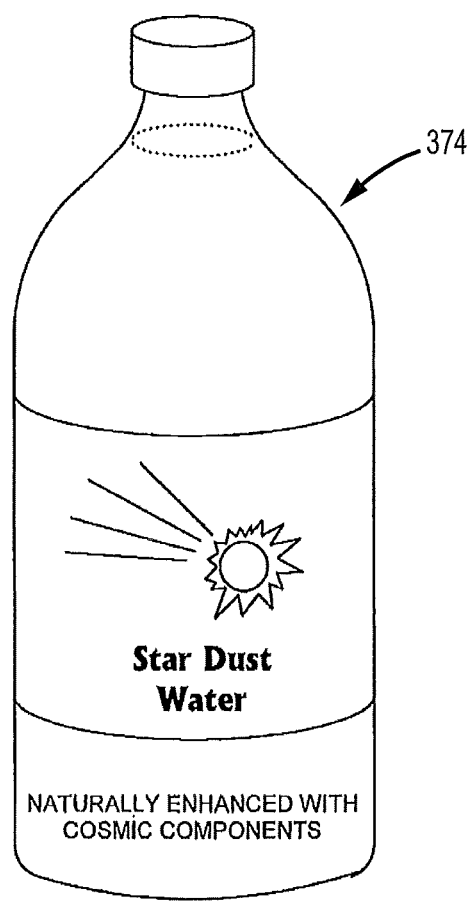
FIG. 11 depicts an exemplary final product in accordance with embodiments of the present invention.
Figure 12:
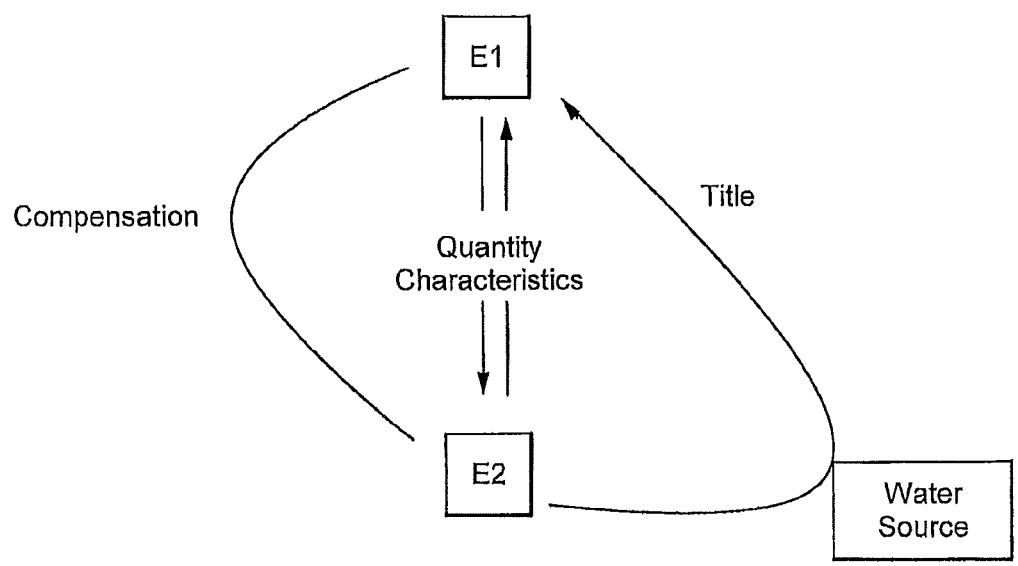
FIG. 12 exemplifies trading of water between two entities.

FIG. 11 depicts an exemplary final product 374 of the present invention whereby clean, filtered, potable water is produced without the use of sterilizing chemicals, such as chlorine or iodine, or energy intensive filtration processes. A benefit of the present invention is the ability to produce pure, potable water without destroying, filtering, or eliminating desirable active contents. By filtering the source water by natural sedimentary processes, it is possible to market a product that may contain amino acids, such as glycine and other amino acids traceable to extraterrestrial bodies. With respect to the present invention, extraterrestrial bodies refer to comets, meteors, and other similar bodies. The prospect of producing pure, healthy water with prospect of drinking the original building blocks of life on Earth holds significant commercial appeal.

Another characteristic that affects the value of water is the relative purity of the water. In this regard, purity refers to the presence of molecules, other than water molecules, in the water. Water that contains nothing but water molecules would be considered 100% pure water. Any molecule present in the water, other than a water molecule, reduces the purity of the water. Purity can be measured using techniques known in the art including, but not limited to, refractive index, color, turbidity, conductivity and pH. Moreover, purity can be reported in units such as, for example, percent on a volume per volume or weight per volume basis (e.g., less than 0.01% contamination, less than 0.5% contamination, less than 1% contamination, less than 5% contamination, less than 10% contamination, etc.), concentration (e.g., 1 mg/ml, 5 mg/ml, 10 mg/ml, etc.), parts per million (e.g., less than 0.0001 ppm, less than 0.0005 ppm, less than 0.001 ppm, less than 0.005 ppm, less than 0.01 ppm, less than 0.05 ppm, less than 0.1 ppm, less than 0.5 ppm, less than 1 ppm, less than 5 ppm, less than 10 ppm, etc.), electrical resistivity (e.g., at least 0.01 meagohm, at least 0.02 megaohms, at least 0.05 megaohms, at least 0.1 megaohms, at least 0.5 megaohms, at least 1 megaohm, at least 5 megaohms, at least 10 megaohms, at least 15 megaohms etc.), or electrical conductivity (e.g., less than 100 micro Siemens/cm [$\mu$S/cm], less than 50 $\mu$S/cm, less than 25 $\mu$S/cm, less than 10 $\mu$S/cm, less than 5 $\mu$S/cm, less than 1 $\mu$S/cm, less than 0.5 $\mu$S/cm, less than 0.1 $\mu$S/cm, less than 0.05 $\mu$S/cm, less than 0.01 $\mu$S/cm). Methods of determining and adequately reporting purity are known to those skilled in the art.

From the above discussion, it will be appreciated that different grades of water exist, the grade being based on the amount of contaminants present in the water. A relative grading scale can be envisioned in which water having the highest purity is on one end, or top, of the scale, and water having the lowest purity being on the opposite end, or bottom, of the scale. Such a grading scale is useful for characterizing water having different levels of non-water molecule (i.e., contaminant or pollutant) content.

Water of all grades has a use, and the purity, or grade, of water desired will affect on the use for which the water is intended. For example, the manufacture of semiconductors requires ultrapure water (UPW). While no exact definition exists for UPW, such water is viewed as the "cleanest" water on the planet. That is, UPW water is viewed as being as close to 100% pure water as currently possible.

As a further example, drinking water would be found further down on the grading scale. While water for drinking may be casually referred to as pure, it almost always contains other compounds such as, for example, minerals. However, since such minerals are not harmful, and in fact may be beneficial, in the amounts being consumed, such water is considered adequate for drinking In another example, sewage water, which contains waste from toilets, showers, etc., along with fluid from industrial waste, and thus contains numerous and copious amounts of contaminants, would be even further down on the scale. The grade of a water may have no relation to the value of that water since, as noted above, the value of the water is directly related to an entities willingness to exchange something of value for the water, which itself is related to the need for such water. Thus, water of all grades has a use and thus, has some value. For example, when the reactor cores at the Fukushima Daiichi nuclear plant in Japan became exposed, there was a need for large quantities of water with which to cool the overheating cores. Thus, seawater, which was of a grade that would normally be considered of little value, was used to cool the reactor cores. At that point in time, while the grade of the water did not change, its value was raised simply due to an increased need for its characteristics, in particular its ability to cool reactor cores and its abundance. Thus, it is seen that the value of water is directly tied to the need for its characteristics. It is further seen that the value of water is tied to the desire for water having specific characteristics.

Returning to the grading scale, it will be appreciated that numerous types of water, having various grades, exist between the ends of the scale. The grading of water can be based on such things, for example, as the concentration of solid and or liquid contaminant in the water, the danger posed to life by a contaminant in the water, or the ease of removing a contaminant. Examples of types of water that can be graded using such a scale include, but are not limited to, seawater, water mixed with oil, water mixed with industrial chemicals, water recovered from fermentation reactions, pond water, lake water, river water, water recovered from cooling equipment (e.g., cooling water from a nuclear reactor), and wastewater. In this context, wastewater refers to water held by an entity that is no longer considered useful for the purposes of that entity. Examples of wastewater include, but are not limited to, wastewater from beverage production facilities, wastewater from food production facilities, wastewater from paper production facilities, wastewater from fiber and/or clothing production facilities, wastewater from leather production facilities, wastewater from a slaughter house, wastewater from chemical production facilities, wastewater from refineries, wastewater from electronic component production facilities, and wastewater from agricultural facilities. It will be appreciated that while such water is referred to as wastewater, such water may be useful for uses other than the original use of the "cleaner" water. For example, wastewater from fermentation reactions may be useful to an entity looking for a cheap source of fertilizer.

Figure 13:
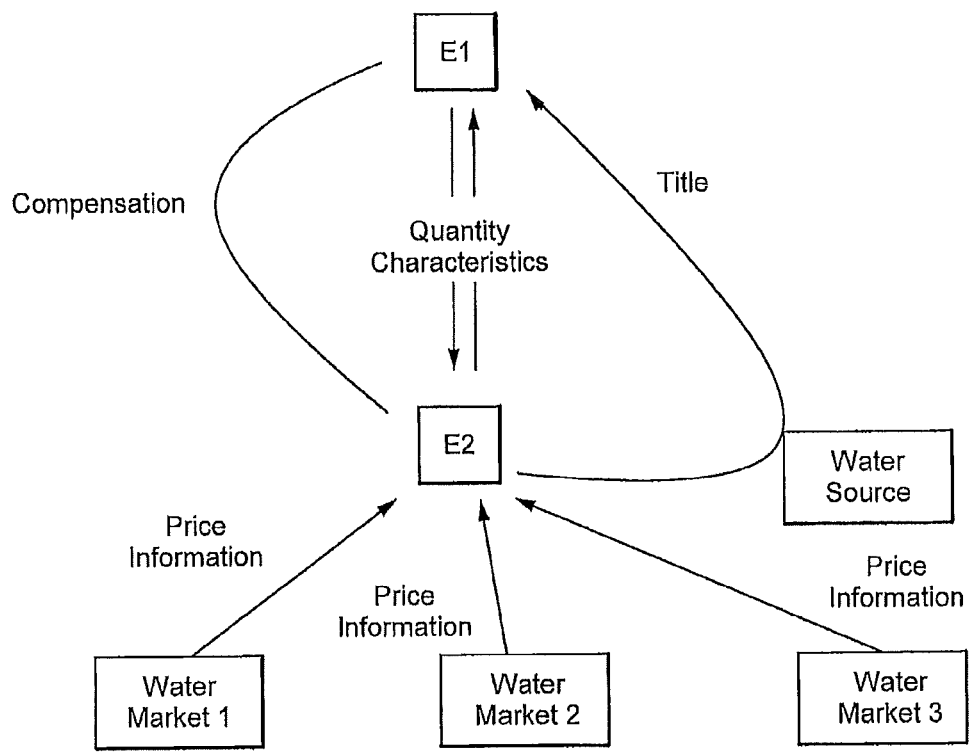
FIG. 13 exemplifies the use of external markets for determining compensation.

Because water of the present invention has desirable characteristics, it has value to entities desiring such water and therefore represents an asset capable of being traded. Thus, a key feature of the present invention is a method for trading water of the present invention. In this regard, one embodiment of the present invention is illustrated in FIG. 13. The illustrated embodiment is a method generally practiced by: (a) connecting a first entity (E1) desiring to obtain water having at least one desirable characteristic with a second entity (E2) having possession of a source of water comprising the at least one desirable characteristic; (b) conveying from the first entity to the second entity information relating to the quantity and characteristic of the desired water; (c) based on the information conveyed, transferring title to a quantity of water having the desired specific characteristic that the second entity is willing to transfer, from the second entity to the first entity, wherein the second entity receives compensation in an amount related to the quantity of water covered by the transferred title.

In one embodiment, a method of the present invention is practiced according to FIG. 7. That is, the method comprises:

(a) connecting a first entity (E1) desiring to obtain water having at least one desirable characteristic with a second entity (E2) having possession of a source of water comprising the at least one desirable characteristic;

(b) conveying from the first entity to the second entity information relating to the quantity and desirable characteristic of the water;

(c) based on the information conveyed, granting an option to take title to a quantity of water having the desired specific characteristic, by the second entity to the first entity, wherein the granting of the option comprises an agreement by both entities that the second entity will receive compensation in an amount related to the quantity of water covered by option.

According to the present invention, the entities involved in the claimed methods can be individuals or groups of individuals such as, for example, corporations, partnerships, agencies, non-profit agencies, and the like, or combinations thereof. Moreover it should be noted that the composition of one entity of the claimed method is independent of the composition of the other entity. That is, for example, the first entity may be an individual while the second entity may be a company. Any such combination is contemplated. Moreover, the role performed by the two entities of the claimed method may be conducted by the same individual or group of individuals, as such an arrangement offers certain advantages. By way of example and in further support of the present disclosure, U.S. Patent Application Publication No. 2010/0063902 to Constantz et al. is incorporated herein by reference in its entirety.

In one embodiment, a method of trading and transporting water is provided, the method generally comprising a trading platform for identifying areas of high water supply and/or low value supply. In various embodiments, the platform, which may take the form of an electronic database, identifies areas of low water supplies and/or areas where water would be considered "high value." For example, in various embodiments, a method and system of the present invention may comprise a platform for determining areas or entities having large quantities of water available for shipment Water trading platforms, such as those available through Waterfind Water Market Specialists of Australia, are generally known for bringing potential buyers and sellers of water and/or water rights together. Various features, systems, and methods of the present invention further contemplate connecting individuals and entities across great distances and transporting or conveying water across such distances. Accordingly, various features, systems, and methods of the present invention provide worldwide liquidity to any number of water markets. In various embodiments, water trading is expanded beyond simple irrigation districts, watersheds, counties, and even countries. The present invention contemplates a global water market wherein buyers and sellers are connected regardless of spatial relationships. Thus, for example, whereas relatively small regions having disparate climates and water supplies/needs may benefit from traditional water rights trading systems (e.g. where water may be diverted through local infrastructure), the present invention contemplates connecting individuals, entities, and states whether they be separated by a matter of feet or a few thousand miles.

As used herein, the terms connecting, connect, linking, link, and the like mean that the two entities interact in within a system in such a way as to allow a two-way transfer of information. The system can be any means of connection that allows a communication between the entities. In one embodiment, the connection is formed using an electronic device. Any electronic device is suitable so long as it allows communication between the entities. Examples of useful electronic devices include, but are not limited to, data transmission devices, telephones, cellular phones, facsimile machines, computers, and the like.

In one embodiment of the present invention, the two entities connect through an exchange. As used herein, an exchange is a system where assets such as, for example, stocks, bonds, options, futures, commodities, and the like, are traded. Entities having or desiring assets connect in the exchange to trade ownership in the assets for compensation. In one embodiment of the present invention, an exchange is envisioned as trading water, options, ownership rights therein, and the like, although the trade of other stocks, bonds, options and futures, commodities and the like, may also occur within the same exchange. Such an exchange can be located at one or more physical locations that may or may not be connected by means of communication, such as, for example, telephone or data transmission lines. In one embodiment, the exchange lacks a physical location, such as a building devoted exclusively to the exchange, and exists solely on a data transmission network such as a computer network. It should also be understood that an exchange may refer to an existing exchange (e.g., The New York Stock Exchange, The Chicago Mercantile Exchange, etc.), or it may refer to an entirely new exchange.

With regard to the present invention, water refers to water having one or more characteristic that renders it desirable to a consuming population. In one embodiment, the characteristic possessed by the water has high degree of purity. A high degree of purity refers to water that is substantially free of harmful contaminants. A contaminant is any substance in the water deemed undesirable by the purchaser of the water. Examples of contaminants include, but are not limited to, for example, heavy metals, including transition metals, metalloids, lanthanoids, and actinides (e.g. Mercury, Lead, Chromium, etc.), uranium, arsenic, chlorine, trihalomethanes (THM's), uranium, PCBs (polychlorinated biphenyls), nitrate, nitrite, pesticides, herbicides, volatile organic compounds, carbon emissions from coal and petroleum fired power plants, and microorganisms such as, for example, coliform bacteria, giardia, and cryptosporidium. While it will be recognized that certain contaminants may be more or less harmful to different individuals, substantially free of harmful contaminants means that the source contains such a low level of contaminants as to not cause illness or harm to an adult human when up to 128 fluid ounces are consumed on a daily basis. Methods of determining and quantifying purity are known in the art and have been discussed herein.

In one embodiment of the present invention, the high level of purity is the result of natural processes such as, for example, filtration through soil. By selecting a water source of sufficient initial purity, natural and organic filtering can be applied to produce high quality potable water without the use of sterilization chemicals or energy intensive filtration means.

As has been discussed, FIG. 7 depicts the natural process by which glacial water 18, 26 is filtered through clay deposits 14 under the force of gravity and is further subjected to additional filtering 22 through clay of the same composition that may or may not be selectively positioned by the operator of the current invention. In one embodiment of the present invention, the soil used in filtration is of permeability between 1 and $10^{-12}$ centimeters per second. In a preferred embodiment, soil used in the filtration has permeability approximately between $10^{-5}$ and $10^{-11}$ centimeters per second. In a more preferred embodiment, soil is used in the filtration process that has permeability approximately between $10^{-8}$ and $10^{-10}$ centimeters per second. This additional phase of clay filtration 22 can be selectively implemented by the user to create an additional filtration process in an area with sufficient flow rate.

It will be recognized that this additional clay filter need not be of any particular size. Creation of the appropriate sized filter will largely be determined by the user's needs and the natural flow rate of melt water in the particular setting. By taking advantage of the gravitational potential energy of glaciers, ice caps, and the like, the present invention offers a significant advantage over traditional household and commercial filtration processes, such as reverse osmosis, in that the current process does not require energy input generated from hydrocarbon sources. While it will be recognized that initial construction of additional clay filtration stages 22 may potentially require energy input from hydrocarbon fuels, renewable energy sources including human power, or other input, it is an object of the present invention that these filtration stages will operate under the energy provided by gravitational potential energy and the kinetic energy of ice and water.

FIG. 8 depicts an embodiment of the present invention where a plurality of additional clay filters 22, 30 have been constructed to further filter and purify glacial water. It will be known to one of skill in the art that any number of additional filtration phases may be constructed. Accordingly, the present invention may be accomplished as described herein with any feasible number of filters.

FIG. 9 depicts another embodiment of the present invention where the source ice or water 10 is filtered through natural clay 14, further filtered through a constructed additional clay filter 22, and selectively diverted by a control valve 38 based on whether or not additional filtration is desired. The control valve 38 may be selectively adjusted to divert water and ice 36 that the user does not desire to undergo additional filtration to bottling or processing facilities. Alternatively, the control valve 38 may also be selectively positioned so that water and ice 26 are subjected to further constructed filter iterations 32. The resulting water and ice 46 may then be diverted to processing and bottling facilities, subjected to further filtrations, or subjected to additional control valve and filtration steps as previously described.

In one embodiment, the characteristic possessed by the water is that it is from a specified time period. The ability to trade water from previously frozen ice that is over hundreds, if not thousands, if not millions of years old, by its nature constitutes a new process and product. Furthermore the ability to date these layers of frozen ice and generally correspond it to a given time era is advantageous in that different properties of water corresponding to different layers may exist. Such properties can be used as the basis for satisfying different consumer markets. While it is acknowledged that ice has been melted to derive water in the past, it has not been accomplished under conditions that preserve the pristine aspects of such water and categorize those aspects according to their date. While the present invention is not limited to any particular region, ice caps and glacial ice south of 15 degrees latitude are well suited for the claimed method.

In accordance with embodiments of the present invention, the ice from a glacier and/or ice sheet can be cut, drilled, and/or divided into various segments. The cutting, drilling, and/or division of the segments can separate the ice into either vertically or horizontally separated segments. The segments can then be further divided by date into other segments. These dated segments are then processed under strict hygienic conditions such that the properties of the water are maintained and not polluted. In a preferred embodiment, the processing of the ice is performed under an increased atmospheric pressure and where staff must be present during the operations. The staff should wear special clothing adapted to the purpose of maintaining the hygienic properties of the water. Preferably the cutting, drilling, and/or tapping and subsequent packaging of the ice are performed in accordance with FDA current good manufacturing practice for processing and bottling of bottled drinking water, 21 CFR 129.

The ice can be drilled from the top or may be extracted from the terminus of the glacier such that the layers are taken out directly without an intermediate step as required by the vertical recovery of the ice. Furthermore, various layers of the ice can be tapped and pumped in an effort to recover the water contained therein. It is one aspect of the present invention to provide a method of processing ice from a glacier or ice sheet. The ice is extracted from the reservoir, i.e., glacier or ice sheet. The ice is then segmented and categorized by date. Thereafter, each segmented section of ice is processed separately under hygienic conditions such that the pristine aspects of the water are maintained. The water is then packaged separately and labeled according to the date from which the ice existed. For example, renaissance water that came from the early 1400 AD era is bottled separate from water that existed at the time of Christ or around 0 BC. The water may be portioned into any desired amounts (e.g., consumable units, bulk quantities, etc.). Consumable units are generally portion sizes acquired by an individual consumer. In one embodiment, the water is portioned into about one-half liter to one liter volumes, due to the categorization of the ice and subsequent processing of the ice into water comprising different properties from one batch to the next. Such water can then be traded based on the uniqueness of its properties. The inventive process merits a higher selling price of water than simply cutting up ice from a glacier and melting it. Consumers may be willing to pay a premium for water that traces its roots back to the same time that Leonardo da Vinci lived, for example. Therefore, reasonable sizing of the sellable units would be desired based on the attractiveness of the process provided by the present invention.

Alternatively, water from a particular era or containing certain properties could be sold in bulk quantities. Particularly, breweries or distilleries that have a long historic tradition could purchase large batches of dated water. They could then use water that dates back to their original product in order to recreate the original beverage that they used to produce. Many breweries and the like pride themselves on not changing certain recipes over the course of many years. Some breweries and distilleries have been creating the same product for over a hundred years. These companies would be able to purchase water that existed during the days of their founders and could create, market, and sell the "original" product to consumers with literally no changes from the true original. Consumers would be willing to pay a premium for a truly original pint of Guinness® or a bottle of Lagavulin scotch made from water dating back to 1816. Moreover, wastewater generated in the production of the final product, could be traded in an exchange with an entity looking for such water.

Another aspect of the present invention provides a system for categorizing, extracting, processing and packaging water into different historically categorized groups. In accordance with one embodiment, a recovery station is set on or near an ice source (e.g., glacier, ice sheet, ice cap, and the like). Also included is a recovery member that is operable to transmit ice from the ice source to the recovery station. In the recovery station, the ice can then be separated and categorized according to date and processed according to the methods described above.

A further aspect of the present invention provides a method for producing packaged water from glacial ice having a predetermined age. The method includes analyzing the age of a number of layers of glacial ice within an ice source. Then a first layer, whose age is known, is extracted in either a solid or liquid state. The first layer is extracted such that other layers remain substantially undisturbed. This allows the first layer to be substantially separated from the other layers of glacial ice, thereby isolating the characteristics of the water within the first layer. After the water has been extracted it is collected and directed into a container (e.g., a bottle, bag, or the like.) Once the water from the first layer has been effectively packaged, an indication in the form of a tag or label is place on or around the container to reflect the characteristics of the water that is within the container.

Still a further aspect of the present invention provides for a way of recovering and preparing dated water in an economically viable fashion. In one embodiment, a number of containers are separated and filled with water (either from the ice source itself or from another source) in a frozen or liquid state. Water from various segments of the ice source are then extracted from the ice source and then placed into different containers. Essentially, a majority of the water in each container does not need to be extracted according to the costly process described herein. However, a non-trivial amount of categorized water is also in each container such that consumers can be assured that the water they are drinking is at least partially derived from a particular time period and thus has the unique characteristics of water from that time period. The primary water that is used (i.e., the non-categorized water) should be held to the highest purity standards so that when the categorized water is added, the unique characteristics of that water are not lost or disrupted.

In one embodiment of the present invention, the characteristic possessed by the water is the presence of extraterrestrial-derived components. Such components include, but are not limited to, molecules such as amino acids and other organic molecule, that are derived from comets, asteroids, and the like. One example of such a component is glycine, a basic component of proteins. While the details of the potential health benefits of such components have yet to be evaluated, there exists a viable market for unadulterated drinking water which could reasonably be calculated to contain glycine and primordial building blocks of life. In addition to the commercially appealing aspects of consuming the origins of life itself, glycine is known to produce a sweet taste for humans.

In one embodiment of the present invention, the water is sequestered in a form suitable for long term storage that does not affect the unique characteristics of the water. In one embodiment, the water is sequestered as ice. In a particular embodiment, the water is sequestered as glacial ice. In yet another embodiment, the water is sequestered in a polar ice cap. Various combinations of such sequestration means are also included in the present invention.

In one aspect of the present invention, information regarding, at least, the desired quantity and characteristic of the water being traded, is conveyed between the two entities. Such conveyance refers to the transfer of information using means disclosed herein. The conveyance of such information can also be referred to, for example, as an order or a purchase order. Such orders will contain, at least, the quantity of water desired by the buyer, or the characteristic desired by the buyer. With regard to quantity, also referred to as a tradable unit, the water can be portioned into any suitable volume. For example, the water may be portioned into the previously mentioned consumable units, or it may be traded in bulk quantities. Examples of useful tradable units included, but are not limited to, about 1 liter units, about 5 liter units, about 10 liter units, about 50 liter units, about 100 liter units, about 500 liter units, about 1000 liter units, about 5000 liter units, about 10,000 liter units, about 50,000 liter units, about 100,000 liter units, 500,000 liter units or 1,000,000 liter units. Larger volumes are also envisioned. It should also be appreciated that tradable units can be in volumes using other systems of measurement. For example, such volumes can be measured in pints, quarts, gallons, liters, cubic meters, tons, metric tons, ferkins, kilderkins, barrels. Appropriate measures of volume are known to those skilled in the art.

Orders can also contain information about the characteristic of the water desired by the buyer. Such characteristics have been disclosed herein. However, it should be appreciated that the water being traded can have more than one of the disclosed characteristics. Furthermore, in addition to the characteristics disclosed herein, the water can have other characteristics not mentioned herein. It will be understood by those in the field that orders can contain information relating to topics other than quantity and characteristics of the water being traded. For example, an order may contain information relating to the date of transfer of title of the water, the date of transfer of physical possession of the water, the location of shipment, compensation to be received by the second entity, etc.

It should also be understood that conveyance of information between the two entities may involve back and forth information exchange before the entities reach an agreement on the details of the trade (e.g., quantity and/or characteristic of the water being traded). Such back and forth information exchange may be needed simply for clarification of terms, conditions, and the like, or it may involve haggling, negotiating, discussion, and the like.

Once the entities have agreed on the specifics of the trade (e.g., quantity, characteristics, etc.), if the trade involves immediate transfer of the title, title to a volume of water having the characteristics recited in the order is transferred to the buyer. Such transfer can involve physical recordation, electronic recordation and/or transfer of title documents. Title is used under its commonly understood legal meaning, as are ownership and possession. That is, title refers to the sum total of legally recognized rights to the possession and ownership of property (e.g., water) that can be secured and enjoyed under the law. It should be understood that title can, but does not necessarily imply, rights in ownership or possession. The determination of such rights can be part of the information exchanged between the entities.

Once title has been transferred, the buyer may or may not take physical possession of the water. Physical transfer of the water can occur immediately, at a later time, or it may never occur. It is one aspect of the present invention that transfer of the title to the buyer does not necessarily indicate the buyer is the final consumer. Instead, title in the water can give the buyer the right to further transfer the title to another entity. In this aspect, transfer of the title to the buyer can be viewed as an option to take possession of the water.

As has been discussed, instead of transfer of title, a trade may involve grant of an option to purchase water at some future date. Such arrangements offer some advantages. For example, an entity may have an interest in obtaining water in the future in anticipation of a need. However, in the event the need does not materialize, the entity may allow the option to lapse, and thus save the expense of water that is no longer needed. In another example, the entity desiring to obtain water in the anticipation of a future need may get a better price than the price that exists at the time the need actually materializes. The grant of options may or may not included exchange of currency, or some other object of value, from the grantee to the grantor at the time of grant. The grant of options may also included permission for the grantee to further trade the options with an additional entity. Other such permutations of a trade are known to those skilled in the art. Details of the trade with regard to ownership, timing of the options, timing of any resulting purchases, transfer of the water, and the like, will be negotiated by the first and second entities as part of the back and forth information exchange of the trade.

As previously described, prior to trading, the water can be sequestered, for example as ice. This aspect of the present invention is very beneficial in that the water can be kept sequestered until such time as the buyer, or other party to whom title has been transferred, requests possession of the water. Thus, if the buyer takes title but decides to delay possession, the water can remain sequestered until the buyer, or other party holding title, requests possession. Alternatively, the buyer may request possession upon transfer of title, with the understanding of the practical, physical limitations involved. Nonetheless, once the entity holding title decides to take possession of the water, the seller can then go to the water source, remove the quantity of water being transferred to the title-holding entity, and transfer such volume thereto. In an embodiment where the water is sequestered as ice, the seller can remove sufficient ice, from a region of the glacier or ice cap comprising ice having the agreed upon characteristics, such that, upon melting the volume of water produced is at least the volume being transferred. This melted ice is then transferred to the title-holding entity.

In one embodiment, transfer of title also carries transfer of ownership of the water. Details regarding all rights transferred with the title can be determined during interaction of the buyer and seller.

It is an aspect of the claimed method that the seller receives compensation for transferring the water. Such compensation can be transferred to the seller at any time. In one embodiment, the seller receives the agreed upon compensation prior to transfer of title.

In one embodiment, the seller receives the agreed upon compensation simultaneous with transfer of title. In another embodiment, the seller receives the agreed upon compensation after transfer of title. Compensation can be transferred directly from the buyer to the seller, or it can involve additional entities. For example, the seller may transfer title, ownership, and/or possession of water to the buyer, but receive compensation from a third entity not involved with title, possession or ownership of the water (e.g., a bank or parent corporation). Similarly, the amount of compensation can be decided upon between the seller, the buyer, additional entities, or combinations thereof. Further, decisions on the timing of compensation may or may not be part of the order.

Compensation to the seller is an amount agreed upon between the buyer and seller. However, various tools can be used to help determine such an amount. For example, since water in various forms is sold worldwide on a daily basis, a large volume of information exists regarding the price of water. Further, such data can be linked with other characteristics (metadata) (e.g., geographic region) allowing the sorting of the price of water by such characteristics such as, for example, geography, intended use, time or date of purchase, etc. Such data is very useful in determining compensation. Thus, in one embodiment of the present invention, compensation is determined using average price data for water obtained from current water markets. In using such data, the seller obtains the selling price of water from a variety of different markets. Such an embodiment is exemplified in FIG. 7. In a preferred embodiment, the seller uses metadata to obtain the selling price of for water having characteristics related in some meaningful way (e.g., intended use, geographic location of use) to at least one characteristic of the water being transferred.

In some embodiments, the water being traded may be intended for more than one use. For example, some of the water may be used for irrigation while the rest may be used in the production of biofuel. Accordingly, the value of the water may be determined based on such mixed use. To determine such a value, each intended use of the product is given a weight. For example, if 50% of the water were being used for irrigation and 50% being used for the production of biofuel, then the value would be the sum of 0.5× the current average price for water in the biofuel industry and 0.5× the current average price for water in the irrigation market. Example markets from which current average water prices can be determined include, but are not limited to, export markets, domestic markets, desalination markets, drinking water markets, crop production markets, and biofuel production markets. Numerous variations of such markets are envisioned.

With further regard to determining a value for the water being traded, in one embodiment the value is based on a standardized index. According to the present invention, such an index is based on the values of water in various locations as well as virtual water contained in products that contain water or for which water is used in their production. For example, it can be imagined that various water products exist. Examples of such products include, but are not limited to, export markets, domestic markets, desalination markets, drinking water markets, crop production markets, and biofuel production markets. To determine a value relative to the index, various product weights are assigned based on the proportion of the water market represented by that product. For example, if in a given region 20% of the water trade is for biofuel production and 80% of the water trade is purification of water for consumption, the index price is the sum of 0.2× the cost of water for biofuel and 0.8× the cost of water used for consumption. In some embodiments, the index price can be reported as a ratio relative to the price of any particular component. In one embodiment, the index price is reported relative to the index price of water from a different region. Regions envelope geographical areas and the areas included in such a region can be determined by the entity establishing the index. Such an index is described in US20090055294 to Shirazi, which is herein incorporated by reference in its entirety. It will be appreciated that the index of Shirazi is based on the virtual value of water, since Shirazi teaches that the underlying water asset is in reality, inaccessible for use since it is owned by municipalities that are bound to legal restrictions. Shirazi does not teach such an index based on water that is actually available for use. Thus, in one embodiment of the present invention, an index price is created using water, or ice, that is available for uses disclosed herein. In one embodiment, an index price is created using water, or ice, that is now owned by a municipality. In one embodiment, an index price is created using water, or ice, that is privately owned.

By now it will be appreciated that water of the present invention is an asset having a value that can be ascertained. It will be further appreciated that assets can be used as collateral. Thus, one embodiment of the present invention is a method to create a financial instrument based on water. Any water of the present invention can be used. In a preferred embodiment, the water is sequestered as ice. In such an embodiment, the ice is never converted to water and is never moved from its original location. Instead, the water, as ice, is used as collateral to obtain some object of value, such as money, from investors. The object of value is then used for the needs of the entity holding title to the water. Preferably, such needs are used to produce further currency, which is then returned to the investors. In this way, the value of water trapped as ice is realized without the need for obtaining and using the water. Thus, the original source of value (i.e., the water in the ice) is never depleted. In one embodiment, the water is available for uses disclosed herein. In one embodiment, the water is not owned by a municipality. In one embodiment, the water is privately owned.

Heretofore, the valuing of water has been described with regard to current or historical prices. However, such pricing can also be determined based on future value resulting from predicted future events. For example, natural disasters, such as hurricanes, tornadoes, earthquakes, tsunamis, and the like, will result in shortages of fresh drinking water, thereby raising the price that consumers are willing to pay for such water. Further examples of events that may cause water shortages include, but are not limited to, wars, political unrest, mass migrations, religious pilgrimages, and the like. Thus, water prices can also be based on the predicted likelihood of such events occurring. Thus in one embodiment, the price of water is determined based on the likelihood of future events occurring in the world.

With regard to determining the price of water based on predicted storm events, because of storm tracking technology available today, such prediction s can be made with some degree of accuracy. For example, the National Weather Service, which is part of the National Oceanographic and Atmospheric Administration, issues extensive weather-related information, including storm forecasts for targeted regions, at regular intervals. While the prior art discloses using such NOAA information, it should be appreciated that private companies can also be used to obtain such information. In fact, information obtained in this fashion may have more value due to the fact that it is being provided by a politically neutral source. Once such information has been obtained, it can be used to construct maps of storms and maps of predicted storm paths and behaviors. Based on such maps, and the predictive behavior that can be obtained there from, models can be constructed that forecast the need for water in an area. In fact, once weather-related information indicating the formation of a storm has been released, such information can immediately be used to generate a prediction of the number of quantifiable units of water (e.g., gallons, liters, etc.) that will be needed in a particular area. Examples of storm commodity pricing are disclosed in US2010/0042527 to Mitchell and Haynie, which is incorporated herein by reference in its entirety. It should be noted that Mitchell and Haynie exclusively teach the use of storm data. However, as has been described, other world events can also be used to predict the need for water. For example, intelligence data gathered by governments that describes political stability in other countries can be political unrest and possible revolution. The prediction of such events can be used to determine the future need for, and thus the future value or price, for water in those countries.

Moreover, since the presently disclosed methods result in the prediction for the future need for water, such information can also be used to strategically position such water. That is, once it is appreciated that water will be needed at a geographical location due to natural events (e.g., storm), or manmade events (e.g., war), the water can be moved to a location near the site to be predicted event so that it can be distributed in a timely manner. Methods of moving and storing water near such locations will be discussed in more detail below.

In various embodiments, the value of the water can be determined using any of the methods disclosed herein. For example, the value can be based on the value of water intended for use in one or more water markets. As further example, the value of the water can be tied to an index. Moreover, the valuing of water can be determined using any mixture of the methods disclosed herein.

It is an aspect of the present invention that the price, or value, of water can be tied to carbon dioxide and related carbon credits. As described in US2002/0188459 to Erickson, which is incorporated herein by reference in its entirety, the entrance of the carbon dioxide molecules into plants' stomata entails a costly loss of water molecules out of the plants' leaves. For every molecule of carbon dioxide that enters the stomata, between 100 and 400 molecules of water are lost. See Plant Physiology, Salsbury & Ross, page 63. When exposed to elevated carbon dioxide gradients, guard cells in plant leaves relax and close forming a smaller aperture, thus impeding water molecules from escaping through the normally expanded aperture. In a carbon dioxide rich atmosphere, a higher concentration gradient would exist between the exterior and the interior of the leaves, and equivalent amounts of carbon dioxide would diffuse through stomatal openings, even as the stomatal apertures were kept smaller. In most plant species, reduced stomatal openings curtail water loss, so the plants require less water to grow the same size or bigger. The net result is that various crops may use from 20 percent up to 50 percent less water when exposed to elevated levels of carbon dioxide. Thus, it can be envisioned that an inverse relationship exists between the price of carbon dioxide and the price of water. Thus, in one embodiment the price of water is determined taking into account the price of carbon.

Moreover, according to the present invention, the price of the water can be determined relative to the carbon credit trading market. For example, if a given entity practices a process that results in the production of carbon dioxide, that entity needs to dispose of such carbon dioxide. This can be done by releasing it into the environment. However, such release entails the purchase of sufficient carbon credits. Alternatively, the carbon could be sold to a second entity wishing to use it for agricultural production. The price that the second entity would be willing to pay would be directly tied to the advantage given by using such carbon dioxide to fertigate plants. This advantage would have to be compared to the cost of water needed in order to gain the same advantage.

Other related business scenarios are envisioned. For example, the carbon dioxide producing entity may need to pay to get rid of the carbon dioxide. A purchaser could be, for example, an agricultural producer wanting to use the carbon dioxide for fertigation purposes. However, the carbon dioxide producing entity, looking to spend the least amount of capital, would compare the cost of selling the carbon dioxide to the cost of buying carbon credits at the time of disposal. This ratio will vary according to carbon market fluctuations. In such a scenario, it may be cheaper to buy carbon credits, resulting in the agricultural producer needing to purchase more water for irrigation. In this way, the price of water would be inversely tied to the price of carbon credits. The trading of carbon credits is discussed in US2011/0087578 to Finck and Maynard, which is incorporated herein by reference in its entirety.

It is a natural extension of trading water that the water will need to be stored and transported to the place where it is needed. Details of such transport may or may not be part of the exchange between the entities. Alternatively, the details of transport may be decided entirely by the entity holding title to the water. Transport of the water can be made using any means suitable for transporting the water without affecting the quantity and/or characteristics thereof. Examples of water transport devices include, but are not limited to, trucks, planes, ships, pipes, aqueducts, and bags.

In various embodiments, non-rigid structures are utilized to store, transport, and/or convey volumes of water. Applicant hereby incorporates by reference in their entireties U.S. patent application Ser. No. 11/551,125 to Szydlowski, filed on Oct. 19, 2006 and U.S. Provisional Patent Application 61/251,912 to Szydlowski, filed on Oct. 15, 2009. In furtherance of the present disclosure, the following references are incorporated by reference herein in their entireties: U.S. Pat. No. 7,500,442 to Schanz, U.S. Pat. No. 6,047,655 to Cran, U.S. Pat. No. 6,330,865 to Cran, U.S. Pat. No. 6,550,410 to Reimers, U.S. Pat. No. 5,488,921 to Spragg, U.S. Pat. No. 6,293,217 to Savage et al., and U.S. Pat. No. 5,197,912 to Lengefeld. In various embodiments, non-rigid structures adapted to contain water are utilized to store, transport, and otherwise accommodate water.

In some embodiments, the present invention utilizes existing systems and devices of water, liquid, and/or gas transport to convey or store water. For example, in various embodiments, devices and systems may be retro-fitted or reconstructed in such a way to safely and efficiently transport large volumes of water. U.S. Pat. No. 5,727,492 to Cuneo et al, U.S. Pat. No. 5,099,779 to Kawaichi et al., U.S. Pat. No. 7,451,604 to Yoshida et al., U.S. Pat. No. 4,224,802 to Ooka, U.S. Pat. No. 4,331,129 to Hong et al., and U.S. Pat. No. 6,997,643 to Wille et al., U.S. Patent Application Nos. 2008/0110091 to Perkins et al, 2005/0095068 to Wille et al., 2009/0126400 to Pozivil, 2005/0276666 to Wille et al., and 2008/0127654 to Darling et al. are incorporated by reference herein in their entireties.

It is yet another aspect of the present invention to provide means for mooring, stabilizing, and/or parking devices adapted for use with the present invention. For example, U.S. Patent Application Publication No. 2004/0157513 to Dyhrberg, which is hereby incorporated by reference in its entirety, discloses a mooring system for mooring a vessel to a floor portion of a body of water. These and similar devices may be incorporated into various embodiments described herein in order to accommodate, for example, issues related to dock or on-shore storage restrictions, weather and tidal conditions, unpredictable transit times, legal and insurance issues related to positioning a device on-shore or at a dock, and physical restrictions associated with shallow water ports. As used herein, a substantially immovable object refers to mooring devices (despite their general ability to drift or float within a certain radius) as well as more traditional fixed objects such as docks, land, anchored vessels, anchors, etc.

One of skill in the art will recognize that where quantities of water are to be stored, degradation of water quality may become a concern. Accordingly, various embodiments of the present invention contemplate a device, which is adapted for preventing growth and propagation of mold, mildew, algae and other deleterious effects caused over time to a quantity of water. By way of example and to further provide support and disclosure, the following references are incorporated by reference in their entireties: U.S. Pat. No. 7,731,847 to Huy, U.S. Pat. No. 5,229,005 to Fok et al., U.S. Pat. No. 4,512,886 to Hicks et al., U.S. Pat. No. 6,580,025 to Guy, U.S. Pat. No. 7,690,319 to Wingate, U.S. Pat. No. 7,686,539 to Aristaghes et al. In various embodiments, methods for maintaining purity and sterility of water are provided. For example, in one embodiment, ultra-violet light is periodically applied to stored quantities of water so as to neutralize or destroy various bacteria, viruses and protozoan cysts such as giardia and cryptosporidia.

In one embodiment, a water storage device of the present invention is adapted for storage in a vertical manner (i.e. wherein a longitudinal axis of a bag is disposed substantially vertically and extending into a depth of a body of water). In this embodiment, the bag or vessel comprises various features for circulating or distributing water throughout. For example, features as described in U.S. Pat. No. 6,580,025 to Guy may be incorporated into storage and transportation devices of the present invention. One of ordinary skill in the art will recognize that when a device is positioned generally longitudinally in a body of water, the lower regions of the device will be cooled due to the water at greater depths being of generally lower temperatures. Accordingly, a device stored longitudinally will generally adopt a thermocline similar to the body of water in which it is disposed, unless acted upon by additional forces/features. Therefore, in one embodiment, convection currents are induced within a water storage device by supplying, for example, thermal energy to a lower portion of the storage unit, thereby causing water in the lower portions of the device to heat, expand, and rise to the top, creating convection currents and reducing deleterious effects caused by allowing a volume of water to remain stagnant.

In one embodiment of the present invention, water is transported in a large water bag. Such bags are made of a suitable material, such as plastic, rubber, nylon, combinations thereof, and the like, and can vary in size depending on the amount of water being transported. Such bags have the advantage of not altering the quantity or characteristic of the water contained therein. To transfer water using such devices, the bags are filled with the water to be transported, sealed and then transferred to the final destination. Any method of moving such bags can be employed. A particularly useful method is to tow such bags through the ocean using ships, barges, tankers, and the like. In one embodiment, unmanned, GPS-guided, boats tow the bags. Such a transport mechanism would reduce the cost associated with a crew.

It is known that when pliable vessels are used to tow or transport volumes of water, wave propagation through the body of water and/or stored volume of water can present undesirable complications. Accordingly, various embodiments of the present invention comprise wave damping features adapted to reduce such effects. For example, various devices and features described in U.S. Pat. No. 7,686,539 to Aristaghes, which is incorporated by reference herein, may be utilized with features of the present invention. For example, wave dampening structures may be disposed within water containing vessels and/or positioned around water containing vessels of the present invention.

In various embodiments, devices of the present invention comprise the ability to convert and/or utilize energy from naturally occurring resources such as solar, wind, wave, and thermal resources. In various embodiments, energy captured and/or converted from these sources may be used for various on-board functions, such as propulsion, heating, and various purification techniques.

In one embodiment, a vessel comprises photovoltaic arrays adapted for converting solar energy into forms of energy which may be used throughout the device and/or system. For example, solar energy may be captured, concentrated, and/or converted in a manner that allows for heating of a submerged volume of water (i.e. via thermal energy, electrical energy, or various combinations thereof) and the subsequent creation of convection currents throughout the system.

In various embodiments, devices for towing water of the present invention comprise energy conversion means such as solar arrays for powering various devices. Devices of the present invention comprise towable bags or bladders with a surface of up to 60,000 square meters. As it is known that the power density of the sun's radiation on the surface of the earth is approximately 1.4 kW/m$^2$, devices of the present invention are impacted by incredibly large amounts of energy. As such, it is contemplated that devices of the present invention comprise features for harnessing this energy, as well as additional sources of energy such as wind and wave action, to power various on-board features.

In one embodiment, natural sources of energy are harnessed to power various functions such as moving and/or circulating water through a bag, forming an electric barrier around the bag to deter various creatures, powering lighting elements, GPS units, and rudders, and even providing propulsion for the device itself. It is further contemplated that power systems aboard a towing device (e.g. tug boat) may be synced with powered devices of a bag unit so as to supplement one or the other.

In various embodiments, bags of the present invention are provided with dispersion means for repelling various creatures such as birds, seals, sea lions, whales, mussels, mollusks, octopi, and various other marine and avian creatures. Various creatures and sea life can produce serious detriment to bags and/or to ecosystems to which they may be transported in the event that they use the bag as a "host." Accordingly, in order to solve the long-felt need of repelling such life forms from towed bags, the present invention provides electrically powered means for dispersing such creatures. Such electrically powered means may be powered by various on-board energy devices as discussed herein or may derive power from elsewhere, such as an attached vessel. In one embodiment, features are provided along a surface of the bag to repel various creatures. For example, in one embodiment, a plurality of sprinklers is provided to prevent fowl from congregating on a bag and compromising the hygiene of the same. In another embodiment, flashing or strobe lights are provide to prevent unwanted creatures from inhabiting devices of the present invention.

Figure 14:
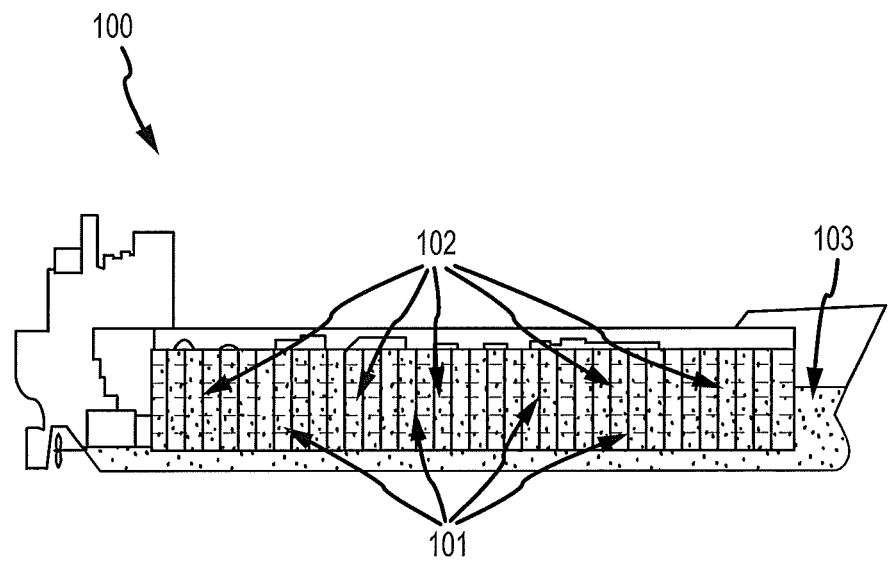
FIG. 14 is a side view of a crude oil tanker.

One embodiment of this invention is to use water of the present invention as ballast in oil tankers deadheading to the water-poor regions of the world. FIG. 14 is a side view of a crude oil tanker. Crude oil tankers 100 are designed for the bulk transport of oil. Crude oil tankers 100 move large quantities of unrefined crude oil from its point of extraction to refineries. Crude oil tankers carry oil in their cargo tanks 101 from the point of extraction to refineries on the outward leg of their journey. After offloading their crude oil 102 cargo at a refinery, empty oil tankers have to take on ballast water 103 to ensure vessel trim and stability during the deadheading portion of their voyage. Prior to loading their cargo, the tankers must discharge the ballast water 103 therefore a productive use of this deadheading portion of a tanker's round trips would be to carry desalinated water from an OTEC platform, melt water or outflow river water to the tankers home port in the Middle East and North America. A ballast tank 110 is a compartment within a boat, ship or other floating structure that holds water.

Figure 15:
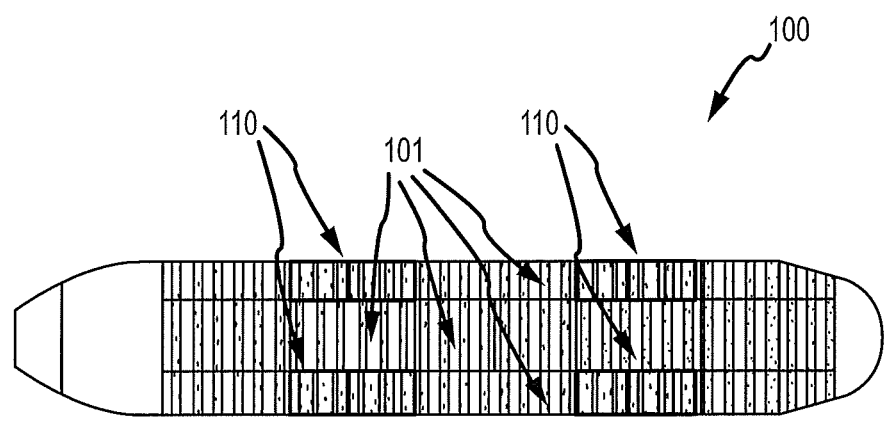
FIG. 15 is a plan view of a crude oil tanker.

FIG. 15 is a top cross sectional view of a crude oil tanker. Crude oil tankers 100 either fill "empty" cargo tanks 101 with ballast water 103 or fill dedicated ballast water tanks 110 with water for their return trips. When an empty crude oil tank 101 is filled with ballast water 103 that water is typically referred to as "unsegregated" or "dirty" ballast because the ballast 103 uses the same tanks as the crude oil 102 rather than a separate tank. Most new tankers 100 are designed with segregated ballast tanks 110, but a few older tankers are only able to carry unsegregated ballast.

Although every effort is made at the refinery to completely unload the oil 102 from the cargo tanks 101 prior to loading the tanks with ballast water 103, some residual oil 102 inevitably remains on the tank walls and floor and mixes with the ballast water 103, creating an oily water which would be unsuitable for irrigation purposes or for human consumption.

Various methods may be employed to fully treat or partially treat the ballast and/or transported water as it is entering the ballast tanks, sitting in the ballast tanks, or as it is removed from the ballast and/or transport tanks One such method for partially treated the ballast water is ozonation. Ozonation has been found to be a safe and effective disinfectant method and system to treat ballast water. Ozone can be spayed into the ballast water tanks before the ballast tanks are filled. Ozone can also be used as an in-line treatment of loading and/or unloading ballast water. This in-line method can comprise injecting ozone into a line of water loading into a sea faring vessel prior to charging the water into a ballast tank; charging the ozone injected water into the ballast tanks; and adjusting a rate of injection of the ozone into the water and adjusting the rate of water loading into the vessel to provide a target biokill of species within the water. In-line ozonation is said to be more efficient and more economical than in-tank treatment. By way of example and in further support of the present disclosure, U.S. Pat. No. 6,869,540 to Robinson and U.S. Pat. No. 6,125,778 to Rodden are incorporated herein by reference in their entireties.

In one embodiment, a treatment system to treat ballast water using a membrane treatment unit to separate out microorganisms is employed. Such a system is described in U.S. Pat. No. 7,900,780 to Ueki and U.S. Patent Application Publication No. 2007/0246424 to Hironari, which by way of example and in further support of the present disclosure, are incorporated herein by reference in their entireties.

Other embodiments employ one or more of a UV system for disinfecting ballast water (WO 02/074,692); chlorine dioxide (WO 02/44089) or pesticides (EP 1,006,084 and EP 1,447,384); at least one filter unit, at least one disinfection unit, and a detection unit (U.S. Patent Application Publication No. 2010/0116647); the infusion of combustion gases into the ballast water to kill harmful microorganisms and bacteria (U.S. Patent Application Publication No. 2011/0132849); as well as various other systems such as those found in U.S. Patent Application Publication No. 2010/0116647 to Kornmuller, U.S. Patent Application Publication No. 2011/0132849 to Husain, WIPO Patent Application Publication No. 02/074,692 to Brodie, WIPO Patent Application Publication No. 02/44089 to Perlich, European Patent Application Publication No. 1,006,084 to Fuchs, and European Patent Application Publication No. 1,447,384 to Hamann, all of which are incorporated herein by reference in their entireties.

In another embodiment, water treatment systems are employed on the oil tanker or other cargo vessel to treat the ballast and transported water as the vessel is making its return voyage. The system could treat and clean the water in one ballast tank, move the treated water to a second ballast tank either during the treatment process or after the treatment process, and then treat the water in the second ballast tank, and so forth.

In other embodiments, the storage container bags are put into the ballast tanks or empty cargo hulls, such as empty oil cargo hulls, to protect the water from the contaminated tanks and hulls. If pure or ideal glacial water is put directly into the bags in the cargo hulls or ballast tanks, then the water will not need to be purified or filtered later for the water to be potable. Additionally, the bags will preserve the ideal characteristics of the transported water.

Figure 16:
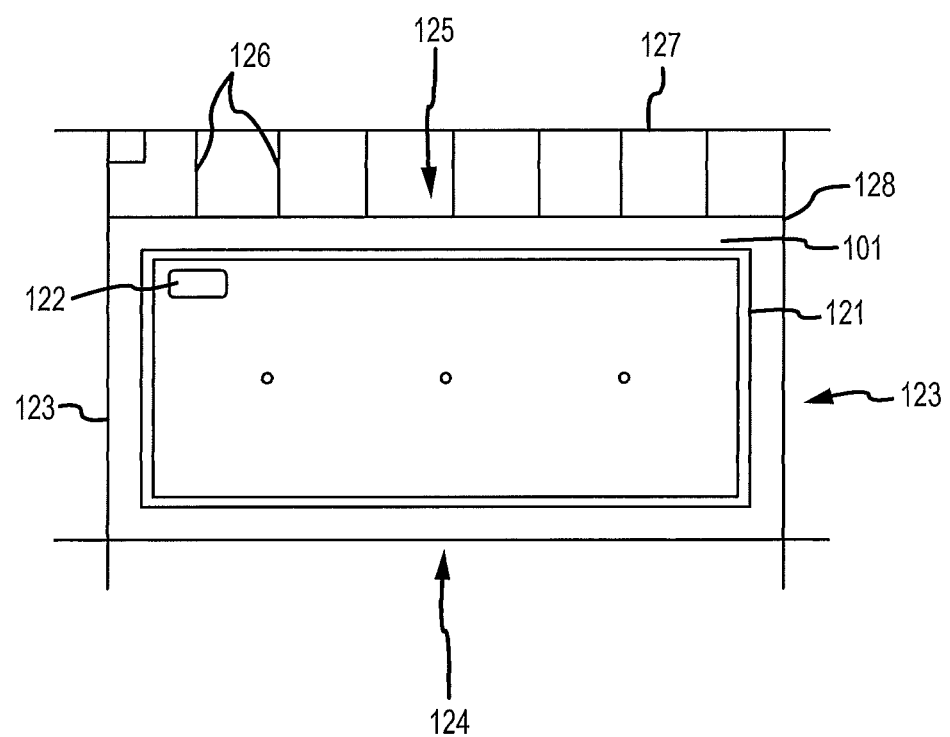
FIG. 16 is a plan view showing a ballast bag, which is shaped to conform with the contours of a ships ballast hold.
Figure 1F:
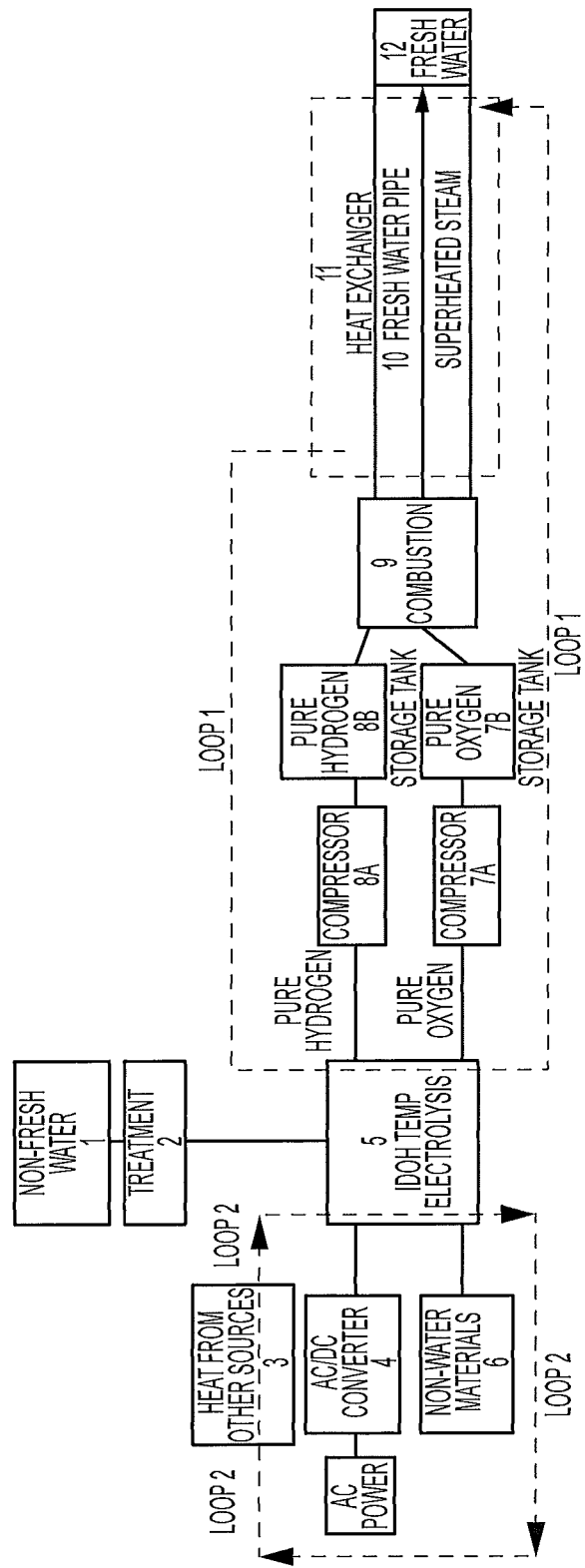
Figure 18:
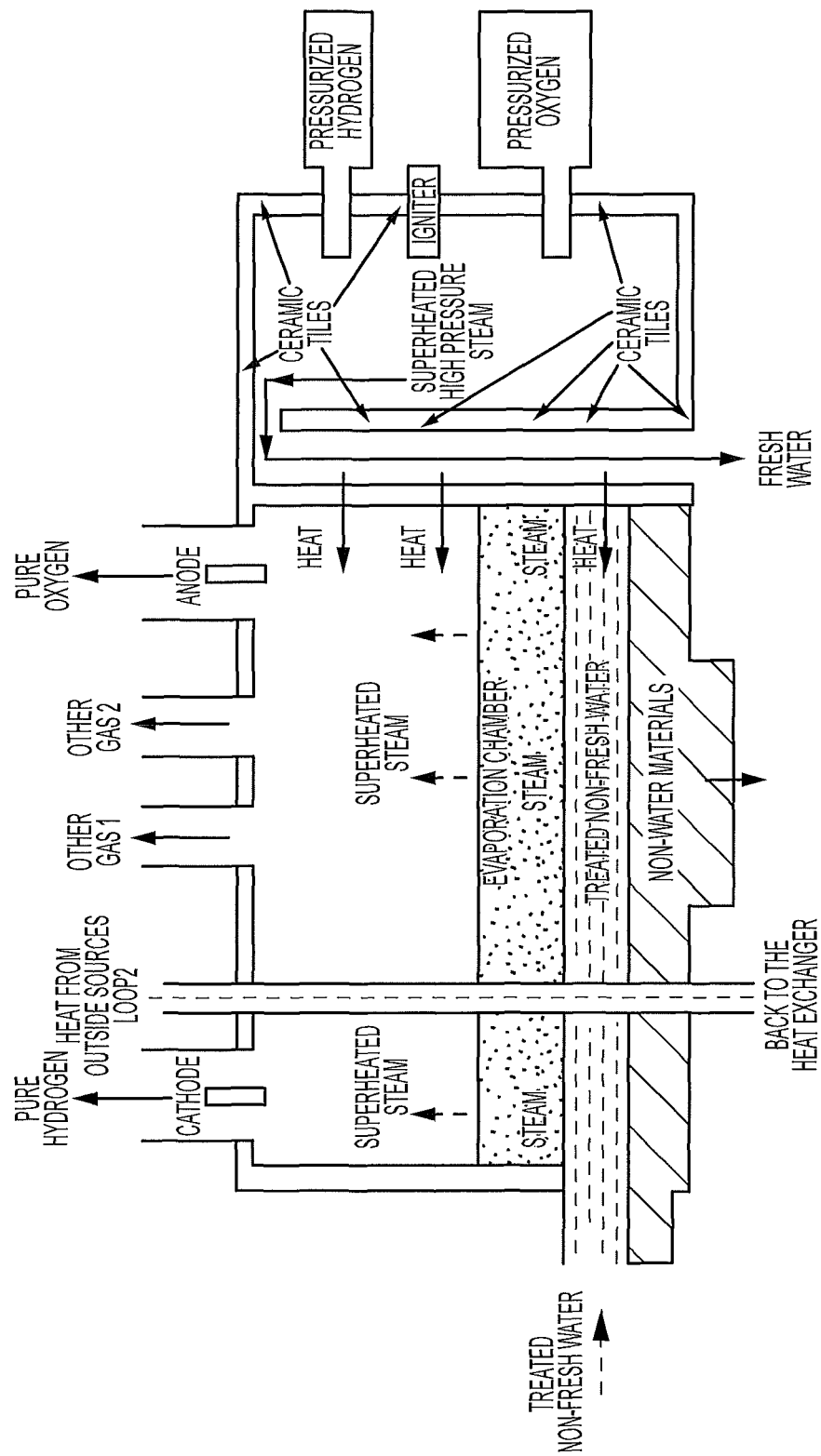
FIG. 18 illustrates the details of a unit that also has the combustor and the water pipe.

FIG. 16 is a top plan view of a bladder for segregating oil and fresh water in the hold of an oil tanker for alternating trips to and from home ports. A ballast bag 121, which is shaped to conform to the contours of a ships ballast hold 101. A manhole 122 allows access to the interior of the hold 101 for inspection and maintenance purposes. The transverse bulkheads 123, and port bulkhead 124, in conjunction with containment barrier 125, are used for emergency containment of the ballast water 103, in the event of a ballast bag 121 failure in the ballasted condition.

Figure 19:
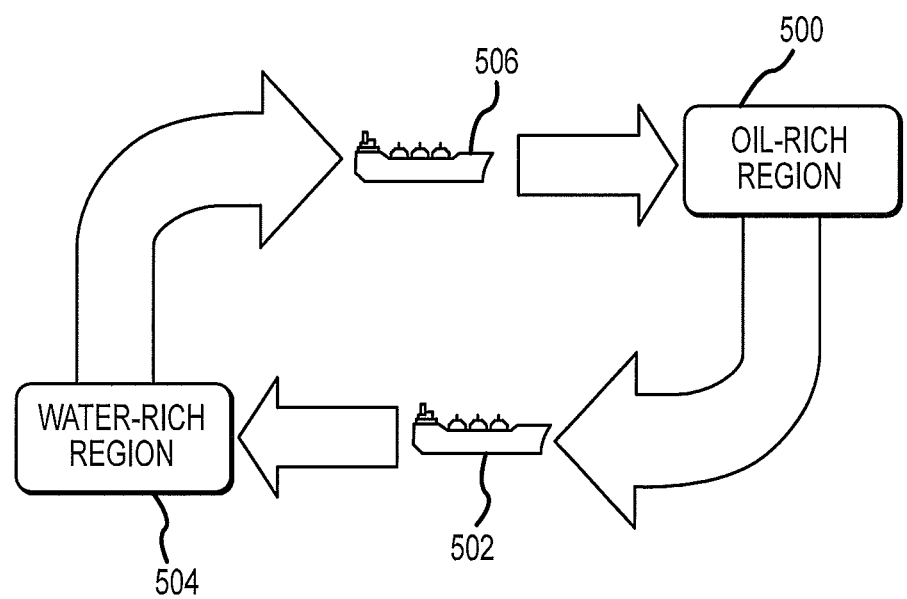
FIG. 19 depicts one embodiment of the present invention wherein a tanker is utilized to transport cargo from a country, region, or port rich in such resources to a region having a demand for the same.

FIG. 19 depicts one embodiment of the present invention wherein a tanker 502 is utilized to transport cargo from a country, region, or port 500 rich in such resources to a region having a demand for the same 504. In one embodiment, the region having demand for oil-based cargo 504 also comprises a supply of fresh water or similar liquid having value. In various embodiments, such a liquid is transported from the region 504 back to the oil rich origin 500 or to various other destinations by utilizing features, volumes, and functionality in a vessel 506 that previously conveyed oil 502 from the oil-rich region 500. Thus, in one embodiment, shipping vessels are utilized to convey two or more resources from one location 500 to another 504 in a generally cyclical manner, increasing efficiency of the overall transportation method.

One of ordinary skill in the art will recognize that water or similar liquids need not be conveyed directly back to a vessel's origin. Indeed, in various embodiments, a vessel 102 used to convey LNG or a similar product to a region 104 may be supplied with a quantity of water or another cargo and thereafter transported to another destination (not shown).

In one embodiment of the present invention, water is transported in a large water bag. Such bags are made of a suitable material, such as plastic, rubber, nylon, combinations thereof, and the like, and can vary in size depending on the amount of water being transported. Such bags have the advantage of not altering the quantity or characteristic of the water contained therein. To transfer water using such devices, the bags are filled with the water to be transported, sealed and then transferred to the final destination. Any method of moving such bags can be employed. A particularly useful method is to tow such bags through the ocean, rivers, or lakes using ships, barges, tankers, boats, and the like. In one embodiment, unmanned GPS-guided boats tow the bags. Other space-based and terrestrial guidance systems may also be used to guide vessels towing such bags. In some embodiments, the vessels operate autonomously. In still other embodiments, the vessels operate autonomously but can receive updated commands and instructions from remotely located operators. Such transport mechanisms would reduce the cost associated with a crew. FIG. 15 is a side view of a towing and attachment arrangement for a transporter embodiment.

Another aspect of the present embodiment also includes loading tankers with water through very large bags of water. These bags of water may be brought to where the tanker has unloaded its cargo. Alternatively, these "water islands" can be positioned at various predetermined locations and after a tanker has delivered its cargo, it can then travel to one or more water islands to then take water on-board and then continue to a destination where such water is desired. The water may also be loaded through buoys or filled by lighters, which are smaller tankers. These loading techniques significantly reduce the cost of loading the water because it minimizes the large tankers' travel. For example, U.S. Pat. Nos. 7,841,289 and 7,500,442 to Schanz, which are hereby incorporated by reference in its entirety, discloses water transporter and storage systems for liquids, such as water, by means of a very large bag-like structure. In various aspects of the present invention, methods and systems employ a lightweight towed submerged water transporter and storage system for liquids, which employs a streamlined towable hull with optional air and liquid storage bladders used not only to adjust buoyancy, but to allow the simultaneous transport and storage of different solids and liquids.

In one embodiment of the present invention, the ice itself can be transported to an agreed upon location. In such embodiment, ice in the required volume and having the desired characteristics, would be removed from the glacier or ice cap, and transported directly to the agreed upon location. Transport of such ice could be achieved in several ways. For example, the ice could be allowed to melt during transport such that upon arrival, it is in a liquid form and ready for consumption. Alternatively, the ice could be kept frozen such that it arrives at its final destination in its original form. Such transportation can be achieved using technology known to those in the refrigeration arts.

In one embodiment of the present invention, the water is transported to a different geographical location than where it is sequestered, without affecting the characteristics of the water. In one embodiment, the water is transported at least 10 miles, at least 250 miles, at least 500 miles, at least 1000 miles, or at least 10,000 miles, from the location where it is sequestered. Such distances can also be measured using kilometers, nautical miles, and the like.

According to the present invention, tankers can also be used to transport water of the present invention. Ballast space, cargo space, or combinations thereof can be utilized. When a vessel's cargo hold is empty or partially empty, the vessels use ballast water weight to maintain stability to compensate for a lack of cargo weight. The vessel is equipped with ballast tanks that can be filled with water (typically sea water for ocean going ships and tankers) to maintain stability when the vessel travels empty. The ballast tank water is then typically discharged when the cargo, such as oil, is loaded. By way of example and in further support of the present disclosure, U.S. Patent Application Publication No. 2006/0027507 to van Leeuwen; US Patent Application No. 2006/0027507, which is a CIP of issued U.S. Pat. No. 7,273,562 to Robinson, which is a CIP of issued U.S. Pat. No. 6,869,540 to Robinson, are all incorporated herein by this reference in their entireties.

Prior to loading their cargo, the tankers must discharge the ballast water; therefore a productive use of this deadheading portion of a tanker's round trips would be to carry water from a fresh water source, melt water, or outflow river water to the tankers home port in an oil-rich but water-poor region. By way of example and in further support of the present disclosure, U.S. Patent Application Publication No. 2011/0036919 to Baird, is incorporated herein by reference in its entirety.

In one embodiment, water is used as ballast water weight in a large sea vessel, such as an oil tanker. After the oil tanker unloads its oil cargo at its destination, water is injected into the vessel's ballast tanks, the water is fully or partially treated, and the water is unloaded at the vessel's oil-loading port for human use, irrigation purposes, or other use requiring such water. In the present embodiment, the water is not released into the port, but rather the water is unloaded for use on land or onboard other ships, thus solving the problem of discharging non-native microorganisms and bacteria into the port's water. Furthermore, the water loaded into the ballast tanks can be either drinkable or undrinkable water. Either way, one skilled in the art can imagine different embodiments for treating the ballast water: the water can be treated while the tanker is in route, upon the tanker's arrival but before the water is unloaded, or the water can be treated once on land.

Crude oil tankers either fill "empty" cargo tanks with ballast water or fill dedicated ballast water tanks with water for their return trips. When an empty crude oil tank is filled with ballast water that water is typically referred to as "unsegregated" or "dirty" ballast because the ballast uses the same tanks as the crude oil rather than a separate tank. Most new tankers are designed with segregated ballast tanks, but a few older tankers are only able to carry unsegregated ballast. One embodiment of this invention is to use water of the present invention as ballast in oil tankers deadheading to the water-poor regions of the world.

Various methods may be employed to fully treat or partially treat the ballast and/or transported water as it is entering the ballast tanks, sitting in the ballast tanks, or as it is removed from the ballast and/or transport tanks One such method for partially treated the ballast water is ozonation. Ozonation has been found to be a safe and effective disinfectant method and system to treat ballast water. Ozone can be spayed into the ballast water tanks before the ballast tanks are filled. Ozone can also be used as an in-line treatment of loading and/or unloading ballast water. This in-line method can comprise injecting ozone into a line of water loading into a sea faring vessel prior to charging the water into a ballast tank; charging the ozone injected water into the ballast tanks; and adjusting a rate of injection of the ozone into the water and adjusting the rate of water loading into the vessel to provide a target biokill of species within the water. In-line ozonation is said to be more efficient and more economical than in-tank treatment. By way of example and in further support of the present disclosure, U.S. Pat. No. 6,869,540 to Robinson and U.S. Pat. No. 6,125,778 to Rodden are incorporated herein by reference in their entireties.

In one embodiment, a treatment system to treat ballast water using a membrane treatment unit to separate out microorganisms is employed. Such a system is described in U.S. Pat. No. 7,900,780 to Ueki and U.S. Patent Application Publication No. 2007/0246424 to Hironari, which by way of example and in further support of the present disclosure, are incorporated herein by reference in their entireties.

Other embodiments employ one or more of a UV system for disinfecting ballast water (WO 02/074,692); chlorine dioxide (WO 02/44089) or pesticides (EP 1,006,084 and EP 1,447,384); at least one filter unit, at least one disinfection unit, and a detection unit (U.S. Patent Application Publication No. 2010/0116647); the infusion of combustion gases into the ballast water to kill harmful microorganisms and bacteria (U.S. Patent Application Publication No. 2011/0132849); as well as various other systems such as those found in U.S. Patent Application Publication No. 2010/0116647 to Kornmuller, U.S. Patent Application Publication No. 2011/0132849 to Husain, WIPO Patent Application Publication No. 02/074,692 to Brodie, WIPO Patent Application Publication No. 02/44089 to Perlich, European Patent Application Publication No. 1,006,084 to Fuchs, and European Patent Application Publication No. 1,447,384 to Hamann, all of which are incorporated herein by reference in their entireties.

In another embodiment, water treatment systems are employed on the oil tanker or other cargo vessel to treat the ballast and transported water as the vessel is making its return voyage. The system could treat and clean the water in one ballast tank, move the treated water to a second ballast tank either during the treatment process or after the treatment process, and then treat the water in the second ballast tank, and so forth. The very large bags as otherwise described herein can also be used to store water after water treatments, whether such bags are then further towed to a destination land port or alternatively moored in "water islands" at a predetermined destination.

It is also known that tanker ships are used to transport various liquids such as chemicals, oil or liquid natural gas (LNG). Such ships were heretofore considered unfit for the transport of water. However, because of the inventor's realization that various grades of water exist, and that such water can be treated en-route to change its grade, one aspect of the present invention is that such ships can be used to transport water.

In various embodiments, LNG shipping containers are utilized to transport large quantities of water. It is known that LNG shipping containers have enjoyed a history of stellar safety. It is estimated that LNG tankers have sailed over 100 million miles without a shipboard death or even a major safety incident. Although water generally does not pose any environmental or significant safety risks in the event of an accident or spill, it is clearly desirable to protect all cargo from risk of loss, contamination, or general diminution in value.

In certain embodiments, the present invention contemplates devices, methods and systems for utilizing pre-existing Liquefied Natural Gas ("LNG") tankers in a manner that allows the ships to be returned to a point of origin or another location with fresh water after some or all of a payload of LNG has been delivered. Thus, in various embodiments, a novel gas-water exchange system is provided. It is known that LNG tankers may comprise volumes of up to 225,000 cubic meters. Accordingly, in various embodiments, re-filling even a portion of a LNG container with potable water can result in provision of a significant amount of highly demanded water to a point of origin or alternative location. As many LNG tankers currently deliver a payload and return empty, re-supplying such vessels with water not only provides economic viability for an otherwise empty return voyage, but also increases the ship's ballast and fuel efficiency.

In one embodiment, one or more bladders are provided wherein the one or more bladders are adapted to be placed within an emptied volume of a LNG shipping container (i.e., tank, hull, etc.) and further filled with water to provide ballast and/or valuable shipping contents for a return or additional voyage. Accordingly, in various embodiments, significant value is provided to shipping activities by supplying a vessel with a valuable return-shipment, such as water. In one embodiment, at least portions of LNG contained within a LNG tanker are emptied or extracted at the appropriate location (e.g. a regasification plant). Thereafter, emptied portions of a LNG shipping vessel or container are provided with a liner suitable for preventing or minimizing contamination from previously and/or contemporaneously stored gas. For example, various liners available from Fab-Seal Industrial Liners, Inc. may be provided to accommodate water to be stored within a LNG tank and isolate the water from various materials, gases, debris, etc. Liners suitable for use in the present invention include, but are not limited to, P.V.C. flexible membrane liner materials.

In various embodiments, bags or liners for isolating water or liquids may be fabricated in any desired manner, including in a completely flattened conformation. For example, two sheets of fabric may be cut to the desired plan shape and joined at their adjacent edges by suitable means consistent with the material of construction. For example, heat welding or solvent welding may be used if certain polymeric materials have been employed as the substance coating the fabric. Sewing may be necessary in addition. It is possible that the overall cost of a bag may be reduced if the center section and the edges are fabricated separately, i.e., not the flattened conformation.

In various embodiments, the bag is not a body of revolution or, in particular, tubular. In various embodiments, the top and bottom surfaces are indistinguishable and the bag or liner may be periodically turned over to equalize damage due to sun, weather, mold, aging, etc.

In various embodiments, liners of the present invention comprise a water-resistant, elastomer-coated mesh material, such mesh material being constructed of polymeric material having some inherent elasticity, such as polyester or nylon. A warp knit mesh construction is preferred in certain embodiments. The mesh material also may be steel mesh, preferably hexagonal netting of drawn steel wire or similar high modulus material, such as extended-chain crystallized polymer.

In various embodiments, the base fabric is provided with an elastomeric coating for the purposes of providing water-proofing as well as protecting the material of construction from ultraviolet degradation and marine growth.

In one embodiment, internal surfaces or portions may be coated with various materials to prevent or minimize risk of cross-contamination. For example, various spray-coatings may be applied once a quantity of LNG is emptied from a portion of the vessel to create a virgin surface for the holding and contacting with water or similar fluid cargoes. By way of example, industrial water-proof coatings provided by the Procachem Corporation may be provided to coat, cover, or seal a surface that was exposed to or in contact with LNG so as to render the surface capable of accommodating water without significant risk of cross-contamination. In various embodiments, internal volumes of storage tanks or similar structures are coated with a layer of material, the layer of material comprising an appropriate thickness to substantially eliminate the risk of cross-contamination between a liquid or material to be stored and a liquid or material previously stored in the same tank. In various embodiments, the layer of material applied is not so thick as to substantially impact the overall internal volume of the container, tank, vessel, etc.

In one embodiment, one or more tank cleaning apparatus are employed to cleanse the inside of a container or tank. For example, various features as shown and described in U.S. Patent Application Publication No. 2009/0308412 to Dixon, which is incorporated by reference herein, may be employed to prepare various LNG shipping tankers and similar containers for the transport of cargo other than LNG.

FIG. 19 depicts one embodiment of the present invention wherein a LNG tanker 102 is utilized to transport LNG from a country, region, or port 100 rich in such resources to a region having a demand for LNG 104. In one embodiment, the region having demand for LNG 104 also comprises a supply of fresh water or similar liquid having value. In various embodiments, such a liquid is transported from the region 104 back to the LNG origin 100 or to various other destinations by utilizing features, volumes, and functionality in a vessel that previously conveyed water 102 from the LNG-rich region 100. Thus, in one embodiment, shipping vessels are utilized to convey two or more resources from one location 100 to another 104 in a generally cyclical manner, increasing efficiency of the overall transportation method.

One of ordinary skill in the art will recognize that water or similar liquids need not be conveyed directly back to a vessel's origin. Indeed, in various embodiments, a vessel 102 used to convey LNG or similar product to a region 104 may be supplied with a quantity of water or another cargo and thereafter transported to another destination (not shown). In various embodiments, the water-rich region 104 is not the same region having a demand for LNG or similar products. Accordingly, LNG may be conveyed from a source or origin 100 to a port or location in need of the same (not shown). The LNG tanker may then be routed to a water-rich region 104 for acquisition of water or similar and directed to various locations in need of the same.

One of skill in the art will recognize that the regions of the world which are generally endowed with large LNG supplies have a similar dearth of water supplies. Accordingly, various embodiments of the present invention contemplate utilizing LNG shipping technology to provide water upon return voyage. However, as will be recognized, various trade routes, diversions, off-shoots, etc. are contemplated herein. According to various embodiments, water and LNG are transported to and from any number of ports or locations, with shipping efficiency provided by the ability to utilize existing tankers and/or equipment for a variety of different liquid cargoes.

Figure 20:
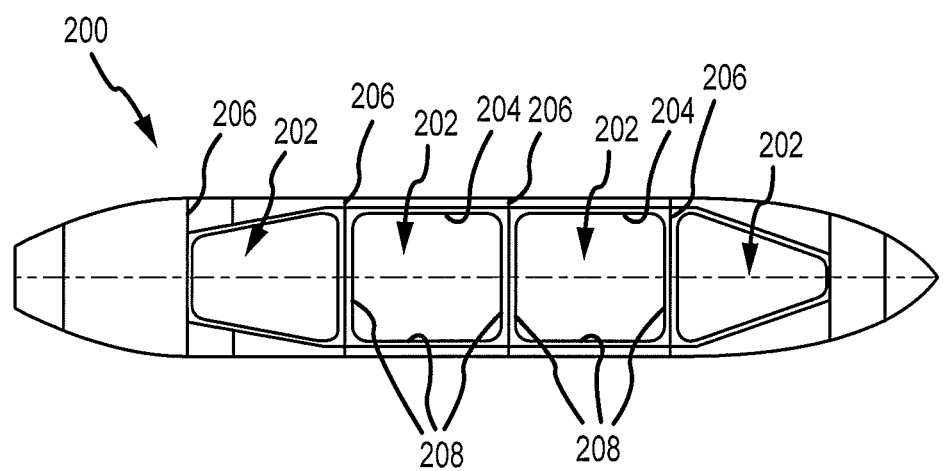
FIG. 20 is a top plan view of a shipping container with one or more internal storage volumes.
Figure 21:
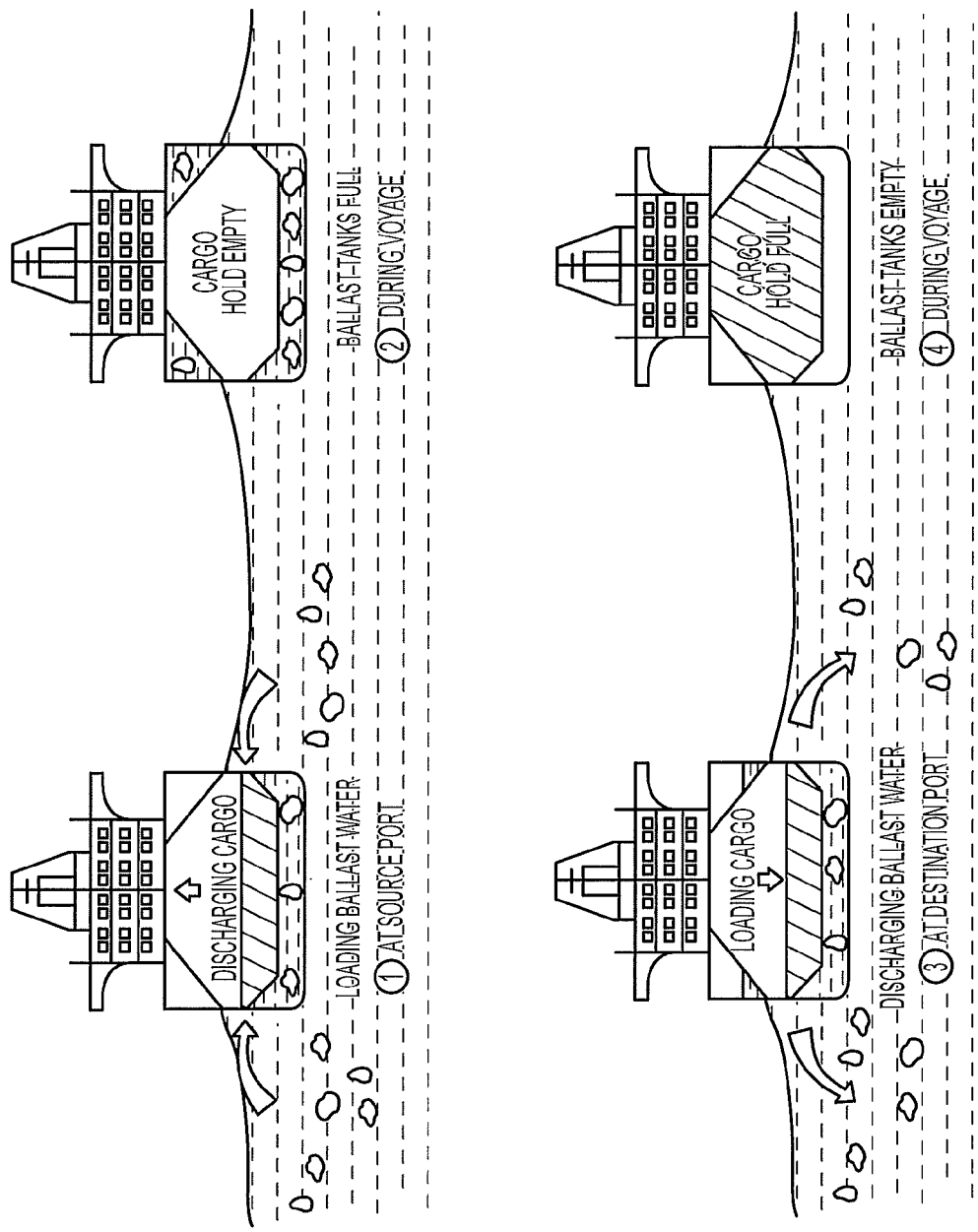
FIG. 21 depicts a cross section of ships showing ballast tanks and ballast water cycles.

FIG. 20 is a top plan view of a shipping container 200 with one or more internal storage volumes 202. In various embodiments, internal storage volumes 202 are adapted to house large volumes of LNG in a first state and accommodate large volumes of water or various other liquids in a second state. In one embodiment, one or more drop-in liners 204 are provided after LNG is emptied from portions 202 of a vessel 200, the liner(s) being adapted to receive volumes of water or liquid. The liner(s) prevent or mitigate the risk of cross-contamination between the water and previously stored LNG. In various embodiments, portions 202 of a LNG tanker are segregated by barriers 206. Barriers 206 allow for separation of various liquid cargoes. Accordingly, in various embodiments, tankers of the present invention may comprise or transport various combinations of liquid cargoes based on user preference. As one of skill in the art will recognize, an entire shipment of LNG need not be offloaded in order to transport different cargo. For example, two of four compartments comprising LNG may be offloaded at a particular port, the emptied two compartments re-filled with a volume of water, and the vessel may be conveyed to an additional port carrying a combination of LNG and water (or similar). Accordingly, in various embodiments, a dynamic shipping method is provided which may comprise different quantities and types of liquids based on shipping routes, economic conditions, and various other factors.

Figure 23:
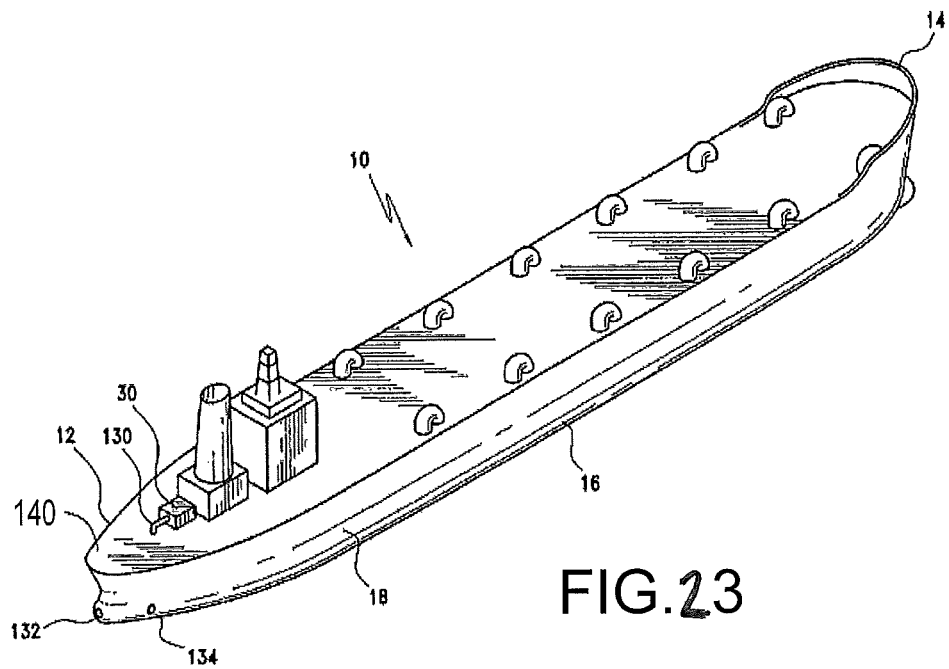
FIG. 23 schematically show vessel including stern, bow and a double hull formed from outer hull 16 and inner hull.
Figure 24:
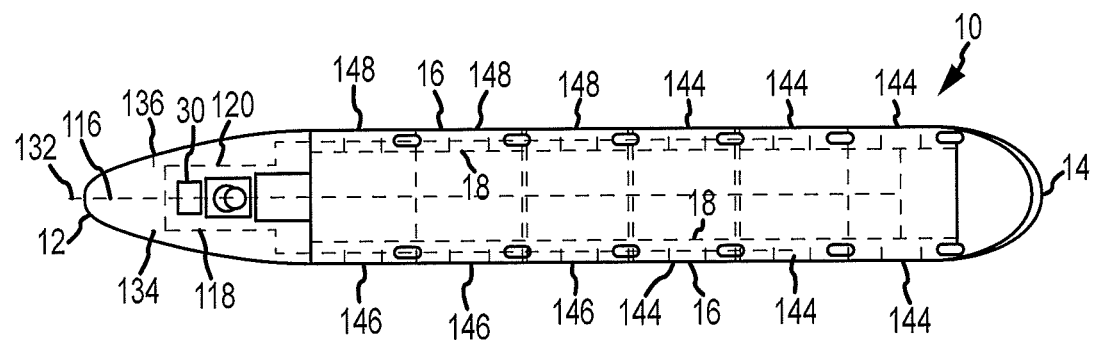
FIG. 24 is a top plan view of a shipping vessel according to one embodiment.

FIGS. 23 and 24 show a vessel 10 including stern 12, bow 14 and a double hull formed from outer hull 16 and inner hull 18. Vessel 10 is representative of the types of vessels encompassed within the invention and is a conventionally proportioned double-hulled oil tanker having cargo compartments within inner hull 18. However, the present invention can be applied to any sea faring ship or vessel that has ballast tanks or bilge water. The vessel 10 is typical of vessels that transport partly or fully refined or residual petroleum or other bulk liquid products such as seed oil.

Ozone generator 30 is illustrated located on vessel 10 aft deck 140 with main ozone feed line 130 shown as part of the ozone injection system of the invention. Generator 30 can be structured and can generate ozone according to known ozone generators such as described by Rodden U.S. Pat. Nos. 6,125,778; 6,139,809; and PCI-WEDECO (PCI-WEDECO Environmental Technologies, 1 Fairfield Crescent, West Caldwell, N.J. 07006) type SMO/SMA series generators and WEDECO Effizon® technology high concentration ozone production generators as examples. The disclosures of these patents are incorporated herein by reference in their entirety.

Ozonated gas is pumped through generator 30 and subsequently through line 130 for injection into water in respective ballast water intake/discharge conduits 116, 118, 120 via respective connector lines (not shown) in accordance with the FIGS. 23 through 26 embodiment of the invention. Intake/discharge conduit 116 conveys water from stern intake/outlet sea chest 132 to forward battery 144 of ballast tanks Intake/discharge conduit 118 conveys water from starboard intake/outlet sea chest 134 to a starboard battery 146 of ballast tanks Intake/discharge conduit 120 conveys water from port intake/outlet sea chest 136 to a port battery 148 of ballast tanks.

Ballast water is loaded into the vessel 10 via the sea chests 132, 134, 136 and is then pumped to load respective ballast tank batteries 144, 146, 148 through the system of conduits 116, 118 and 120 shown. At a destination location, the process is reversed and water is pumped from tank batteries 144, 146, 148 through the respective conduits 116, 118, 120 for discharge through respective sea chests 132, 134, 136 to the sea. Or, discharge can be affected through another, separate conduit and sea chest system (not shown) from tank batteries 144, 146, 148. After injection with ozone, the water is conveyed by one of the main conduits 116, 118, 120 to respective tank batteries 144, 146, 148. As each main conduit 116, 118, 120 passes through each ballast tank 144, 146 or 148, a smaller footer pipe (not shown) can be taken off to provide a suction/discharge conduit. Valving for the footer pipe can be contained in a tunnel or cofferdam area, or actually placed in the tank itself, if space is an issue.

Figure 22:
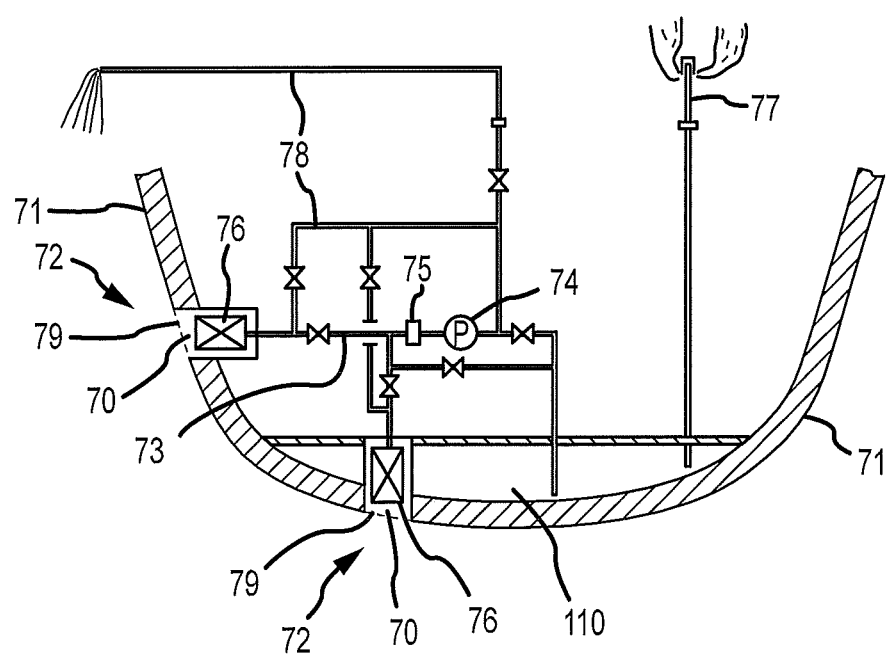
FIG. 22 illustrates a cross section of a ship provided with a ballast water intake and treatment system related to the presently disclosed embodiments and illustrates how a membrane treatment unit is arranged in the water intake that is conventionally hollow.
Figure 25:
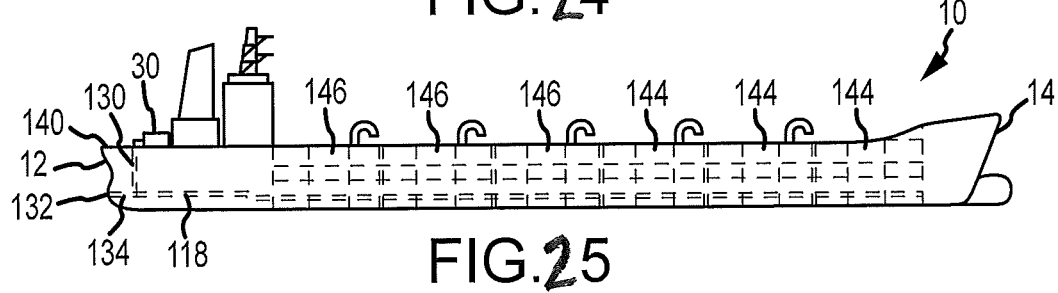
FIG. 25 is a side elevation view of a shipping vessel according to one embodiment.

FIGS. 24 and 25 show that conduit 118 delivers ozone treated water to each ballast tank of a starboard battery of tanks 146 and conduit 120 delivers ozone treated water to each ballast tank of a port battery of tanks 148. Water enters through respective sea chests 134 and 136 and is treated and charged into a tank of either the starboard battery 146 or the port battery 148 until each respective tank is sufficiently filled and balanced to compensate for off-loaded cargo. Similarly, as shown in FIGS. 22 and 26, water enters through stern sea chest 132, is treated with ozone delivered via a line and charged into a tank of forward battery 144 until each tank is filled to balance the vessel 10.

Figure 26:
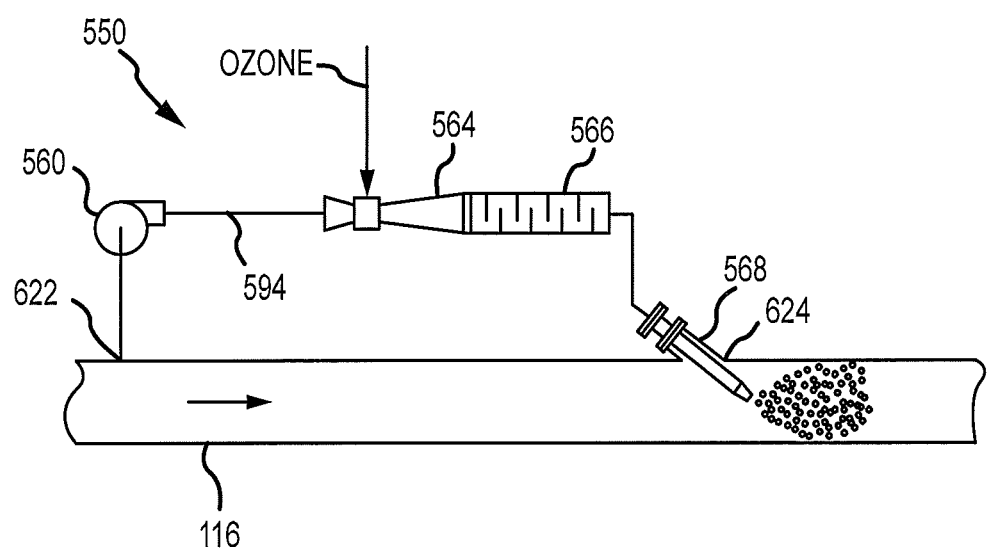
FIG. 26 schematically shows detail of bypass injection of ozone into a diverted portion of water loading to or unloading from a ballast tank.
Figure 27:
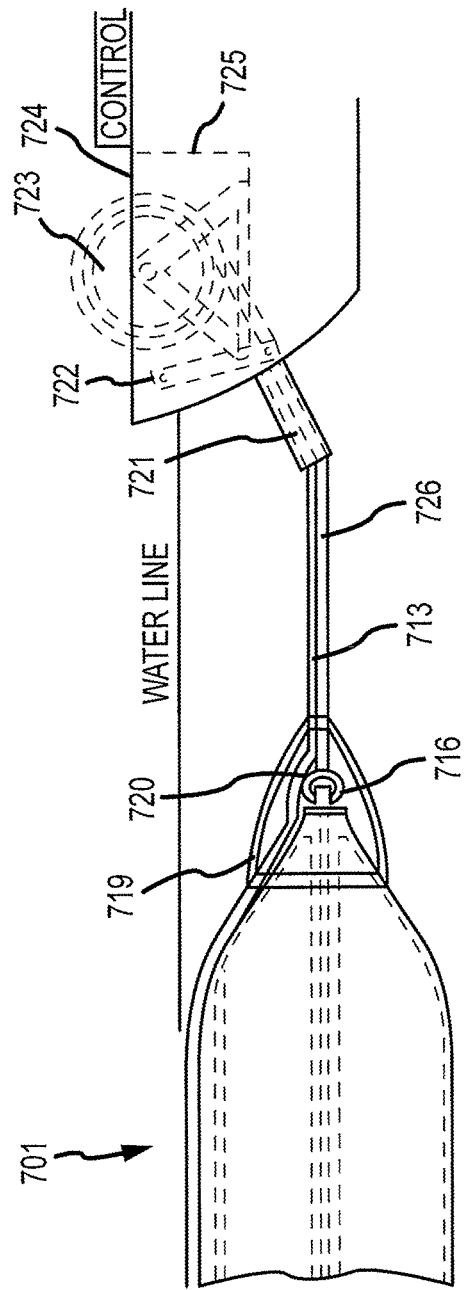
FIG. 27 is a side view of a towing and attachment arrangement for a transporter embodiment.

FIG. 26 shows detail of bypass injection of ozone into a diverted portion of water loading to or unloading from a ballast tank. The bypass injection allows for ozone injection, provides proper mixing and solubilization of the ozone gas into the ballast water and proper remixing of the ozonated diverted portion with the main water flow. Shown in FIG. 5 is exemplary aft load/discharge bypass injection system 550. The system 550 includes a bypass conduit 594 that diverges from main conduit 116 at an upstream point 622 and reconverges with the main conduit 116 at a downstream point 624. Bypass conduit 620 includes pump 560, venturi 564, mixer 566 and main conduit reinjector 568.

Figure 28:
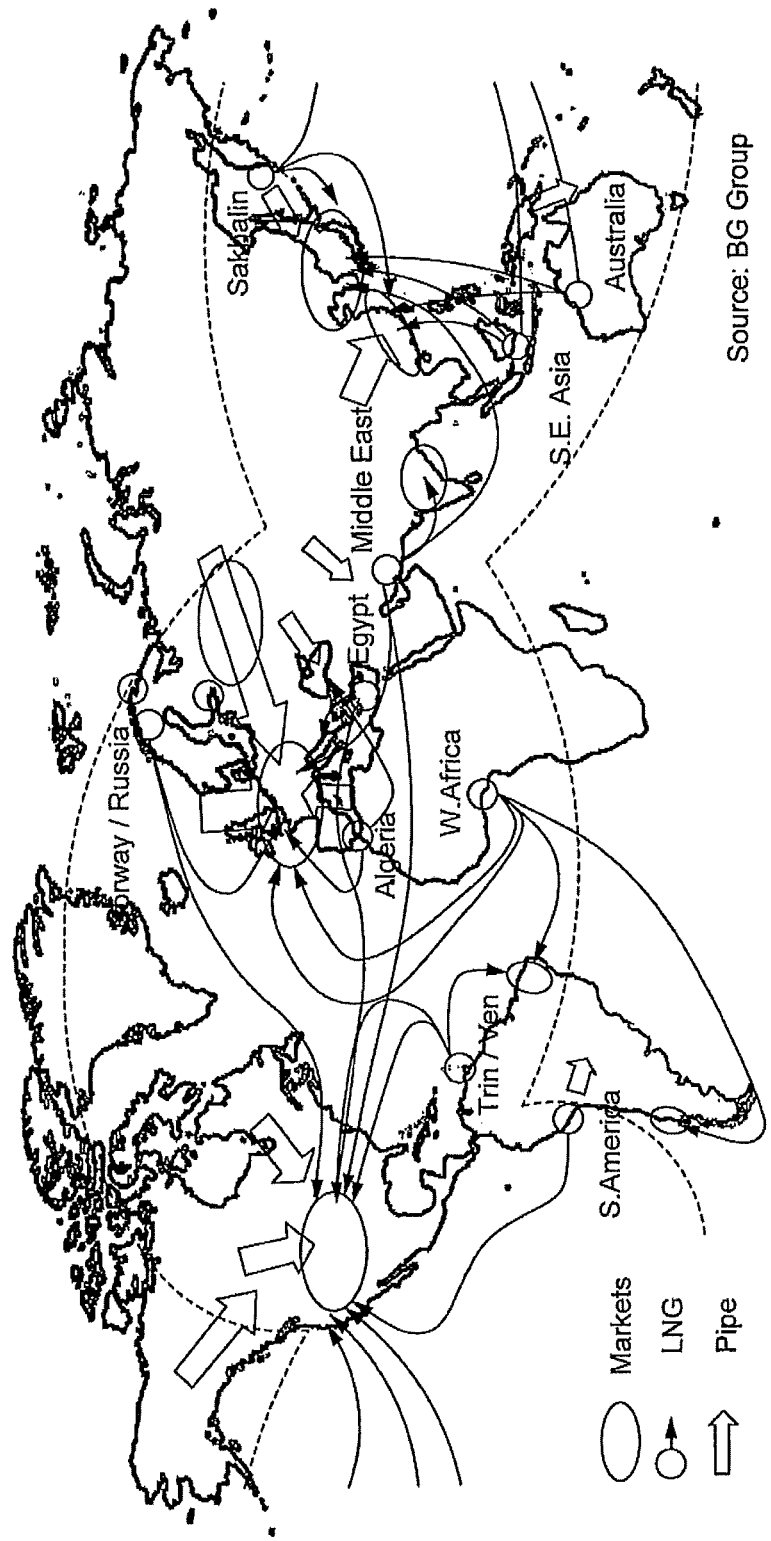
FIG. 28 depicts various trade routes where oil tankers travel and where water can be delivered via various aspects of the present invention.

FIG. 28 depicts various trade and supply routes of LNG. It will be recognized that a number of locations depicted have substantial need for water and will continue to experience such need as demand grows. Furthermore, many of these water-depleted regions currently export or have the potential to export LNG and other supplies via large tankers or ships. Given the finite number of LNG tankers and similar vessels in operation, these vessels will obviously need to return to a point of origin at some time in their career. Various embodiments contemplate returning these vessels with quantities of water suitable for drinking, agriculture, sanitation, and/or various other purposes. As used herein, the term "fresh" with respect to water need not necessarily mean potable. Rather, it will be recognized that "fresh" is merely a term for the alternative to salt water.

Figure 29:
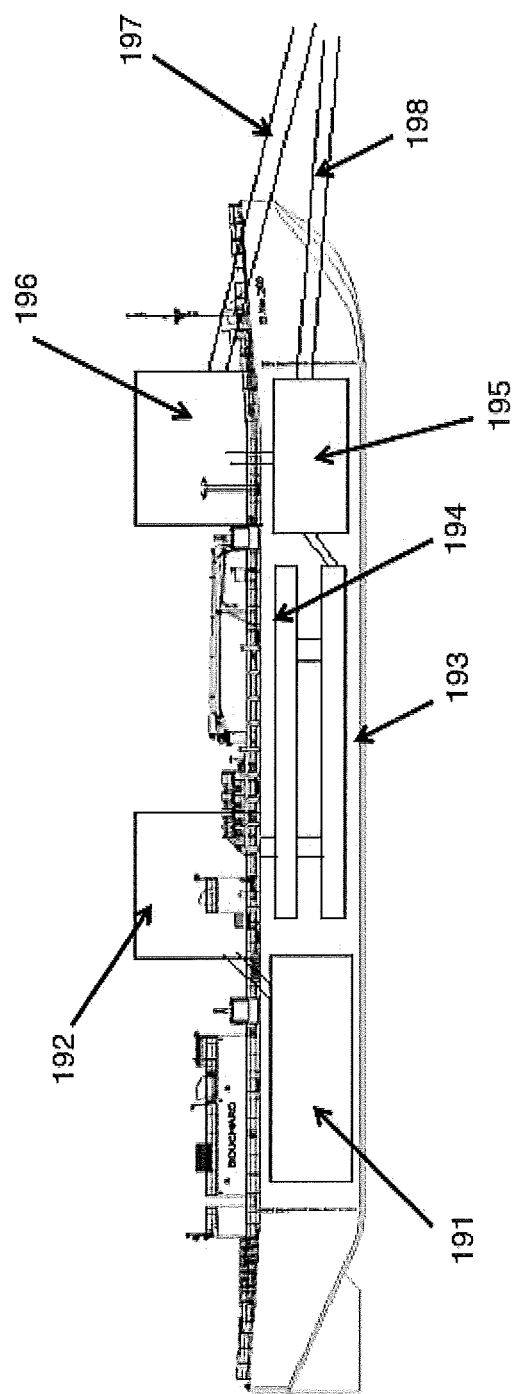
FIG. 29 is a perspective view of an oil tanker connected to a very large bag to facilitate transfer of water therebetween in certain embodiments of the invention.

FIG. 29 depicts one embodiment of a barge with water filtration and treatment equipment on board. The barge contains a conditioning tank 191 to provide a first level of separation including an oil skimmer through an up flow configuration with discharge entering a centrifuge 192. Water from the centrifuge may then be directed through a filtration process, sand or multimedia, 194 for removal of large particulates before introduction through activated carbon filters 193 for removal of organics and excess ozone. Discharge from the carbon filters is directed to a clean water tank 195 and 196. Piping 197 and 198 can be employed to transport water to very large bags (as otherwise described herein) to accompanying vessels at a destination port or directed to onshore treatment and/or storage systems.

Figure 30:
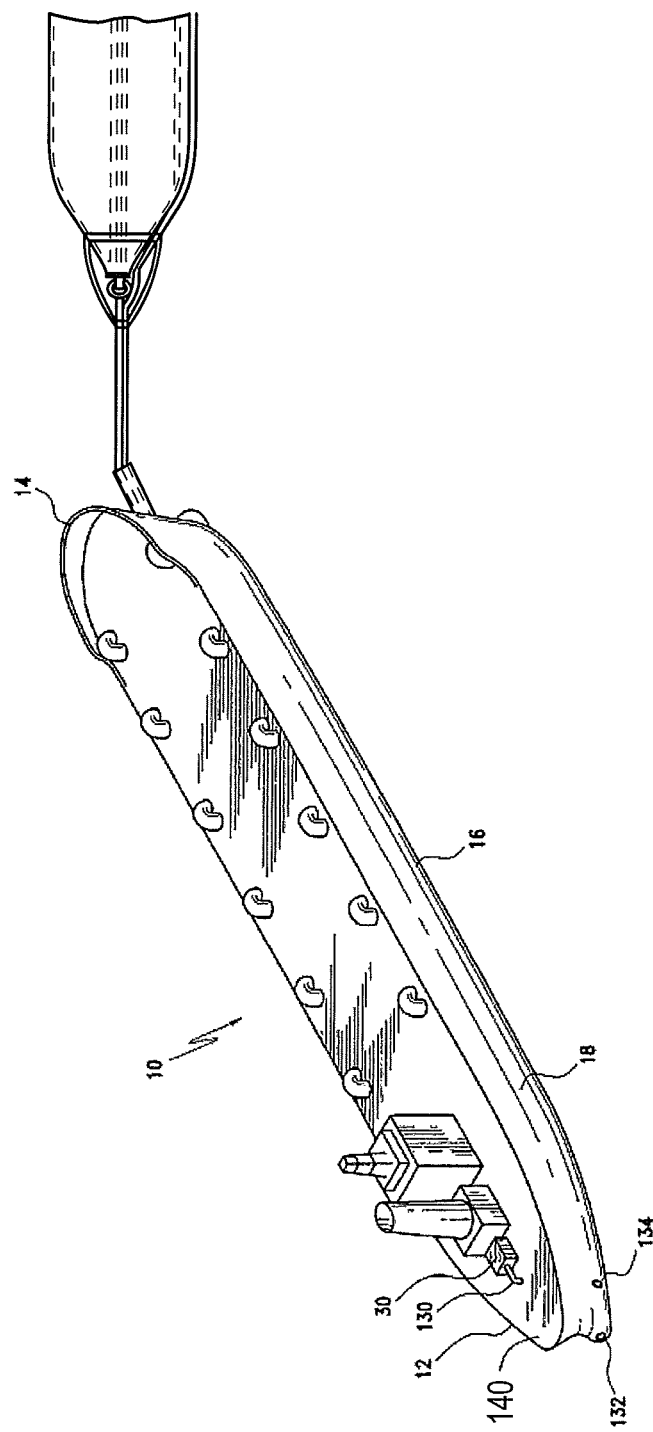
FIG. 30 is a perspective view of a barge with water filtration and treatment equipment on board.

FIG. 30 is a perspective view of an oil tanker connected to a very large bag to facilitate transfer of water therebetween in certain embodiments of the invention. In one embodiment, the oil tanker will tow a very large bag full of fresh water. The fresh water may or may not be potable and ready for consumption upon arrival.

In one embodiment, one or more tank cleaning apparatus are employed to cleanse the inside of a container or tank that housed LNG. For example, various features as shown and described in U.S. Patent Application Publication No. 2009/0308412 to Dixon, which is incorporated by reference herein, may be employed to prepare various LNG shipping tankers and containers for the transport of cargo other than LNG.

One of skill in the art will recognize that various methods and devices of the present invention are not limited to LNG shipping tanks or tankers. Indeed, various methods, features, and systems as described herein may be utilized with a variety of shipping containers and vessels, including, but not limited to, war-ships, recreational vessels, bags, cargo-ships, etc.

One of skill in the art will recognize that various methods and devices of the present invention are not limited to LNG shipping tanks or tankers. Indeed, various methods, features, and systems as described herein may be utilized with a variety of shipping containers and vessels, including, but not limited to, war-ships, recreational vessels, cargo-ships, etc.

Also contemplated is the use of oil tankers for transporting water. In one embodiment, fresh water is at least transported as ballast in tankers. In one embodiment, the water is transported in oil tankers deadheading to homeports. In a particular embodiment, such deadheading can be from the oil-rich but water-poor areas of the world. An objective of this invention is to use carbon free, renewable energy sources to at least partially treat transported water in route or at a water-poor region.

In various embodiments, systems and methods are employed on an oil tanker ship to treat vast quantities of water within the ship's hull and/or ballast tanks and/or tugged barges, and/or very large bags, etc. while the ship is in its return transit to re-fill with oil. Traditionally, large tanker ships return to oil-bearing nations across the seas with an empty hull and ballast tanks full of seawater because it was considered impracticable to transport water, particularly drinkable water, in such oil-contaminated hulls. One aspect of the present invention, however, relates to the provision of systems on such tankers such that water can be hauled back to the typically water-starved regions of the world from whence oil is extracted and shipped, with such water being treated on-board ship so as to deliver potable water upon arrival at the return destination. In certain embodiments, the water is only partially treated in a fashion that permits it to be fully treated at the destination port, thus lessening the time and costs involved of performing all water treatments upon arrival. In other embodiments, however, the transported water is largely or substantially treated in a fashion so that minimal additional treatment is required at the destination port. One of skill will appreciate the various and multiple treatment steps that may be included during transport of the water in view of differing conditions, facilities, type and quality of water, type of oil residues, the capacity to segregate treated water from untreated water, etc. Various types of oil removing systems can be employed within the scope of the present invention, with preferred systems being those that can readily be installed aboard an oil-tanker vessel. As many oil tankers currently deliver a payload and return empty, re-supplying such vessels with water not only provides economic viability for an otherwise empty return voyage, but also increases the ship's ballast and fuel efficiency.

In various embodiments, a method of shipping/transporting water is provided, the method comprising a first location, a second location, and a shipping vessel. In particular embodiments, the first location comprises substantial quantities of oil and the second location comprises substantial quantities of fresh water. Shipping vessels of the present invention may therefore be provided with cargo comprising oil at a first location and transported to a second location. Subsequently, in various embodiments, a shipping vessel is at least partially emptied of the cargo comprising oil and provided with cargo comprising water at the second location. In various embodiments, the shipping vessel is repeatedly transported from the second location back to the first location.

One focus of the various embodiments of the present invention is to address the long-felt but unsolved need in the industry for a reclamation process for treating undrinkable but available water that is transportable in oil tankers such that water can be delivered to water-starved regions of the world where such oil tankers frequently return. The ability to reduce the need to desalinate water at the point of commercial use is urgently needed, not only due to the significant costs associated with such land-based plants, but also due to the political and military risks that such water treatment plants have in the politically volatile areas of the middle east where water is most needed. The bombing of an expensive water desalinization plant by an enemy would result in tremendous instability to local populaces. The present invention provides a significant secondary source of vital water supplies so that such a prospect is not used by competing nations to achieve political or military aims.

In one embodiment, water treatment systems include those that are suited to reclaim waste fluids in a continuous flow fashion for treatment within a ship positioned container, whether on-board the tanker or on a ship that may meet the tanker at the destination port. Some systems employ immersible transducers producing ultrasonic acoustic waves in combination with a high level of injected ozone. Water can also be treated by directing it into a ship positioned centrifuge for enhanced solid waste removal. Preferably, such systems are mobile and containerized and suitable for installation aboard an oil tanker ship and/or on an accompanying vessel at the destination port.

In practice, the difficulties of separating oil-contaminants from water to arrive at suitable water will vary to some extent on the nature of the kind, degree and type of contamination of the water resulting from the tanker compartments. It will also depend on the intended final use of the water. For example, water intended in uses such as, for example, hydraulic fracturing ("fracking"), may require minimal or even no processing. In contrast, producing drinking water from such contaminated water will require more extensive processing. Various water treatment systems and methods, however, can be used to achieve desired water quality standards. For example, oftentimes water from the hull of an oil tanker will need to first be clarified and separated from substantial amounts of suspended and emulsified oil, bitumen and other impurities like salts, silica, etc. To achieve this end, a high intensity acoustic energy and triatomic molecules can be introduced into the water via a conditioning container to provide a mechanical separation of materials by addressing the non-covalent forces of particles or, van der Waals force. The conditioning tank may provide a first level of separation including an oil skimmer through an up flow configuration with discharge entering a centrifuge. Water from the centrifuge may then be directed through a filtration process, sand or multimedia, for removal of large particulates before introduction through activated carbon filters for removal of organics and excess ozone. Discharge from the carbon filters is directed to a clean water tank. Piping can be employed to transport water to very large bags (as otherwise described herein) to accompanying vessels at a destination port or directed to onshore treatment and/or storage systems.

The instant invention provides for a cost efficient and environmentally friendly process and apparatus for cleaning water transported in an emptied oil tanker without the traditional concerns for cleaning the confines of the oil tanker so as to make it suitable for transport of potable water. Such a task has been, and admittedly is, an expensive and technologically, time-consuming and impractical exercise. What is needed, and what the present invention provides, is a method and system to achieve the ultimate goal of having drinkable water delivered to water starved but oil rich regions without the need to thoroughly clean the interior confines of an oil tanker ship prior to transport. Moreover, the oil tankers used throughout the world are huge vessels that have excess power capabilities, which can run water purification systems onboard and while in transit. Thus, without entailing additional valuable time that would be required to clean the confines of a tanker so that it could potentially carry varying degrees of "clean" water on a return trip to be re-loaded with oil, the present invention provides a method and system for cleaning water conveyed in the hulls and ballast tanks of such tankers while the tankers are on the open sea, utilizing the power of the internal ship systems to run the water treatment processes as described herein.

Thus, one aspect of the present invention is directed to the provision of an on-ship (e.g. oil tanker vessel) on-site process to treat water contaminated with oil residues remaining after an oil tanker ship is emptied of its oil cargo. One will also appreciate, however, that while the present invention finds particular application in the use of oil tankers, especially in view of their abundance, size, sophistication and the fact that they traverse between oil rich and water rich countries, other container or transport ships can also be utilized for various embodiments of the present invention, e.g those transporting other fluids, grain, produce, etc.

One objective of the invention is to provide an on-ship process that will lessen the time required to treat water on-site and will lower the cost of water to consumers by reducing the current and expensive land based processes used for the provision of water in water-starved regions of the globe.

In one embodiment, the treatment of oily water comprises adding an effective amount of a natural coagulant selected from the group consisting of tannins, chitosan, and a cationic or anionic flocculants. Preferably, the pH of the oily water is optionally adjusted to a range of about 2 to 8, prior to the natural coagulant being added, preferably the pH adjusted to between about 6.5 to 10 subsequent to the addition of the natural coagulant. Oil contaminated water is preferably separated in a mechanical separation process such as in flotation, filtration, reverse osmosis, cyclonic, gravity separation, and centrifugal force separation devices. One such device that may be employed is available from Enviro Voraxial Technology, Fort Lauderdale, Fla. The oily water can also be purified through the use of a purification apparatus and an operation method therefor, for coagulating and separating particularly the pollutant matter in water including oil and the like, which can regenerate and reuse the coagulant within the apparatus, without scarcely resupplying the coagulant. By way of example and in further support of the present disclosure, U.S. Pat. No. 7,410,573 to Norihide is incorporated herein by reference in its entirety.

In another embodiment the treatment and purification of oily water involves two steps: (1) pretreating the oily water to remove the organics, algae, fine particles, oil, gas, and waste material; and (2) treating the non-drinkable water to make potable water. Any conventional process can be used for the pre-treatment in step one. One such example is using a mobile water-treatment plant on a converted oil tanker that separates out contaminants as by settling, to leave clean water that can then be transferred to step two of the process and contaminants that must be disposed of once the tanker arrives at its port. Natural filtration is used in other embodiments, such as by subjecting oily water in the oil tanks to natural filtration techniques, such as those identified in U.S. patent application Ser. No. 12/905,590, incorporated herein by this reference. Other methods include reverse osmosis and multi-stage flash exhibit.

Both reverse osmosis and multi-stage flash exhibit lower performance in produced or fracking water treatment, where a much higher salinity in the produced or fracking water increases energy consumption and causes increased membrane fouling. By instead mixing the oily water with the directional solvent, most of the water can be extracted in substantially pure form using relatively low energy and heat inputs and at a reasonable cost, leaving a much more concentrated and lower volume waste product and allowing the extracted water to be conveyed to population centers or stored in vessels, very large bags, etc. By way of example and in further support of the present disclosure, WIPO Patent Application Publication No. 2011/066193 to Bajpayee is incorporated herein by reference in its entirety. Additionally, a mobile water treatment apparatus that includes a filtration system, a motor, a fluid storage container, and a fluid delivery pump is used to treat the water onboard the tanker and/or in an associated water treatment barge at or near the destination port. By way of example and in further support of the present disclosure, U.S. Patent Application Publication No. 2011/0089123 to Kennedy is incorporated herein by reference in its entirety. High temperature electrolysis to dissociate water to hydrogen and oxygen may be used and to separate the non-water material, and the combusting of generated hydrogen and oxygen at elevated pressure forms a high pressure high temperature superheated steam, creating a closed loop heat recovery system to recycle the heat generated by the combustion process to the high temperature electrolysis unit for the dissociation of non-fresh water. The standard requirement for eliminating hazardous material in typical incineration process is by keeping the material at 2000 degrees Celsius for at least two seconds. The present system in one embodiment provides such conditions for oily, pretreated water. By way of example and in further support of the present disclosure, U.S. Patent Application Publication No. 2010/0272630 to Rosenbaum is incorporated herein by reference in its entirety.

In one embodiment, the on-board treatment of oily water is performed by an apparatus that includes a funnel, a system effective for achieving submersion of a majority of the slant height of the funnel within the carrier fluid, and a pump in fluid communication with the interior volume of the funnel proximate the smaller end of the funnel for pumping fluid collected at the smaller end of the funnel. By way of example and in further support of the present disclosure, U.S. Patent Application Publication No. 2009/0314725 to Parro is incorporated herein by reference in its entirety.

In another embodiment of the present invention, an oil tanker ship has a purification treatment unit disposed on the hull and configured to collect, purify, and treat oily water (e.g. the water stored in the empty, dirty oil tanks) The purification treatment unit includes a floated oil collecting tank to collect floated oil collected from water in a dirty oil tank, a stirring tank having a cylindrical straight drum and a funnel-shaped bottom to stir oily water taken out from the dirty oil tank together with a coagulant and a collecting path to discharge precipitates, a plurality of filter treatment tanks to be used in multistage filtering treatment of oily water in the stirring tank, and purified water tanks By way of example and in further support of the present disclosure, U.S. Patent Application Publication No. 2011/0147293 to Imahashi is incorporated herein by reference in its entirety.

In the production of oil and gas, great quantities of water are produced. The water produced by the process is called "produced water" and often contains hydrocarbon and other materials. Of particular concern for use in common well-treatment operation is the avoidance of water containing undesirably-high concentrations of inorganic ions having a valence state of two or more. As one aspect of this invention, water pumped into an oil tanker's dirty, but empty, oil tanks is without undesirably-high concentrations of inorganic ions having a valence state of two or more. The purpose for this pre-treatment is to prevent deterioration of the oil refilled in the oil tankers after the water is removed. By way of example and in further support of the present disclosure, U.S. Patent Application Publication No. 2010/0319923 to Slabaugh is incorporated herein by reference in its entirety.

In various embodiments, devices of the present invention comprise the ability to convert and/or utilize energy available not only from the oil-empty tankers in route to oil ports, but also from naturally occurring resources such as solar, wind, wave, and thermal resources. In various embodiments, energy captured and/or converted from these sources may be used for various on-board functions, such as propulsion, heating, and various purification techniques.

In one embodiment, non-drinkable water (non-salt water) is loaded into the oil tanks of an empty oil tanker after the tanker has unloaded the oil at the desired location. This water could then be treated by the methods mentioned above, and after the water is cleaned it is put into the ballast tanks of the oil tanker. Clean ballast tanks could hold the treated and drinkable water without re-contaminating the water. The drinkable water could then be unloaded at the tanker's next destination before the tanker is refilled with oil.

While an emphasis of some embodiments of the present invention are directed to the ability to utilize recently emptied oil tankers to deliver non-salt water back to destinations other than the destination where oil was delivered, it is considered a teaching away from conventional thought to simply fill an empty oil tanker with fresh water as the water would immediately become fouled with the remaining remnants of oil and oil debris left over from the coatings on the tanker's internal surfaces. Thus, conventional wisdom was that such oil tankers, large as they are and despite the need for water to be transported to water-starved regions, were not believed to be viable candidates due to the time and expense of having to somehow clean or coat the internal surfaces of oil tankers so as to preclude water contamination. But in various embodiments of the present invention, such cleaning or coating methods may be employed in certain circumstances so as to at least lessen the ultimate task of cleaning the water either en route or at its final destination. Thus, while not necessarily being the preferred embodiment, various embodiments employ systems and methods whereby internal surfaces or portions of transport ships, and in particular oil tankers, may be coated with various materials to prevent or minimize risk of cross-contamination (i.e. the oil residue contaminating the water and vice versa). For example, various spray-coatings may be applied once a quantity of oil is emptied from a portion of the vessel to create a virgin surface for the holding and contacting with water or similar fluid cargoes. By way of example, industrial water-proof coatings provided by the Procachem Corporation may be provided to coat, cover, or seal a surface that was exposed to or in contact with oil so as to render the surface capable of accommodating water without significant risk of cross-contamination. In various embodiments, internal volumes of storage tanks or similar structures are coated with a layer of material, the layer of material comprising an appropriate thickness to substantially eliminate the risk of cross-contamination between a liquid or material to be stored and a liquid or material previously stored in the same tank. In various embodiments, the layer of material applied is not so thick as to substantially impact the overall internal volume of the container, tank, vessel, etc. Thus, in certain embodiments, one or more tank cleaning apparatus are employed to cleanse the inside of a container or tank. For example, various features as shown and described in U.S. Patent Application Publication No. 2009/0308412 to Dixon, which is incorporated by reference herein, may be employed to prepare various oil tankers and similar containers for the transport of cargo other than oil.

In still other embodiments, one or more bladders are provided wherein the one or more bladders are adapted to be placed within an emptied volume of a oil shipping container (e.g., tank, hull, etc.) and further filled with water to provide ballast and/or valuable shipping contents for a return or additional voyage. Accordingly, in various embodiments, significant value is provided to shipping activities by supplying a vessel with a valuable return-shipment, such as water. In one embodiment, at least portions of oil contained within an oil tanker are emptied or extracted at the appropriate location. Thereafter, emptied portions of an oil shipping vessel or container are provided with a liner suitable for preventing or minimizing contamination from previously and/or contemporaneously stored gas. For example, various liners available from Fab-Seal Industrial Liners, Inc. may be provided to accommodate water to be stored within an oil tank and isolate the water from various materials, tar, oil, debris, etc. Liners suitable for use in the present invention include, but are not limited to, P.V.C. flexible membrane liner materials.

In various embodiments, bags or liners that may find use in certain situations are designed for isolating water from oil surfaces and may be fabricated in any desired manner, including in a completely flattened conformation. For example, two sheets of fabric may be cut to the desired plan shape and joined at their adjacent edges by suitable means consistent with the material of construction. For example, heat welding or solvent welding may be used if certain polymeric materials have been employed as the substance coating the fabric. Sewing may be necessary in addition. It is possible that the overall cost of a bag may be reduced if the center section and the edges are fabricated separately, i.e., not the flattened conformation.

In various embodiments, liners of the present invention comprise a water-resistant, elastomer-coated mesh material, such mesh material being constructed of polymeric material having some inherent elasticity, such as polyester or nylon. A warp knit mesh construction is preferred in certain embodiments. The mesh material also may be steel mesh, preferably hexagonal netting of drawn steel wire or similar high modulus material, such as extended-chain crystallized polymer.

In another embodiment, a system whereby use is made of a double bottom tank, in fluid communication with a bag made of reinforced elastomeric material to provide segregated ballast space in the cargo space of a ship. The double bottom space and bag are filled with ballast water when the cargo space is empty, thereby making use of the cargo space in which the bag is located to carry ballast water in space previously occupied by cargo, without having any cross-contamination of the ballast water by the cargo residues or gases. The outward and upward movement of the bag is restricted by a rigid guide cage. An open, or partially open, topped rigid container is placed around the guide cage to restrict the "free surface effect" of the ballast water in the unlikely event of failure of the ballast bag. A header tank is provided to keep a positive pressure head on the water in the bag when in the ballast condition. A semi-flexible float assists in guiding the bag during ballasting and de-ballasting operations. Furthermore, fresh or potable water could be used in the place of ballast water. The fresh or potable water would function as ballast water and is delivered to the destination uncontaminated by the oil residue remaining in the oil tanks. By way of example and in further support of the present disclosure, U.S. Pat. No. 4,409,919 to Strain issued on Oct. 18, 1983, is incorporated herein by reference in its entirety.

In another embodiment, methods for optimizing the transportation of cargo, such as oil and water, are employed to further reduce costs, achieve the most economical transport of water to water starved regions and to coordinate tanker availability around the globe for such purposes. By way of example and in further support of the optimization methods available in the present disclosure, U.S. Patent Application Publication No. 2010/0287073 to Kocis is incorporated herein by reference in its entirety. Thus in one embodiment, the present method employs a process for optimal transporting of water that includes optimizing a plurality of transportation decisions and mechanically transporting water through movement of a plurality of water going vehicles in accordance with a set of optimized transportation decisions, including transportation routes and schedules for oil tankers, allocation of water to be transported to one or more demand locations by the transportation vehicles, and nomination of water pickup by the oil tankers, with such decisions optimized by collecting data relating to the various transportation decisions, using the data collected as part of a mixed integer linear programming model, and obtaining a solution to the model to arrive at a set of optimized transportation decisions.

One aspect of the present invention is directed to identifying surface currents, particularly along particular coasts, to determine those currents that are favorable to vessels transporting or towing bulk containers of non-salt water, preferably fresh water (whether or not contaminated by oil residue from an oil tanker's last shipment of oil). Vessels transporting bulk fresh water may include a combination of tankers and very large bags (VLB's). As described herein, the combined usage of tankers and VLB's facilitates the long-felt but unsolved need of conveying non-salt water to regions of the globe in need thereof. Such a system and method, for example, can be employed to recharge the over-taxed aquifers of some Pacific islands until they are able to regain their sustainable hydrostatic pressure.

It is important in many embodiments of the present invention to properly gauge the currents through which both tankers and VLB may traverse so as to achieve desired efficiencies of energy use, avoid catastrophic episodes related to adverse ocean conditions, etc. For example, the present inventors have first appreciated that the traditionally mean currents of the Humboldt Current will not provide adequate, useful estimates of the surface currents for the transporting vessels. Historical satellite-tracked surface drifters deployed in the Pacific Ocean may show the seasonal variable character of the surface currents, but are deemed to be inadequate to accurately predict the near surface current in real time. Thus, obtainment and use of computer model results that predict global surface currents forced by real time satellite sensed winds and sea level height anomalies, which are available in real time, provides a better estimate of the near surface current for the transporting vessels. In certain embodiments, the use of satellite-tracked drifter along a vessel's course is employed to provide valuable additional information of the current for a particular voyage. In addition or in lieu thereof, long-range radar instrumentation may be installed along the subject coastline(s) to further provide useful maps of the currents. Specifically, the ability to track bodies and debris, e.g. which led to the successful location of Air France 447 on the sea floor at a depth of 3900 m in the Equatorial Atlantic Ocean, can be used to predict real time surface currents.

In certain embodiments, data from satellite-tracked surface drifters deployed during 1980 to the present in the Pacific Ocean are employed in a high-tech version of the "message in a bottle". Using a surface buoy and a subsurface drogue (sea anchor), attached by a long, thin tether, the buoy measures location, temperature and other properties, and has a transmitter to send the data to passing satellites. The drogue dominates the total area of the instrument and is centered at a depth of 15 meters beneath the sea surface. The drifters are minimally affected by the wind and give direct estimates of the near-surface velocity. The velocity at the surface of the open ocean is nearly the same as the velocity at a depth of 15 m because there is normally a near surface mixed layer 10s of meters thick in the upper ocean. A real time estimate of surface currents is useful to tanker ships transporting water—as well as VLB associated therewith, and is best accomplished by the use of direct observations and output from real-time computer models of the ocean. These modern computer models are similar to the models that have been developed to predict the weather. Real time satellite wind products using microwaves and real time ship observations and state of the art real time models of ocean circulation are thus employed to determine preferred routes of transport so as to avoid obstacles, conserve energy and to protect the delicate nature of VLB conveyance.

In certain embodiments, a plot is produced in real time and sent to a vessel prior to departure or conveyed to a vessel at sea. In one embodiment, a five-day average current is the highest frequency output from the model, but consecutive five-day segments can overlap. A color bar showing color contours can be presented to represent the surface current speed with arrows and arrow lengths employed to represent the direction and speed. Sea surface height reflects the distribution of pressure in the ocean and the pressure gradients drive the ocean currents similar to how atmospheric pressure gradients drive the wind. Examples of such data can be obtained from the Ocean Surface Currents Analyses-Real Time (OSCAR) database at the National Oceanic and Atmospheric Administration (NOAA).

In various embodiments, methods and systems for conveying water in, over, and under land are provided. For example, in various embodiments, it is contemplated to utilize pre-existing easements and/or passageways, such as railway easements, for conveying water or similar liquid products of value to various locations. In one embodiment, a novel trench-digging system is provided on one or more portions of a railway car. By way of example, and for further enabling support of the present disclosure, the following references are hereby incorporated by reference in their entireties: U.S. Pat. No. 4,713,898 to Bull et al., U.S. Pat. No. 4,563,826 to Whitaker Jr., U.S. Pat. No. 4,890,958 to Dancer, U.S. Pat. No. 4,736,534 to Daniels et al., and U.S. Pat. No. 3,967,396 to Maisonneuve et al.

As a practical matter, one will appreciate that the large and economically well-off oil industry, using the present invention, may play a critical role in advancing the transport of desperately needed water resources to nation-states where water is scarce. Thus, while oil rich nations and large oil companies are typically the favorite despised entities due to the profits inherent in the oil trade, the prospect of employing the present invention by these very entities provides a meaningful commercial and public relations opportunity that demonstrates how the existing oil industry infrastructure can be used to provide water to water-sensitive regions of the world so as to eliminate long-felt hardships by millions of people and in a manner that may very well avoid future military conflicts based on the destruction of desalinization plants in a water-dependent nation.

Various embodiments of the present invention include a system and a method for storing bags, a method for trading water, and a method of shipping water by employing pre-existing tanker vessels. Representative figures for each of these are incorporated herein by this reference to PCT Application No. PCT/US2010/052864. (See figures therein).

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described above are further intended to explain the best mode presently known of practicing the invention and to enable others skilled in the art to utilize the invention in other embodiments and with various modifications required by their particular application or use of the invention. It is intended that the appended claims be construed to include alternative embodiments to the extent permitted by the prior art. It will be recognized that the steps described herein may be conducted in a variety of sequences without violating the novelty or spirit of the present invention. In one particular embodiment, the present invention is conducted by adhering to a sequence of first selecting a water source substantially free of harmful contaminants, subsequently constructing one or more filters at a point of lower gravitational potential energy than the source, subsequently identifying signature characteristics of the filtered water, and finally packaging the water for distribution.

In various embodiments of the present invention, steps for recovering, segmenting, determining, and packaging the ice into their respective containers is described. As can be appreciated, various steps of the methods described can be completed in different orders depending on how the water is recovered and processed.

The foregoing discussion of the invention has been presented for purposes of illustration and description. Further the description is not intended to limit the invention to the form disclosed herein. Consequently, variations and modifications commensurate with the above teachings, within the skill or knowledge of the relevant art, are within the scope of the present invention. The embodiments described above are further intended to explain the best mode presently known of practicing the invention and to enable others skilled in the art to utilize the invention in other embodiments and with various modifications required by their particular application or use of the invention. It is intended that the appended claims be construed to include alternative embodiments to the extent permitted by the prior art.

What is claimed is:

1. A method for preparing water obtained from an ice source, comprising:
   dividing a glacial ice source into at least two layers;
   determining characteristics relating to the at least two layers of the ice source, wherein the characteristics between the at least two layers are different;
   in response to determining characteristics, grouping the at least two layers;
   processing the at least two layers separately and directing recovered water from at least one of the at least two layers to a container, wherein characteristics of the water from the at least one layer remains substantially the same and wherein the characteristics of said at least one layer relates to at least one of age, purity, density, chemical content, and physical properties of water; and
   trading the recovered water from at least one of the at least two layers for a compensation amount.

2. The method of preparing water of claim 1 further comprising:
   connecting a first entity with a second entity, wherein the first entity desires to obtain an amount of the recovered water having at least one specific characteristic and the second entity has possession of a source of ice comprising the at least one specific characteristic;
   determining the compensation amount related to the amount of the recovered water desired, the at least one specific characteristic of the recovered water, and a current water index value; and
   transferring physical possession of the amount of the recovered water having the at least one specific characteristic to the first entity, wherein the water is transferred in the container.

3. The method of claim 2, wherein the specific characteristic is selected from the group consisting of being from a specific geological time period, having a specific purity, comprising a specific nutrient, and having been purified by filtration through native soils.

4. The method of claim 2, wherein the second entity has ownership in the ice comprising the at least one specific characteristic.

5. The method of claim 2, wherein the source of water having the at least one specific characteristic is located at a first geographic location, and wherein the water having the at least one specific characteristic is transferred to a second geographic location different from the first location.

6. The method of claim 2, wherein the container is a very large bag (VLB) having a total surface area of 60,000 square meters.

7. The method of claim 1, wherein the determining step comprises analyzing gas trapped within the at least two segments.

8. The method of claim 1, further comprising:
packaging the recovered water from at least two processed segments separately; and
labeling the container with the recovered water from at least two segments according to the determined characteristics.

9. The method of claim 1, wherein the processing step comprises separately processing the ice from the at least two segments on a boat.

* * * * *